United States Patent
Svendsen et al.

(10) Patent No.: US 9,557,188 B2
(45) Date of Patent: Jan. 31, 2017

(54) METHOD AND SYSTEM FOR USING RELATIONSHIP INFORMATION FROM A SOCIAL NETWORK TO ENABLE MOBILE DEVICE COMMUNICATIONS IN A PRIVACY ENHANCED NETWORK

(75) Inventors: Hugh Svendsen, Chapel Hill, NC (US); Kunal Kandekar, Jersey City, NJ (US); Scott Curtis, Chapel Hill, NC (US)

(73) Assignee: MODENA ENTERPRISES, LLC, Wilmington, DE (US)

(*) Notice: Subject to any disclaimer, the term of this patent is extended or adjusted under 35 U.S.C. 154(b) by 903 days.

(21) Appl. No.: 13/290,590

(22) Filed: Nov. 7, 2011

(65) Prior Publication Data
US 2012/0209910 A1 Aug. 16, 2012

Related U.S. Application Data

(60) Provisional application No. 61/410,580, filed on Nov. 5, 2010.

(51) Int. Cl.
*H04W 4/00* (2009.01)
*G01C 21/36* (2006.01)

(52) U.S. Cl.
CPC ......... *G01C 21/362* (2013.01); *G01C 21/3611* (2013.01)

(58) Field of Classification Search
CPC ... G06Q 10/10; H04L 29/06; H04L 29/08072; H04L 29/06027; H04L 12/581; H04W 84/12; H04W 84/18; H04W 80/04; H04W 8/26; H04W 88/06
USPC ........................................ 455/422.1; 709/204
See application file for complete search history.

(56) References Cited

U.S. PATENT DOCUMENTS

| | | | |
|---|---|---|---|
| 2010/0069058 A1* | 3/2010 | Rothschild | 455/422.1 |
| 2010/0257239 A1* | 10/2010 | Roberts | 709/204 |
| 2011/0090818 A1* | 4/2011 | Alexis | 370/254 |
| 2013/0051378 A1* | 2/2013 | Gruberman et al. | 370/338 |

OTHER PUBLICATIONS

How Bluetooth works, http://electronics.howstuffworks.com/bluetooth.htm/printable, May 27, 2014 (attached).*

* cited by examiner

*Primary Examiner* — Emmanuel L Moise
*Assistant Examiner* — Mahran Abu Roumi

(57) ABSTRACT

This disclosure relates to systems and methods of operating a mobile communications device (MCD) associated with a user utilizing social relationships defined on a social network. In one embodiment, the MCD detects other MCDs that are in proximity with the MCD. A determination may then be made that indicates which of the users associated with the other MCDs have a defined affinity with the user of the MCD on the social network. As a result of the determination, the MCD may then communicate over wireless local area networking links with the other MCDs.

30 Claims, 26 Drawing Sheets

METHOD AND SYSTEM FOR USING RELATIONSHIP INFORMATION FROM A SOCIAL NETWORK TO ENABLE MOBILE DEVICE COMMUNICATIONS IN A PRIVACY ENHANCED NETWORK

RELATED APPLICATIONS

This application claims the benefit of provisional patent application Ser. No. 61/410,580, filed Nov. 5, 2010, the disclosure of which is hereby incorporated herein by reference in its entirety.

FIELD OF THE DISCLOSURE

This disclosure relates generally to systems and methods for communicating with users on a social network.

BACKGROUND

Social networks provide users with a centralized way of organizing social relationships with other users. For example, social networks, such as Facebook® and Myspace® allow users to create friends lists, family lists, and become members of groups on the social network. Unfortunately, users must use the server computers provided by the social network in order to communicate with one another. In many contexts, this is undesirable. For example, local and ad hoc wireless methods enable quick, low-power communication between devices in proximity, but accessing social network information to facilitate detection may require using wide area network connections to connect to server computers, which may increase latency and power consumption. As another example, social networks are being utilized more and more to organize resistance movements, protests, and other events which may be unauthorized or frowned upon by government institutions. However, when using the server computers of the social network to organize these events, the centralized nature of these servers make it easier for communications between the users to be recorded or blocked. Thus, government institutions can utilize the communication records from the social network to identify users that have been directly involved in organizing these events. This can lead to serious and even deadly consequences in countries with autocratic or authoritarian governments.

Accordingly, there is a need for being able to utilize social relationships organized through a social network without having to communicate through a server computer.

SUMMARY

This disclosure relates to systems and methods of operating a mobile communications device (MCD) associated with a user using relationship information from a social network. The MCD detects other MCDs that are in proximity with the MCD. A determination is then be made either by a server computer of a social network or by the MCD itself as to whether users associated with the other MCDs have a defined affinity with the user of the MCD in the social network. For example, the determination may indicate that the users of the other MCDs have a friendship relationship within a defined number of degrees of separation on the social network, have a familial relationship with the user on the social network, or are also members of a group defined on the social network. As a result of the determination, the MCD may communicate over wireless local area networking links with the other MCDs using information access security data (IASD). These IASD are provided to secure communications with the other MCDs. In this manner, social relationships on the social network may be utilized to facilitate communications between MCDs without having to use the server computer of the social network for communications between the users. Furthermore, the communications are protected by the IASD.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
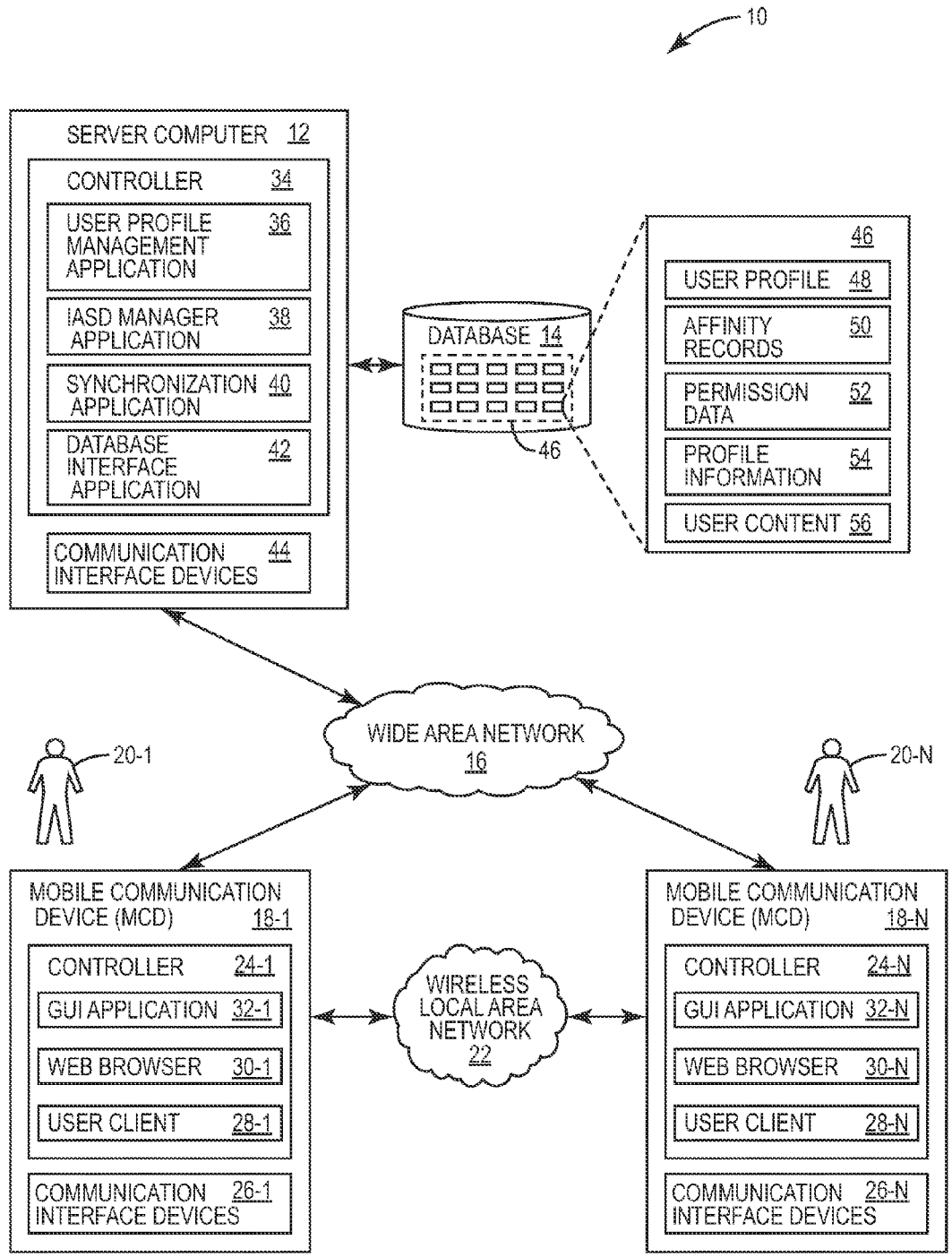
FIG. 1 illustrates one embodiment of a system in which users of mobile communication devices (MCDs) can communicate over wireless local area networking links as a result of a determination that the users have a defined affinity on a social network managed by a server computer.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates to systems and methods of operating a mobile communications device (MCD) associated with a user. The user is a member of a social network that is implemented through one or more server computers on a network. The user is also associated with the MCD. In other words, the MCD may be registered to the user, the user may have an account on the MCD, and/or the MCD may be otherwise assigned to the user in any other manner such that the MCD is identified as being utilized by the user. The user is assumed to have established social relationships with other users on the social network. These social relationships are established through affinity records associated with the user. For example, the user may have created friend lists, family lists, or may be a member of a group on the social network with other users.

The MCD may be operated to take advantage of the social relationships of the user on the social network while not requiring that communications between the users be passed through a server computer of the server. To do this, the MCD detects other MCDs that are in proximity with the MCD. A determination may then be made that indicates which of the users associated with the other MCDs have a defined affinity with the user of the MCD on the social network. For example, the determination may indicate that the users of the other MCDs have a friendship relationship within a defined number of degrees of separation on the social network, a familial relationship with the user on the social network, or are also members of a group defined on the social network. The determination may be affinity output data generated by the server computer of the social network as output from a search of the affinity records stored on a database. On the other hand, the MCD may store a local copy of one or more affinity records on the MCD. The local copy of affinity records may be retrieved from the server computer by the MCD either in advance or on demand. Thus, the determination may also be affinity output data from the search of the affinity records on the MCD.

Based on the determination, wireless local area networking links may be established between the MCD and the other MCDs, or the MCD may present the user with an option to establish these links. Information access security data (IASD) may be received from the server computer or self-generated by the MCD that is configured to secure communications with the other MCDs. As a result of the determination, the MCD may then communicate over the wireless local area networking links with the other MCDs. These MCDs are associated with the other users having the defined affinity with the user on the social network. Thus, the social relationships on the social network may be utilized without having to use the server computer of the social network for communications between the users. Rather, the MCD communicates with the other MCDs over wireless local area networking links.

FIG. 1 illustrates a system 10 according to one embodiment of the present disclosure. Prior to discussing the details of different implementations of the system 10, a general description of the components of the system 10 is provided. In this embodiment, the system 10 includes a server computer 12, a database 14 operably associated with the server computer 12, a wide area network 16, and a plurality of MCDs, which are referred to generically with reference number 18 and individually with reference numerals 18-1 through 18-N. The MCDs 18 may be communicatively coupled to the server computer 12 through the wide area network 16. Furthermore, the plurality of MCDs 18 may each be associated with one or more users, which are referred to generically with reference numeral 20 and individually with reference numerals 20-1 through 20-N. The wide area network 16 may be any type of network may include a plurality of different distributed networks. For example, the wide area network 16 may include a distributed public network such as the Internet, one or more local area networks (LAN), one or more mobile communication networks, circuit-switched networks, packet based networks, and/or the like. If the wide area network 16 includes various types of networks, the wide area network 16 may include gateways or the like to permit communication between the different networks. Also, the wide area network 16 may include wired components, wireless components, or both wired and wireless components. The MCD 18 and the server computer 12 may be connected to the wide area network 16 through various communication services that are adapted to connect a particular network.

The MCDs 18 may be any type of MCD capable of being utilized in a particular embodiment of the system 10. For example, the mobile communication devices 18 may be mobile smart phones, portable media player devices, mobile gaming devices, tablets, handheld computers, laptops, and/or the like. Some exemplary mobile communication devices that may be programmed or otherwise configured to operate in accordance with this disclosure are the Apple® iPhone, Apple® iPad, Apple® iPod Touch® device, a smart phone programmed to have Google's Android operating system, Palm Pre, Samsung Rogue, and Blackberry Storm. Note, this listing is simply illustrative and is not intended to limit the scope of the present disclosure.

The MCDs 18 may connect to the wide area network 16 through Ethernet connections, wireless local area network connections (e.g. Wi-Fi connections), wireless telecommunications connections (e.g., 3G or 4G telecommunications connections such as GSM, LTE, W-CDMA, or WiMAX connections), and/or the like. This may depend on the communicative features and functionality provided by a particular embodiment of the MCDs 18.

The MCDs 18 may be operable to provide or make use of a wireless local area networking service. Using the wireless local area networking service, the MCDs 18 can connect to each other via wireless local area networking links and/or access points to form a wireless local area network 22, such as an ad-hoc network. It is to be understood that the term "wireless local area networking" as used herein is not meant to restrict the scope of this disclosure to any specific wireless networking technology. In general, the term wireless local area networking as used herein may refer to any short-range wireless networking technology that supports direct point-to-point communication, infrastructure-based local area communication, and/or multi-hop ad hoc networks. As such, the term may include wireless local area network (LAN), personal area network (PAN), mobile ad hoc network (MANET), and near field communication technologies. Some examples of wireless local area networking services that may be used by the MCDs 18 are Wi-Fi networking services, IEEE 802.11 networking services, Bluetooth networking services, ZigBee networking services, Z-Wave networking services, Infrared Data Association networking services, and/or the like.

The MCDs 18 include a controller (referred to generically with reference number 24 and individually with reference numerals 24-1 through 24-N) operable to provide the necessary functionality disclosed herein. In this embodiment, the MCDs 18 each have one or more communication interface devices (referred to generically with reference number 26 and individually with reference numerals 26-1 through 26-N), a user client (referred to generically with reference number 28 and individually with reference numerals 28-1 through 28-N), and a web browser (referred to generically with reference number 30 and individually with reference numerals 30-1 through 30-N), and a graphical user interface (GUI) application (referred to generically with reference number 32 and individually with reference numerals 32-1 through 32-N). The communication interface devices 26 allow the MCDs 18 to connect to the wide area network 16 and the wireless local area network 22. Since the wide area network 16 and the wireless local area network 22 may be composed of various different types of networks, the communication interface devices 26 may be designed to operate with one or more different types of networks depending on the communicative capabilities provided by the MCD 18. For example, MCDs 18 may have communication interface devices 26 that may include one or more antennas and transceivers to allow the MCD to receive and transmit using different types of wireless technologies comprising different frequencies and protocols, such as cellular communications (e.g. GSM, CDMA, 3G, 4G, LTE and the like) to connect to the wide area network 16, and wireless local area networking services (e.g. 802.11, Bluetooth, Zigbee and the like) for the wireless local area network 22. The MCDs 18 may also have input terminals configured to connect to cables. In this manner, the MCDs 18 may communicate with the server computer 12, either by a direct connection to the wide area network 16 or through an intermediary personal computer.

The user client 28 is operable to manage MCD identifications (hereinafter "MCD ID(s)") and IASD for the MCD 18. The user client 28 may be provided as an application layer component. The MCD IDs may be any type of data capable of identifying the MCDs on the wide area network 16 and/or wireless local area network 22. For example, the MCD ID may be a Media Access Control (MAC) address, an Internet Protocol (IP) address, a serial number for the MCD 18, a telephone number, an International Mobile Equipment Identity (IMEI), a global unique identifier, a unique user identifier for the user 20, an identifier that is self-generated, an identifier that is assigned by the server computer 12, and/or a combination thereof, and/or the like. The IASD may be any type of data utilized to prevent unauthorized access to information transmitted over a network. For example, the IASD may be a key (e.g. a public key, a private key, a secret key and the like), a hash, a security token, combinations thereof, and/or the like. In some embodiments, the IASD may be contained as part of the MCD ID itself, for example, where an MCD ID is formed by appending a public key to a unique user ID. The user client 28 may be operable to implement a cryptographic algorithm, cipher, or hashing algorithm to encrypt and decrypt data using the appropriate IASD. Furthermore, as explained in more detail below, the user client 28 may also be operable to search affinity records stored on the MCD 18 to generate determinations. The user client 28 may also operate with the communication interface devices 26 in order to receive the MCD IDs (and possibly, the IASD) in a determination from the server. Alternatively, the user client 28 may be integrated or partially integrated into the communication interface devices 26.

The web browser 30 is operable to allow the MCD 18 to retrieve information, send information, and gain access to information on the wide area network 16. For example, the web browser 30 permits the MCD 18 to gain access to the server computer 12. Alternatively, the MCD 18 may utilize any other type of program that allows the MCD 18 to gain access to the server computer 12. In this embodiment, the server computer 12 is utilized to implement the social network and the user 20 may utilize the web browser 30 to participate on the social network. Examples of social networks include Facebook®, Myspace®, MyHeritage™, Jaiku™, Dol2day™, FledgeWing™, Google+™, OneWorldTV™, Match.com®, and/or the like. Alternatively, the user client 28 may be integrated or partially integrated into the web browser 30. Furthermore, the user client 28 may have different characteristics and functionality depending on the social network that the specific user client 28 is designed to operate on and the operation characteristics of a particular embodiment of the MCD 18.

The GUI application 32 is operable to generate a GUI that allows the user 20 to interact with the MCD 18. In one embodiment, the GUI application 32 is an input/output application that utilizes the functionality provided by the operating system of the MCD 18 to present output and receive input from the user 20. The GUI may be presented on a touchscreen display or any other suitable display utilized by the particular embodiment of the MCD 18. Through the GUI, the user 20 can initiate programs such as web browser 30 and the user client 28. For example, the web browser 30 may interact with the GUI application 32 so that web pages from the social network are presented to the user 20 on the display. In this manner, the user 20 can operate the MCD 18 and interact with the social network.

Note, while each of the MCDs 18 is illustrated as including the communication interface devices 26, the user client 28, the web browser 30, and the GUI application 32, in other embodiments, some, or all of the MCDs 18 may not have each of these components. For example, some MCDs 18 may simply have a user client 28 and a communication interface devices 26, while others may have just a web browser 30 and a communication interface devices 26. Furthermore, each MCD 18 may have different software versions of the components depending on the technical characteristics of the specific MCD 18, as well as the functional requirements of the social network.

It should be noted that while the MCDs 18 may transmit and receive network set-up signals, control messages, and the like, using the wireless local area networking services prior to establishing the wireless local area networking link with another MCD 18, the network set-up signals and control messages are not being communicated over the wireless local area networking link. Rather, the establishment of the wireless local area networking link requires that communication layers between one MCD 18 and another MCD 18 be set-up in accordance with a wireless local area networking protocol. Communications communicated over the wireless local area networking link are generally performed using communication packets. These communications may be in the form of communication packets that are at least partially formatted based on the wireless local area networking link.

Next, FIG. 1 also illustrates an embodiment of the server computer 12. The server computer 12 includes a controller 34. The controller 34 is operable to implement a user profile management application 36, IASD manager application 38, a synchronization application 40, a database interface application 42, and one or more communication interface devices 44. Note that in this embodiment, a single server computer 12 provides the user profile management application 36, IASD manager application 38, and the synchronization application 40. Also, in this embodiment, the server computer 12 operates directly with the database 14, which is also located at the same network location as the server computer 12. This is not necessarily the case. In alternative embodiments, some or all of these software applications may be provided by different server computers operating cooperatively, for example, in one or more data centers. The server computers may be located either at the same network location or at various different network locations distributed throughout the wide area network 16. Each server computer 12 may include a database interface application 42 and communication interface devices 44.

In FIG. 1, the database 14 stores database records 46, which include user profiles [referred to generically with reference number 48 and individually with reference numerals 48-1 through 48-N (reference numerals 48-1 through 48 N are not specifically shown in FIG. 1)] of the users 20. The server computer 12 may forward information to the database 14 for storage in the database records 46, and may query the database 14 to retrieve the relevant information. The server computer 12 may also send information from the database records 46 to the MCDs 18 through the wide area network 16. The user profiles 48 may include one or more affinity records 50. The affinity records 50 indicate social relationships between the user 20 and the other users 20 on the social network. For example, the affinity records 50 may be friend lists, family lists, group lists, and/or the like. These affinity records 50 may also store MCD IDs that identify the MCDs 18 of the other users 20 having a social relationship with the user 20.

The user profile 48 may also store the MCD ID(s) of the MCD(s) 18 associated with the particular user 20. Similarly, the IASD may be assigned to the MCD ID(s) provided to secure communications with the MCD 18 in the user profile 48. Furthermore, the MCD ID(s) and/or IASD for the other users 20 having a social relationship with the user on the social network may be provided in the affinity records 50 of the user 20. The user profiles 48 may also include permissions data 52 describing privacy settings for accessing information in the user profile 48, relationship requirements for contacting the user 20, security requirements for contacting the user 20, the types of communications permitted by the user 20, and/or the like. Profile information 54 may also be stored in the user profile 48 by the database 14. The profile information 54 may include the MCD IDs identifying MCDs 18 associated with the user 20, the IASD provided to secure communications with the MCD 18, as well as other information such as user credentials (e.g., username and password), demographic information, general interest information, music interest information, movie interest information, personal information, likes and dislikes, status information, and/or the like. User content 56 may also be stored with the user profiles 48, such as pictures, movies, text-based materials, clips, songs, internet links, and/or the like.

In alternative embodiments, various different databases may store the user profiles 48, the affinity records 50, the permissions data 52, the profile information 54, and the user content 56 throughout the wide area network 16. Similarly other data related to the user profiles 48, the affinity records 50, the permissions data 52, the profile information 54, and the user content 56 may be stored in the database records 46 on separate databases. In the illustrated example, the database 14 is programmed to store all of the given information for a particular user profile 48 in a single database record 46. However, the database 14 may maintain database records 46 in accordance with defined database tables, classes or objects in which the information for each user 20 is at least partially distributed among various database records 46. Accordingly, the user profile may thus be a user database record having pointers (or pointer-to-pointers) that point to memory locations associated with other database records that actually store the information for the particular user 20-1 through 20-N. Alternatively or additionally, the user profile 48 may include a database link to the database record of another database in order to find the information. In some embodiments, the database 14 may be a relational database, wherein different data components of each user profile 48 may be stored as separate records in different tables, and relations between associated records in the various tables may be implemented by means of primary key and foreign key columns.

Referring again to FIG. 1, the user profile management application 36 of the server computer 12 is operable to manage access to the server computer 12 and the user profiles 48 on the database 14. To provide access to the server computer 12, the user profile management application 36 may execute a log-in process that authenticates the user 20 with the server computer 12. For example, the log-in process may be performed using credentials such as a username and password entered by the user 20 using the web browser 30 and sent to the user profile management application 36.

The database interface application 42 is operable to provide the server computer 12 with the ability to interface with the database 14. The communication interface devices 44 allow the server computer 12 to connect to the wide area network 16. Since the wide area network 16 may be composed of various different types of networks, the communication interface devices 44 may be designed to operate with one or more different types of networks. For example, if the server computer 12 is an Internet protocol (IP) based server, the communication interface devices 44 send and receive TCP/IP packets over the Internet. In addition, the communication interface devices 44 may also allow the IP based server to communicate with gateways so that the IP based server can connect to the gateways for receiving information on a mobile communications network.

In FIG. 1, the IASD manager application 38 is operable to manage the MCD IDs and IASD for the server computer 12. The IASD manager application 38, utilizing the database interface application 42, can assign MCD IDs and IASD to the user profiles 48 and update the affinity records 50 accordingly. The IASD manager application 38 can also send MCD IDs and IASD to the MCDs 18 using the communication interface devices 44. Furthermore, the IASD manager application 38, utilizing the database interface application 42, may be operable to search the user profiles 48, the affinity records 50, and the profile information 54 for MCD IDs and IASD. The IASD manager application 38 may operate with the user profile management application 36 so that the MCDs 18 can receive updated MCD IDs and IASD if the log-in process is performed through the MCD 18.

The synchronization application 40 allows the server computer 12 to synchronize with the MCDs 18 over the wide area network 16 utilizing the communication interface devices 44. The synchronization application 40 may operate with the IASD manager application 38 so that the MCDs 18 can receive updated MCD IDs and IASD during the synchronization process.

It should be noted that embodiments of different devices, such as the server computer 12 and the MCDs 18, are described throughout this disclosure as using software applications to provide certain functionality. As is apparent to one of ordinary skill in the art, any system that can be implemented with software applications has a hardware circuit analog that utilizes hardware circuits specifically configured to provide the same functionality as the software application. Accordingly, this disclosure does not intend to limit the devices described herein to the utilization of software applications and general-purpose hardware. Instead, the systems of these devices may be implemented using software applications, hardware circuits, or some combination of both software applications and hardware circuits. All of these implementations are considered to be within the scope of this disclosure.

Also, the software applications described in this disclosure are described as if being distinct software applications. This is done for the purpose of clarity but it may or may not necessarily be the case. Alternatively, the software applications may be partially or fully integrated with one another and/or may be partially or fully integrated as part of one or more other generalized software applications. These and other alternatives for providing the functionality of the software applications would be apparent to one of ordinary skill in the art in light of this disclosure and are considered within the scope of this disclosure.

Figure 2:
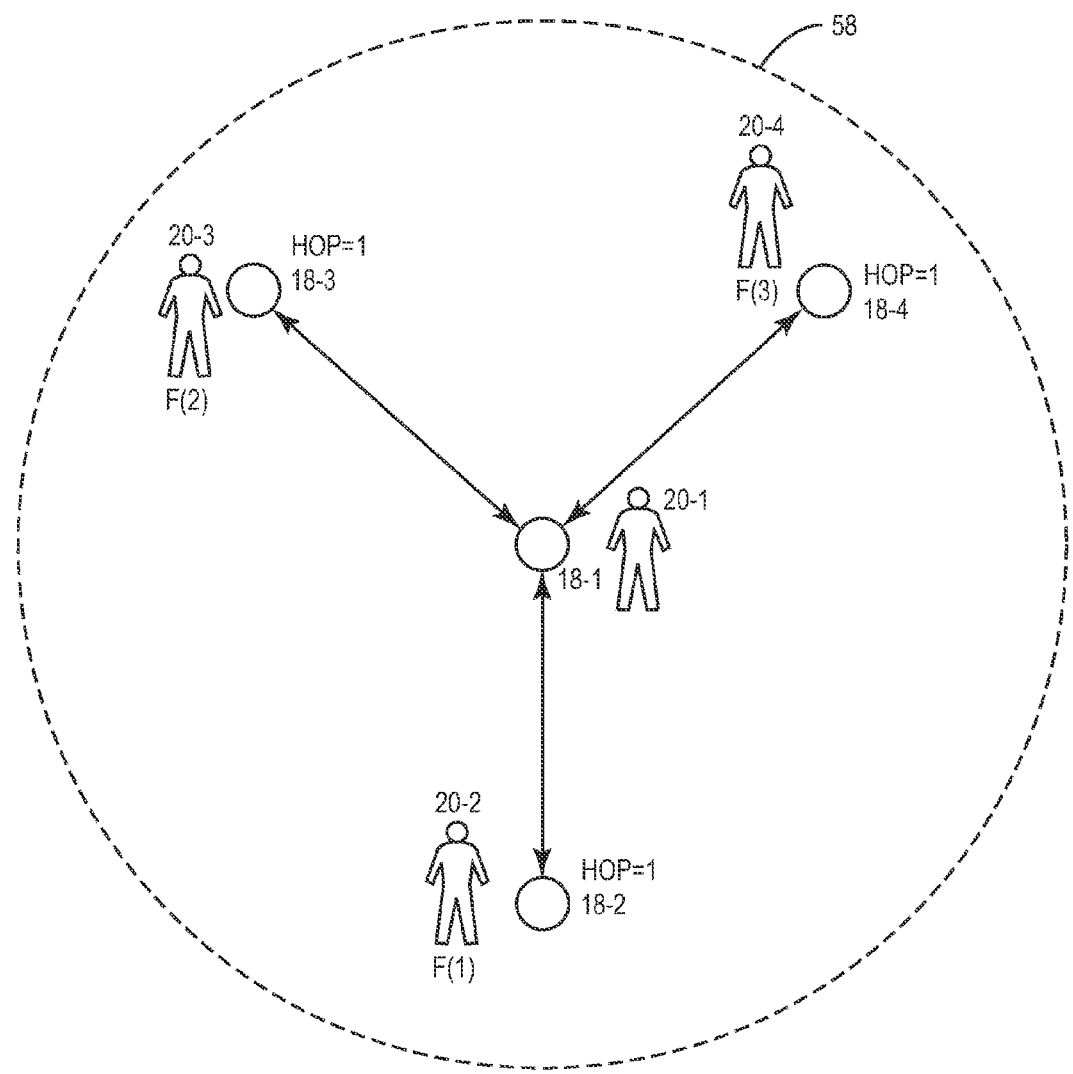
FIG. 2 illustrates one embodiment of a configuration of users and mobile communication devices (MCDs) shown in FIG. 1.

FIG. 2 illustrates one embodiment of a configuration of users 20-1 through 20-4 and MCD 18-1 through 18-4 associated with the users 20-1 through 20-4. In this embodiment, MCDs 18-2 through 18-4 are in proximity with MCD 18-1. The MCDs 18-2 through 18-4 are in proximity with the MCD 18-1 by being within a transmission range 58 of MCD 18-1 and/or a within a defined number of wireless local area networking hops from the MCD 18-1. In this example, the defined number of hops is equal to one (1) hop as shown in FIG. 2. Since the MCD 18-2 through 18-4 are just one hop (1) from the MCD 18-1, the MCD 18-2 through 18-4 are within a transmission range 58 of the wireless local area networking service provided by the MCD 18-1. The transmission range 58 in FIG. 2 is depicted as being relatively circular and symmetric. The illustrated transmission range 58 has been depicted in this manner for the purposes of clarity. In practice, the transmission range is dependent upon the radio frequency (RF) power of the MCD 18-1, the receiver sensitivity of the MCDs 18-2 through 18-4, and the absorption rate of the medium the electromagnetic waves travel through as well as the physical environment, such as objects that may block or reflect propagation of the electromagnetic waves. Consequently, the transmission range 58 may vary directionally and may be asymmetrical. Further, the transmission range 58 in FIG. 2 is depicted for direct point-to-point communications between the MCD 18-1 and other MCDs 18-2 through 18-4. In some embodiments, the communication between the MCDs 18 may be relayed through an intermediate wireless infrastructure device (not shown in FIG. 2), such as an 802.11 Access Point (that is, a Wi-Fi wireless router), in which case the transmission range 58 may be the transmission range of the intermediate wireless infrastructure device.

Next, the MCDs 18-1 through 18-4 are each associated with users 20-1 through 20-4, respectively. The users 20-1 through 20-4 are each members of a social network and have varying degrees of affinity with one another on the social network. In this example, the symbol F(n) indicates a friendship relationship between the user 20-1 and the other users 20-2 through 20-4 on the social network. The integer, n, indicates the number of degrees of separation on the social network in the friendship relationship between the user 20-1 and the other users 20-2 through 20-4. For instance, the user 20-2 has the symbol "F(1)" thereby indicating that the friendship relationship between the user 20-1 and the user 20-2 has one (1) degree of separation. Thus, user 20-2 is a friend of user 20-1 on the social network. The user 20-3 has the symbol "F(2)" thereby indicating that the friendship relationship between the user 20-1 and the user 20-2 has two (2) degrees of separation. Thus, user 20-3 is a friend-of-a-friend of the user 20-1 on the social network. The user 20-4 has the symbol "F(3)" thereby indicating that the friendship relationship between the user 20-1 and the user 20-4 has three (3) degrees of separation. Thus, user 20-4 is also a friend-of-a-friend of the user 20-1 with an even higher degree of separation on the social network.

Figure 3:
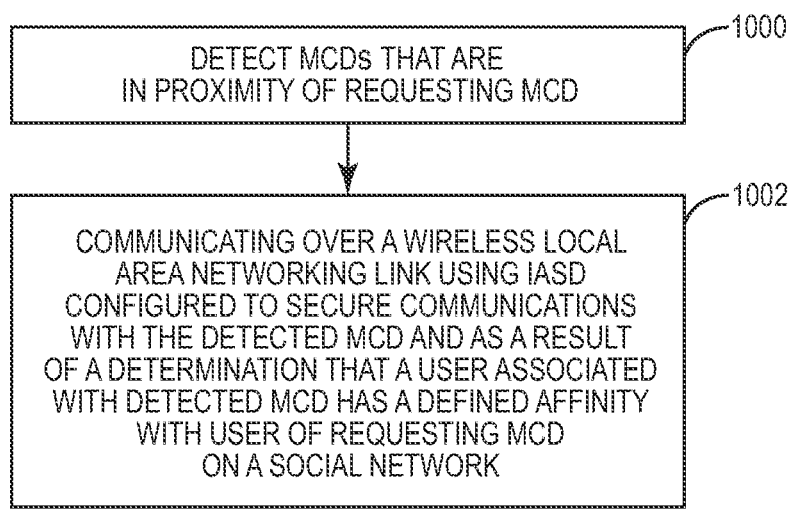
FIG. 3 illustrates exemplary procedures for implementing a method in which users communicate over wireless local area networking links using the MCDs shown in FIG. 1 as a result of a determination that the users have a defined affinity on the social network.

Referring now to FIGS. 2 and 3, FIG. 3 illustrates one embodiment of exemplary procedures of operating the MCD 18-1 associated with the user 20-1. To begin, the MCD 18-1 detects one or more MCDs that are in proximity with the MCD 18-1 (procedure 1000). In this embodiment, MCDs 18-2 through 18-4 are detected by the MCD 18-1. The MCDs 18-2 through 18-4 are in proximity with MCD 18-1 by being within transmission range 58 of MCD 18-1 as well as the defined number of wireless local area networking hops from the MCD 18-1, which in this case is one (1) hop. To detect MCDs 18-2 through 18-4, MCD 18-1 may receive information that identifies MCDs 18-2 through 18-4 as devices within the proximity. Once this information is received, the information can be utilized to obtain a determination regarding the users 20-2 through 20-4 associated with the MCDs 18-2 through 18-4. The determination indicates which of the users 20-2 through 20-4 have a defined affinity with the user 20-1 on the social network. The defined affinity can be any type of affinity definable through the social relationships among the users 20-1 through 20-4 on the social network. For example, the defined affinity could be one or more of either a friendship relationship within a defined number of degrees of separation on the social network, a familial relationship on the social network, or common membership in a group defined on the social network. The determination thus indicates which of the MCDs 18-2 through 18-4 are associated with users 20-2 through 20-4 that have a defined affinity to the user 20-1. As explained in further detail below, the determination may be obtained either by receiving the determination from the server computer 12 or by generating the determination at the MCD 18-1. In one embodiment, the determination is affinity output data resulting from a search of affinity records stored by the MCD 18-1. In another embodiment, the determination is affinity output data resulting from a search of the affinity records 50 by the server computer 12. The IASD may be provided with this affinity output data, in a separate output such as when the MCD 18-1 requests IASD on demand, may already be stored in the affinity records of the MCD 18-1, and/or may be self-generated by the MCD 18-1.

Next, the MCD 18-1 communicates over one or more wireless local area networking links with one or more of the MCDs 18-2 through 18-4 using the IASD provided to secure communications with the one or more of the MCDs 18-2 through 18-4 and as a result of a determination (procedure 1002). More specifically, the determination indicates that one or more of the MCDs 18-2 through 18-4 are associated with one or more users 20-2 through 20-4 having the defined affinity with the user 20-1 on the social network. The MCD 18-1 communicates over one or more wireless local area networking links with one or more of the MCDs 18-2 through 18-4 that are indicated in the determination. The MCD 18-1 may also use the IASD provided to secure communications with the one or more MCDs 18-2 through 18-4 when communicating over the wireless local area networking links.

For example, if the defined affinity for the determination was a friendship relationship within one (1) degree of separation on the social network, the determination indicates that the MCD 18-2 is associated with a friend of the user 20-1. The friend, as indicated by symbol F(1), is the user 20-2. The MCD 18-1 communicates over a wireless local area networking link with the MCD 18-2 using the IASD provided to secure communications with the MCD 18-2.

Figure 4:
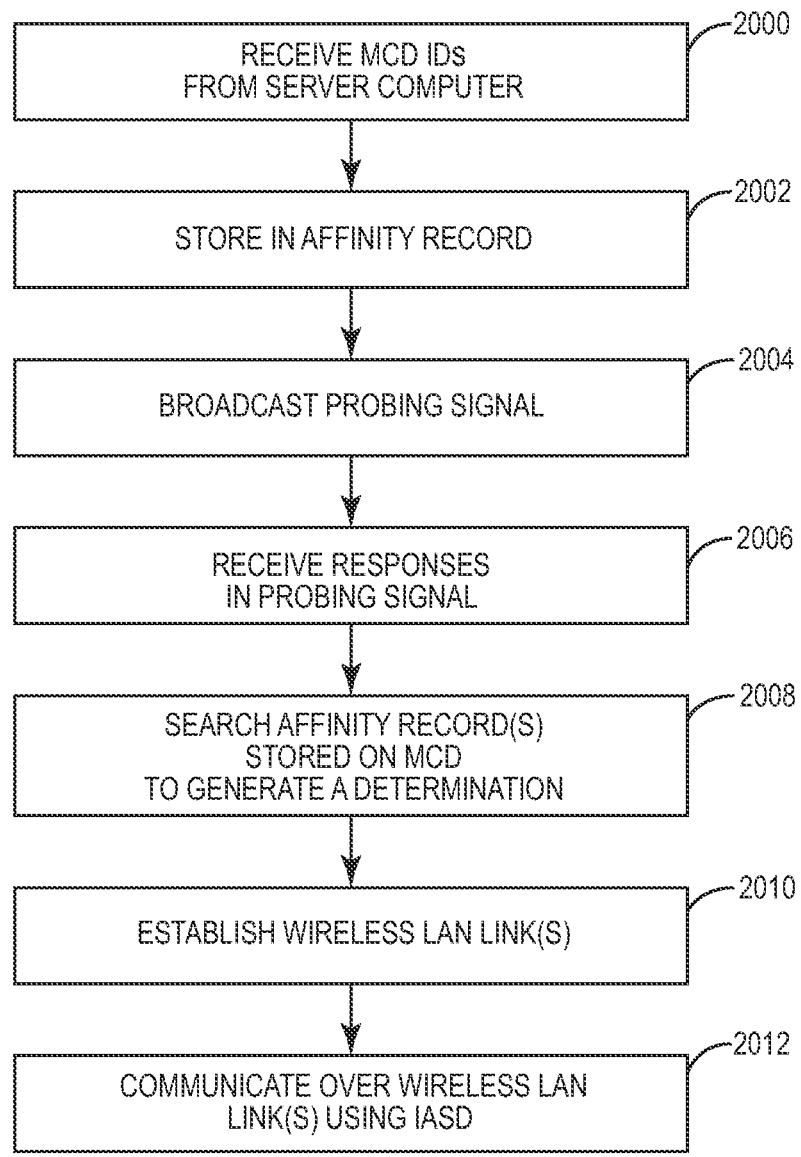
FIG. 4 illustrates a more detailed embodiment of the exemplary procedures shown in FIG. 3 where the MCD generates the determination that users have the defined affinity on the social network utilizing affinity records stored locally on the MCD.

FIG. 4 illustrates an embodiment of the exemplary procedures described above in FIG. 3 and other related exemplary procedures. In this embodiment, the determination is obtained by generating the determination locally at the MCD 18-1. To do this, the MCD 18-1 receives MCD IDs from the server computer 12 (procedure 2000). Along with each MCD ID, the server computer 12 may also provide additional information related to the user 20 of the MCD 18 identified by that MCD ID, such as data from the user profile 48, as well as the affinity record of that user 20 with the user 20-1. The MCD 18-1 may or may not also receive IASD. The MCD IDs (and the IASD) may be received from the server computer 12 through the synchronization process, the log-in process, and/or from the IASD manager application 38 during scheduled updates. Alternatively or additionally, the MCD IDs may be received directly from other MCDs 18 through MCD ID announcements broadcast using a wireless local area network service by the other MCDs 18.

Once the MCD IDs are received, the MCD 18-1 then stores the MCD IDs in one or more affinity records (procedure 2002). If the IASD is received as well, the IASD may also be stored in the affinity records. Any other information associated with the MCD ID is received as well, it may also be stored in the affinity records. These affinity records may be local copies of friends lists, family lists, and/or group lists, from the affinity records 50 in the user profiles 48 of the user 20-1. On the other hand, the affinity records may be a contact list on the MCD 18-1 supplemented by information from the affinity records 50 of the server computer 12. The contact list may include or be linked to memory locations having parameters indicating that a particular contact has a social relationship with the user 20-1 on the social network. The contact list may also include or be linked to memory locations with the MCD IDs, the IASD, and any additional information for contacts that are also users 20 of the social network.

Once the MCD IDs are stored on the MCD 18-1, the MCD IDs can be utilized to generate determinations that users 20 associated with the MCDs 18 in proximity with MCD 18-1 have a defined affinity to the user 20-1 on the social network. To detect MCDs 18 in proximity to the MCD 18-1, the MCD 18-1 broadcasts a probing signal (procedure 2004). In one embodiment, the MCD 18-1 utilizes a wireless local area networking service provided by the MCD 18-1 to broadcast the probing signal on a wireless local area networking channel. The probing signal may include a defined number of wireless local area networking hops from the MCD 18-1. In this case, the defined number is one (1) and the MCDs 18-2 through 18-4 receive the probing signal. Since there is only one (1) hop between the MCD 18-1 and the MCDs 18-2 through 18-4, the MCDs 18-2 through 18-4 are in the transmission range 58 of the wireless local area networking service of MCD 18-1. Thus, the MCDs 18-2 through 18-4 receive the probing signal directly from MCD 18-1. In an alternative embodiment, the MCDs 18-1 through 18-4 periodically broadcast their MCD IDs to one another through MCD ID announcements. Furthermore, the MCDs 18-2 through 18-4 each broadcast a response to the probing signal having their MCD IDs. The MCD 18-1 then receives the responses to the probing signal from each of the MCDs 18-2 through 18-4 (procedure 2006). In this manner, the MCD 18-1 detects that the MCDs 18-2 through 18-4 are in proximity to the MCD 18-1. Note that MCD detection methods such as probing signals and broadcast announcements may either leverage the detection mechanisms that are part of various physical and MAC layer protocols (such as the Inquiry, Inquiry Scan, Paging and/or Service Detection processes in Bluetooth), or may be implemented separately by the user client 28 at the application layer (such as using services like Bonjour over WiFi local area networks). As an example, in some embodiments, especially where privacy is not essential, the MAC address of the MCD (e.g. the Bd_Addr for Bluetooth) may be used as the MCD ID, and procedures 2004 and 2006 may be implemented by the Inquiry and Inquiry Scan processes in the Bluetooth protocol stack. Alternatively, in some embodiments, MCD IDs may either be self-generated by the MCDs 18 or assigned to the MCDs 18 by the server computer 12, and procedures 2004 and 2006 may be implemented at the application layer using detection services, such as Bonjour and the like. Thus, the MCD 18-1 now has obtained the MCD IDs of MCDs that are in proximity to it, that is, the MCDs 18-2 through 18-4.

The user client 28-1 then searches the affinity records stored on the MCD 18-1 to generate a determination (procedure 2008). In this embodiment, the MCD IDs in the responses to the probing signal are utilized to search the affinity records on the MCD 18-1. For example, the user client 18-1 utilizes the MCD ID to search a local copy of a friends list that has the MCD IDs assigned by the server computer 12. If the user client 18-1 finds one of the MCD IDs from the responses in the friends list, then the MCD ID is of a MCD 18 associated with a friend on the social network. In this particular example, the user client 18-1 finds the MCD ID of MCD 18-2 in the friends list as associated with user 20-2. The user client 18-1 then generates a determination that includes the MCD ID and IASD of MCD 18-2 from the affinity record stored on the MCD 18-1. Alternatively, the determination may include pointers to the memory locations that store the MCD ID and/or the IASD.

The MCD 18-1 then establishes a wireless local area networking link based on the determination (procedure 2010). In this example, the MCD 18-1 transmits an invitation to the MCD 18-2 using the MCD ID from the determination. The invitation requests that the MCD 18-2 establish the wireless local area networking link with the MCD 18-1. The invitation may include wireless local area networking set-up information for establishing the wireless local area networking link. In response to the invitation, the MCD 18-1 may then receive an acknowledgment indicating an acceptance of the invitation from MCD 18-2. The acknowledgement may also include set-up information in accordance to the particular wireless local area networking protocol utilized to establish the wireless local area networking link.

Alternatively, procedure 2004 and 2006 may not be performed but rather the MCD 18-1 may utilize already established wireless local area networking links to detect the other MCDs. As a result, procedure 2010 may have occurred prior to procedure 2000. In one embodiment, the MCD 18-1 may present information about the regarding the determination of procedure 2008 on the GUI 32-1, and may prompt the user before establishing a wireless local area networking link. Information about determination results displayed on GUI 32-1 may comprise information about one or more nearby MCDs 18 whose users 20 have an affinity with the user 20-1, including the MCD ID of each matching MCD and user information about its associated user such as the user ID, user profile information, social network relationship information with the user 20-1, and the like. If a plurality of matching MCDs 18 is detected by the determination, their information may be sorted by one or more criteria, for example, in order of social network affinity, or in order of proximity as estimated by wireless signal strength.

In one embodiment, the entire process described in FIG. 4 may be performed in response to the user 20-1 explicitly requesting the MCD 18-1 to detect proximate MCDs 18 associated with users 20 who have a social network affinity with user 20-1. For example, the user 20-1 may wish to share some content stored on the device 18-1 with a nearby user 20-2 who is a friend, and may wish to select the friend's MCD 18-2 automatically without having to identify the MCD 18-2 from a list of all nearby MCD 18. Detection methods for wireless local area networking services such as Bluetooth are typically unable to meaningfully distinguish between the devices they detect, as they are unaware of information at higher layers such as social network information. Hence, they typically simply return a list of all nearby detectable devices, of which the user 20 must manually identify the right one, a process that is inconvenient as well as potentially unsecure. However, the systems and methods described in this disclosure can enable the users 20 of the MCDs 18 to very quickly detect MCDs in its proximity and detect proximate MCDs 18. In one exemplary embodiment, the MCD 18-1 may shortlist those MCDs 18-2 through 18-4 that are assigned to the user's friends and discard those that don't belong to the user's friends. As a result, the MCD 18-1 may present the user 20-1 with a visual indicator(s) for the user 20-2 and/or the MCD 20-2 to establish the wireless local area networking link.

After the wireless local area networking link has been established, the MCD 18-1 then communicates over the wireless local area networking link using the IASD (procedure 2012). In this example, the MCD 18-1 communicates over the wireless local area networking link using the IASD provided to secure communications with the MCD 18-2. As explained above, the IASD may have been previously provided by the server computer and stored in the affinity record on the MCD 18-1. Alternatively, the IASD may now request the IASD from the server computer or, as explained below, the IASD may be a shared secret between the MCD 18-1 and the MCD 18-2. To communicate over the wireless local area networking link, the MCD 18-1 generates communication packets according to a wireless local area networking protocol. The user client 18-1 may encrypt data for the communication packets using the IASD. For example, the user client 18-1 may encrypt payload data and/or other sensitive information in the communication packet. The MCD 18-1 transmits the communication packet, and thus the encrypted data to the MCD 18-2 over the wireless local area networking link. Note that, in this example, the MCD 18-1 communicates over the wireless local area networking link with MCD 18-2 as a result of the determination that the user 20-2 associated with MCD 18-2 is a friend of the user 20-1 on the social network.

Accordingly, as shown by procedures 2004, 2006, and 2012 in FIG. 4, the MCD 18-1 implements one embodiment of the exemplary procedures discussed above in FIG. 3. Procedures 2004, 2006 in FIG. 4 is one implementation of the exemplary procedure 1000 in FIG. 3. Procedure 2012 in FIG. 4 is one implementation of exemplary procedure 1002 in FIG. 3.

Figure 5:
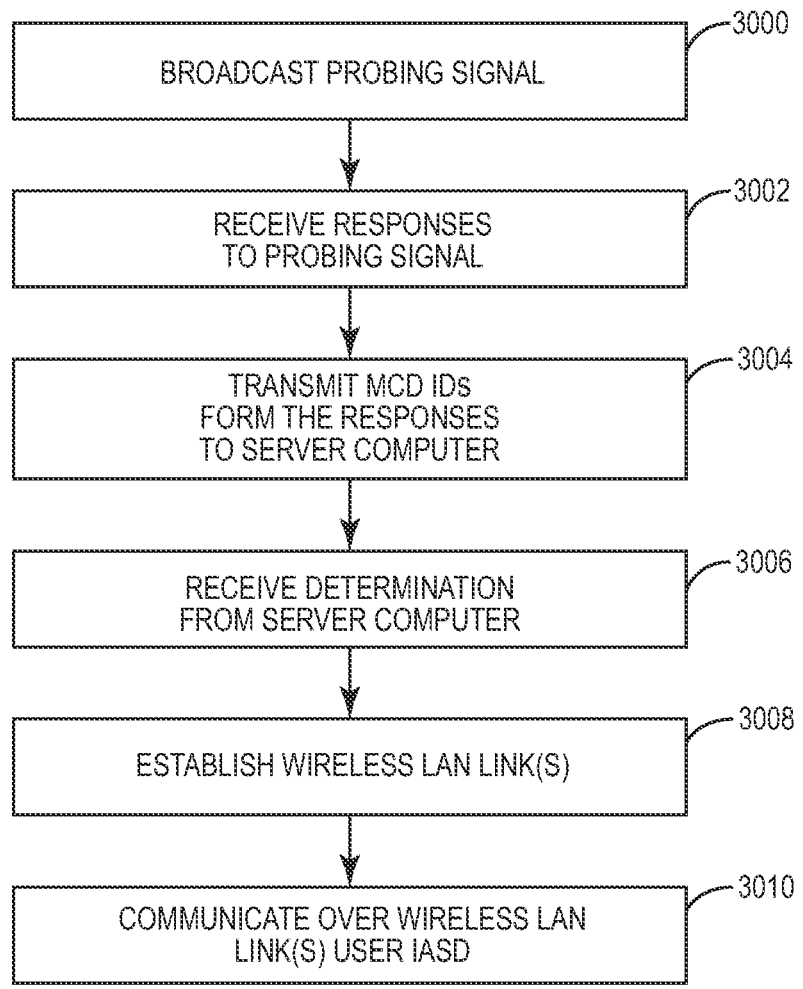
FIG. 5 illustrates a more detailed embodiment of the exemplary procedures shown in FIG. 3 where the MCD receives the determination that users have the defined affinity on the social network utilizing affinity records from the server computer.

FIG. 5 illustrates another embodiment of the exemplary procedures described above in FIG. 3 and other related exemplary procedures. In this embodiment, the determination is obtained by receiving the determination from the server computer 12 at the MCD 18-1. To detect the MCDs 18 in proximity to the MCD 18-1, the MCD 18-1 broadcasts a probing signal (procedure 3000). As in the previous example described above in FIG. 4, the MCDs 18-2 through 18-4 receive the probing signal directly from the MCD 18-1.

The MCDs 18-2 through 18-4 each broadcast a response to the probing signal having their MCD IDs. The MCD 18-1 then receives the responses to the probing signal from each of the MCDs 18-2 through 18-4 (procedure 3002). In this manner, the MCD 18-1 detects that the MCDs 18-2 through 18-4 are in proximity to the MCD 18-1. Since the MCDs 18-2 through 18-4 are within the transmission range 58 and thus within one (1) hop, the MCD 18-1 receives the responses directly from the MCDs 18-2 through 18-4. The user client 28-1 then transmits the MCD IDs from the responses to the server computer 12 (procedure 3004). The MCD IDs from the responses may be transmitted to the server computer 12 within a request. The request instructs the server computer 12 to search the affinity records 50 on the database 14. The request may include parameters indicating the defined affinity being searched for by the user 20-1, such as friend, friend-of-a-friend, familial, group, and/or the like. Alternatively, the request may simply be configured or addressed to the IASD manager application 38 such that the IASD manager application 38 recognizes the request as being a search involving a particular defined affinity.

The request may also include the MCD ID of the MCD 18-1, the username of user 20-1, user profile identification information for user 20-1, and/or the like, to identify the user 20-1. The request is received by the IASD manager application 38, which recognizes the request as being from the user 20-1. The IASD manager application 38 may operate with the database interface application 42 to search the affinity records 50 according to the defined affinity of the request. For example, the database interface 42 may receive instruction from the IASD manager application 38 and formulate a query for the database 14 accordingly. Upon receiving the query, the database 14 may use the MCD IDs from the responses to search friend lists, family lists, or group lists of the user 20-1. In an embodiment, the database 14 may use the MCD IDs from the responses to search all available database records 46, and may subsequently filter the returned records using the affinity records of user 20-1 to identify relevant users 20. In addition, the IASD Manager Application 38 may search the friends list of other users 20 depending on the defined affinity of the request. In response, the server computer 12 generates a determination that indicates the users 20 associated with MCD IDs that have the defined affinity with the user 20-1. The determination may be affinity output data that includes the resulting MCD IDs from the query. The affinity output data may also include the IASD for the resulting MCD IDs, information that identifies the users 20, and/or information about the users 20.

In an alternative embodiment, the MCDs 18-1 through 18-4 periodically broadcast their MCD IDs through MCD ID announcements. The MCD 18-1 may receive the MCD IDs of the MCDs 18-2 through 18-4 through these announcements. Similarly, MCDs 18-2 through 18-4 may receive the MCD ID of the MCD 18-1 through the announcements. The MCDs 18-1 through 18-4 may also pass IASD to one another.

In this example, the requests instructs the server computer 12 to search the affinity records 50 on the database 14 to find friends of the user 20-1 associated with the MCD IDs of the responses. The determination resulting from the request thus finds the MCD ID of the MCD 18-2 in association with user 20-2 within the friend list of user 20-1. The user client 18-1 then generates a determination that includes the MCD ID of the MCD 18-2 from the affinity record and sends the determination to the MCD 18-1. The MCD 18-1 then receives the determination from the server computer 12 (procedure 3006). In response, the MCD 18-1 establishes a wireless local area networking link based on the determination (procedure 3008). Alternatively, the MCD 18-1 may prompt the user 20-1 before establishing the wireless local area networking link. To establish the wireless local area networking link, the MCD 18-1 may transmit an invitation to the MCD 18-2 using the MCD ID of MCD 18-2 from the determination. In response to the invitation, the MCD 18-1 may then receive an acknowledgment indicating an acceptance of the invitation from MCD 18-2. The acknowledgement may also include set-up information in accordance to the particular wireless local area networking protocol to establish the wireless local area networking link. Alternatively, procedure 3000 and 3002 may not be performed but rather the MCD 18-1 may utilize already established wireless local area networking links to detect the other MCDs. As a result, procedure 3008 may have occurred prior to procedure 3000. If wireless local area networking links have already been established, then an MCD 18, such as a master MCD may be probed for the MCD IDs and IASD on the wireless local area network 22. Alternatively, requests for MCD IDs and IASD may be propagated to through the wireless local area network 22 to obtain this information from other MCDs 18.

After the wireless local area networking link has been established, the MCD 18-1 then communicates over the wireless local area networking link using the IASD (procedure 3010). In this example, the MCD 18-1 communicates over the wireless local area networking link using the IASD provided to secure communications with the MCD 18-2. The IASD may be provided with the determination or through other procedures as explained in further detail below. In this manner, the MCD 18-1 generates the communication packets according to the wireless local area networking protocol utilized to communicate over the wireless local area networking link. The MCD 18-1 transmits the communication packet, and thus the data encrypted using the IASD, to the MCD 18-2 over the wireless local area networking link. Note that the MCD 18-1 communicates over the wireless local area networking link with the MCD 18-2 as a result of the determination that the user 20-2 associated with the MCD 18-2 is a friend of the user 20-1 on the social network.

Accordingly, as shown by procedures 3000, 3002, and 3010 in FIG. 5, the MCD 18-1 implements one embodiment of the exemplary procedures discussed above in FIG. 3. Procedures 3000 and 3002 in FIG. 5 are one implementation of the exemplary procedure 1000 in FIG. 3. Procedure 3010 in FIG. 5 is one implementation of exemplary procedure 1002 in FIG. 3.

Figure 6:
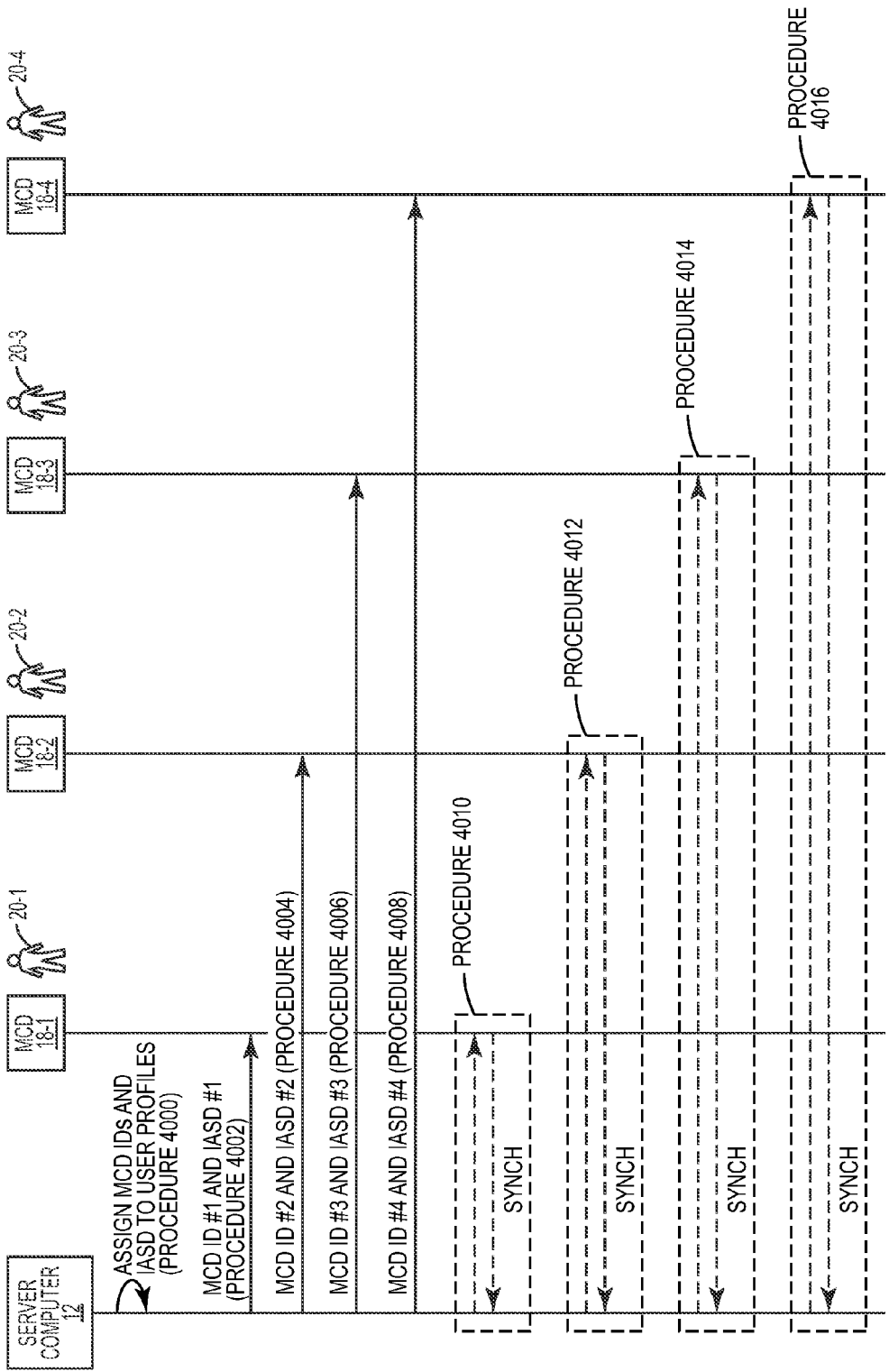
FIG. 6 is a communication flow graph illustrating one implementation of an exemplary procedure in FIG. 4 where the server computer assigns mobile communication device identifications (MCD IDs) and information access security data (IASD) to the MCDs and the MCDs receive their MCD IDs and IASD from the server computer.

FIG. 6 illustrates an embodiment of the exemplary procedure 2000 and 2002 in FIG. 4 and other related exemplary procedures. In this embodiment, the server computer 12, through the IASD manager application 38, assigns the MCD IDs and the IASD to the user profiles of each of the users 20-1 through 20-4 (procedure 4000). Note that in some embodiments, the MCD IDs may either be generated by the server computer 12, or may be provided by the MCDs 18 to the server computer 12 for association with user profiles of the corresponding users 20. In this embodiment, MCD ID #1 has been assigned by the server computer 12 to identify MCD 18-1. Similarly, MCD ID #2, MCD ID #3, and MCD ID #4 have been assigned to identify the MCD 18-2, the MCD 18-3, and the MCD 18-4, respectively. The server computer 12, through the IASD manager application 38, has assigned IASD #1 to secured communications with MCD 18-1. Similarly, IASD #2, IASD #3, and IASD #4 have been assigned to secure communications with the MCD 18-2, the MCD 18-3, and the MCD 18-4, respectively. At some point, the IASD manager application 38 sends the MCD ID #1 and the IASD #1 assigned to the user profile 48-1 to the MCD 18-1 via the wide area network 16. Similarly, the IASD manager application 38 sends the MCD ID #2 and the IASD #2, the MCD ID #3 and the IASD #3, and the MCD ID #4 and the IASD #4 to each of respective MCDs 18-1 through 18-4 on the wide area network 16. Thus, the MCD 18-1 receives MCD ID #1 and IASD #1 from the server computer 12 (procedure 4002). The MCD 18-2 also receives MCD ID #2 and IASD #2 to MCD 18-2 from the server computer 12 (procedure 4004). In addition, the MCD 18-3 receives MCD ID #3 and IASD #3 from the server computer 12 (procedure 4006). MCD 18-4 receives MCD ID #4 from the server computer 12 (procedure 4008).

The communications between the server computer 12 and the MCDs 18-1 through 18-4 may be over secure connections, for example, using protocols such as SSL, TLS, HTTPS and the like. Furthermore, the server computer 12 may send the MCD ID #1 through #4 IASD #1 through #4 to the MCDs 18-1 through 18-4 either proactively (using a push mechanism), or when requested by the MCDs (using a pull mechanism), or by combinations thereof. For example, the MCD IDs may be sent to the MCDs 18 whenever a user 20 logs in to the social network using the web browser 30.

Next, the MCD 18-1 is synchronized with the server computer 12 to receive the MCD IDs and the IASDs from the affinity records 50 of the user profile 48-1 on the database 14 (procedure 4010). The MCD IDs and the IASD are stored in the affinity records stored on the MCD 18-1. To do this, the synchronization application 40 of the server computer 12 may communicate directly with the user client 18-1. Alternatively, the MCD 18-1 may be connected to a personal computer also associated with the user 20-1. Applications on the personal computer may coordinate communications between the synchronization application 40 and the user client 18-1. In this example, the MCD 18-1 includes a local copy of the friend list. As a result of the synchronization, the friend lists stored on the MCD 18-1 is updated with the MCD ID #2 and IASD #2 of MCD 18-2 associated with user 20-2 through the synchronization. Other affinity records, such as family lists or group lists also stored on the MCD 18-1, may also be updated. Alternatively, a contact list on the MCD 18-1 may be supplemented with the updated information from the server computer 12. Similarly, the MCD 18-2, MCD 18-3, and MCD 18-4 may be synchronized with the server computer 12 to update local copies of affinity records (procedures 4012, 4014, 4016).

Figure 7:
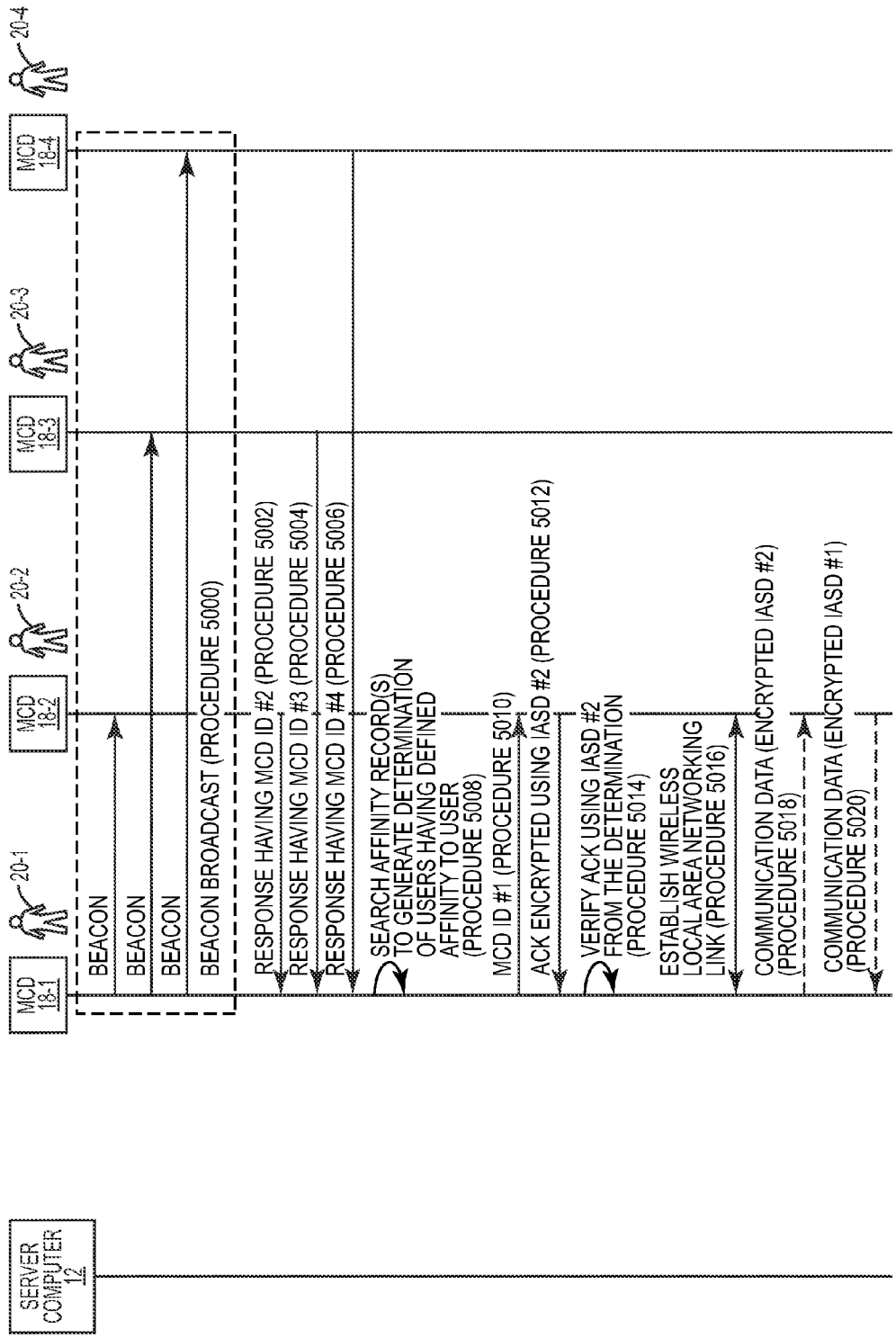
FIG. 7 is a communication flow graph illustrating implementations of exemplary procedures shown in FIG. 4 where the MCD generates the determination that users have the defined affinity on the social network utilizing affinity records stored locally on the MCD and where the MCD verifies another MCD.

FIG. 7 illustrates embodiments of the procedures described above for FIG. 4, and other exemplary procedures. In this embodiment, MCD 18-1 broadcasts a beacon using the wireless local area networking service (procedure 5000). It should be understood that the term "beacon" used here is only exemplary and is not meant to restrict the scope of this disclosure to a specific wireless local area networking technology, protocol, or configuration or to a specific detection mechanism. In general, the beacon may refer to a specially crafted packet broadcast over the wireless medium by a MCD 18 that may be detected by other nearby MCDs 18 within transmission range or within a defined number of hops, either for the purposes of announcing its presence to the other MCDs 18, or for the purposes of detection of the other MCDs 18, which may detect the packet and respond by broadcasting their own identifying information, or for both. As mentioned earlier, the beacon may be part of the underlying physical or MAC layer protocol or a higher layer protocol, and depending on the protocol used, the beacon may or may not contain identification information of the MCD that broadcasts it.

In this example, the beacon requests that MCDs in proximity with the MCD 18-1 identify themselves and may include wireless local area networking information for forming the wireless local area networking link with the MCD 18-1. For example, the beacon may include a defined number of wireless local area networking hops. The defined number may be one (1) hop in this case. Upon receiving the beacon, the MCD 18-2 generates a response having the MCD ID #2, as well as other wireless local area networking information. The MCD 18-2 sends and the MCD 18-1 receives the response having MCD ID #2 from MCD 18-2 (procedure 5002). In this manner, the MCD 18-1 detects that the MCD 18-2 is within the proximity. Similarly, the MCDs 18-3 and 18-4 generate responses having MCD ID #3, and MCD ID #4, respectively, which are received by the MCD 18-1 to detect the MCDs 18-3, 18-4 (procedures 5004, 5006). Note that these responses may be transmitted by broadcast means, since wireless communication is typically over a broadcast medium. As such, the responses transmitted by MCDs 18-2 through 18-4 in procedures 5002 through 5006 may be detected by some or all of MCDs 18-2 through 18-4 depending on which MCDs 18 are within transmission range of each other. In this manner, MCDs 18 other than MCD 18-1 may detect each other by detecting these responses, which may further expedite the overall detection process across all MCDs 18-1 through 18-4.

The MCD 18-1 then searches the affinity records stored on the MCD 18-1 to generate a determination of the users 20-2 through 20-4 having a defined affinity to user 20-1 (procedure 5008). In this example, the MCD 18-1 searches a local copy of the friends list for MCD ID #2, MCD ID #3, and MCD ID #4. Since user 18-2 is listed as a friend of the user 18-1, the determination includes the MCD ID #2 of the user 20-2, as well as other information identifying the user 20-2. The user client 28-1 may present a selection screen to the user 20, through the GUI application 32-1, asking the user 20-1 whether to establish a wireless local area networking link with the MCD 18-2 of user 20-2. The selection screen may present information identifying the user 20-2 as well as the MCD 18-2. Virtual selection buttons may also be presented to the user 20-1 to select whether to establish the wireless local area networking link. Alternatively, the MCD 18-1 may automatically select to establish the wireless local area networking link with the MCD 18-2. For example, the MCD 18-1 may include default settings that the wireless local area networking link should be established with the MCD 18-2 whenever the MCD 18-2 is in proximity.

If the user 20-2 selects to establish the wireless local area networking link between the MCD 18-1 and the MCD 18-2, the MCD 18-1 may implement a verification process to verify that MCD 18-2 is actually the MCD 18-2 and not an eavesdropper. To begin, the MCD 18-1 transmits the MCD ID #1 to the MCD 18-2 (procedure 5010). Alternatively, the MCD 18-1 may instead transmit an authentication request message containing no identifying information, and may avoid identifying itself until the MCD 18-2 has authenticated MCD 18-2. Upon receiving the MCD 18-2, the MCD 18-2 may then generate an acknowledgement encrypted (or digitally signed) using the IASD #2. Referring again to the embodiment in FIG. 7, upon receiving the MCD 18-2, the MCD 18-2 may then generate an acknowledgement encrypted using the IASD #2. The acknowledgement encrypted using the IASD #2 is sent by the MCD 18-2 and received by the MCD 18-1 (procedure 5012). In response, the MCD 18-1 finds the IASD #2 provided to secure communications with the MCD 18-2 in the friends list. The MCD 18-1 verifies acknowledgement using the IASD #2 from the friends list (procedure 5014). In this embodiment, the MCD 18-1 decrypts the acknowledgement using the IASD #2. In another embodiment, the MCD 18-1 may cryptographically verify the digital signature using IASD #2. If the acknowledgement can be decrypted and/or its digital signature cryptographically verified using the IASD #2 then the MCD 18-1 has verified that the acknowledgement is in fact from the MCD 18-2. This method of verification may be utilized for example if the MCD 18-1 and/or the MCD 18-2 do not have access or have a poor connection to the server computer 12. In some embodiments, if the MCD 18-2 has access to IASD #1, the process may be repeated with the roles of MCD 18-1 and 18-2 reversed, whereby the MCD 18-2 verifies the identity of MCD 18-1 using IASD #1 using encryption or digital signing methods.

Upon verifying the MCD 18-2, the MCD 18-1 established a wireless local area networking link between the MCD 18-1 and the MCD 18-2 (procedure 5016). The MCD 18-1 may then transmit communication data encrypted using the IASD #2 to the MCD 18-2 over the wireless local area networking link (procedure 5018). Similarly, the MCD 18-1 may receive communication data encrypted using the IASD #1 from the MCD 18-2 over the wireless local area networking link (procedure 5020). Alternatively, the communications between MCD 18-1 and 18-2 may be encrypted using a combination of IASD #1 and IASD #2, for example, using a shared secret key for the session IASD #1/#2 (discussed below) derived from the public and private key-pairs in IASD #1 and IASD #2 by public key exchange methods such as Diffie-Hellman key exchange. In an embodiment, the combined key IASD #1/#2 may be derived from a combination of IASD #1 and IASD #2 and other elements locally-generated by the MCDs 18-1 and 18-2, such as randomly generated numbers.

Accordingly, through procedure 4000 in FIG. 6 and procedures 5000, 5002, 5008, 5016, 5018, 5020, and 5022 in FIG. 7, the MCD 18-1 implements one embodiment of the exemplary procedures discussed above in FIG. 4. Procedure 4000 is one implementation of procedures 2000 and 2002 since during synchronization the MCD 18-1 receives the MCD IDs and stores them in the affinity records locally. Procedure 5000 is one embodiment of the procedure 2004. Procedure 5002 is one embodiment of the procedure 2006. Procedure 5008 is one embodiment of the procedure 2008. Procedure 5016 is one implementation of the procedure 2010. Finally, procedures 5020 and 5022 are implementations of the procedure 2012.

Figure 8:
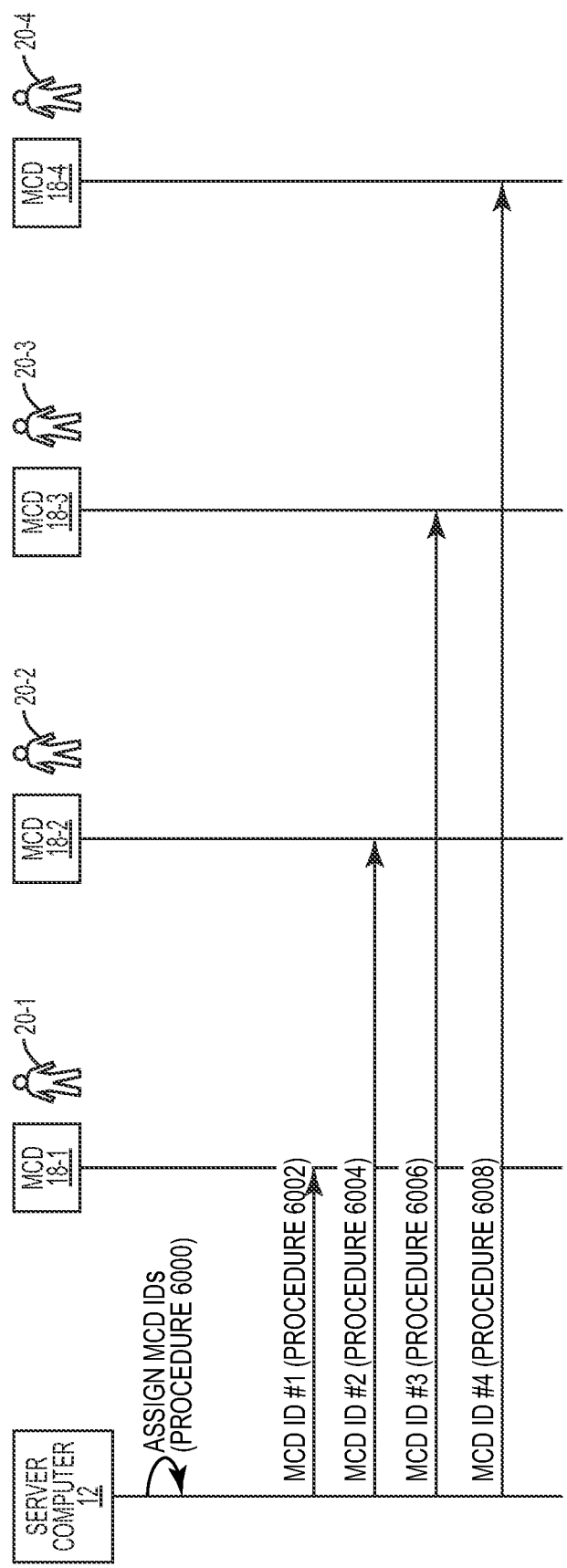
FIG. 8 is a communication flow graph illustrating implementations of exemplary procedures related with the exemplary procedures shown in FIG. 5 where the server computer assigns MCD IDs to the MCDs.

FIG. 8 illustrates procedures associated with embodiments of the exemplary procedures shown in FIG. 5. In this embodiment, the server computer 12, through the IASD manager application 38, assigns the MCD IDs and the IASD to the user profiles of each of the users 20-1 through 20-4 (procedure 6000). In this embodiment, the MCD ID #1 has been assigned by the server computer 12 to identify the MCD 18-1. Similarly, the MCD ID #2, MCD ID #3, and MCD ID #4 have been assigned to identify the MCD 18-2, MCD 18-3, and MCD 18-4, respectively. The server computer 12, through the IASD manager application 38, has assigned the IASD #1 to secure communications with the MCD 18-1. Similarly, the IASD #2, IASD #3, and IASD #4 have been assigned to secure communications with the MCD 18-2, the MCD 18-3, and the MCD 18-4, respectively. The server computer 12 may also update the affinity records 50 of the user profiles 48 with the MCD IDs and the IASDs.

At some point, the IASD manager application 38 sends the MCD IDs assigned to the user profile of each of the users 20-1 through 20-4 to their respective MCDs 18-1 through 18-4. This may be prior to the MCDs 18-1 through 18-4 being in the configuration shown in FIG. 2. In this embodiment, the MCD 18-1 receives the MCD ID #1 from the server computer 12 through the wide area network 16 (procedure 6002). The MCD 18-1 thus utilizes MCD ID #1 to identify itself when utilizing the wireless local area networking service. The MCD 18-2 receives the MCD ID #2 to the MCD 18-2 from the server computer 12 through the wide area network 16 (procedure 6004). The MCD 18-2 thus utilizes the MCD ID #2 to identify itself when utilizing the wireless local area networking service. Next, the MCD 18-3 receives the MCD ID #3 from the server computer 12. The MCD 18-3 receives the MCD ID #3 from the server computer 12 through the wide area network 16 (procedure 6006). The MCD 18-3 thus utilizes the MCD ID #3 to identify itself when utilizing the wireless local area networking service. Finally, the MCD 18-4 receives the MCD ID #4 from the server computer 12 through the wide area network 16 (procedure 6008). The MCD 18-3 thus utilizes the MCD ID #3 to identify itself when utilizing the wireless local area networking service. The server computer 12 may provide the MCD ID #4 to the respective MCDs 18-1 through 20-4 in procedures 6002 to 6008 through a synchronization process, upon request by the respective MCDs 18-1 through 20-4, through a scheduled update process, and/or the like. Note that in some embodiments, the MCD IDs may be provided to the server computer 12 by the MCDs 18 themselves, which may associate the MCD IDs with the respective users 20 of MCDs 18, in which case procedures 6000 through 6008 may be optionally, or alternately, other procedures may be performed to update the server computer 12 if the MCD IDs have changed.

Figure 9:
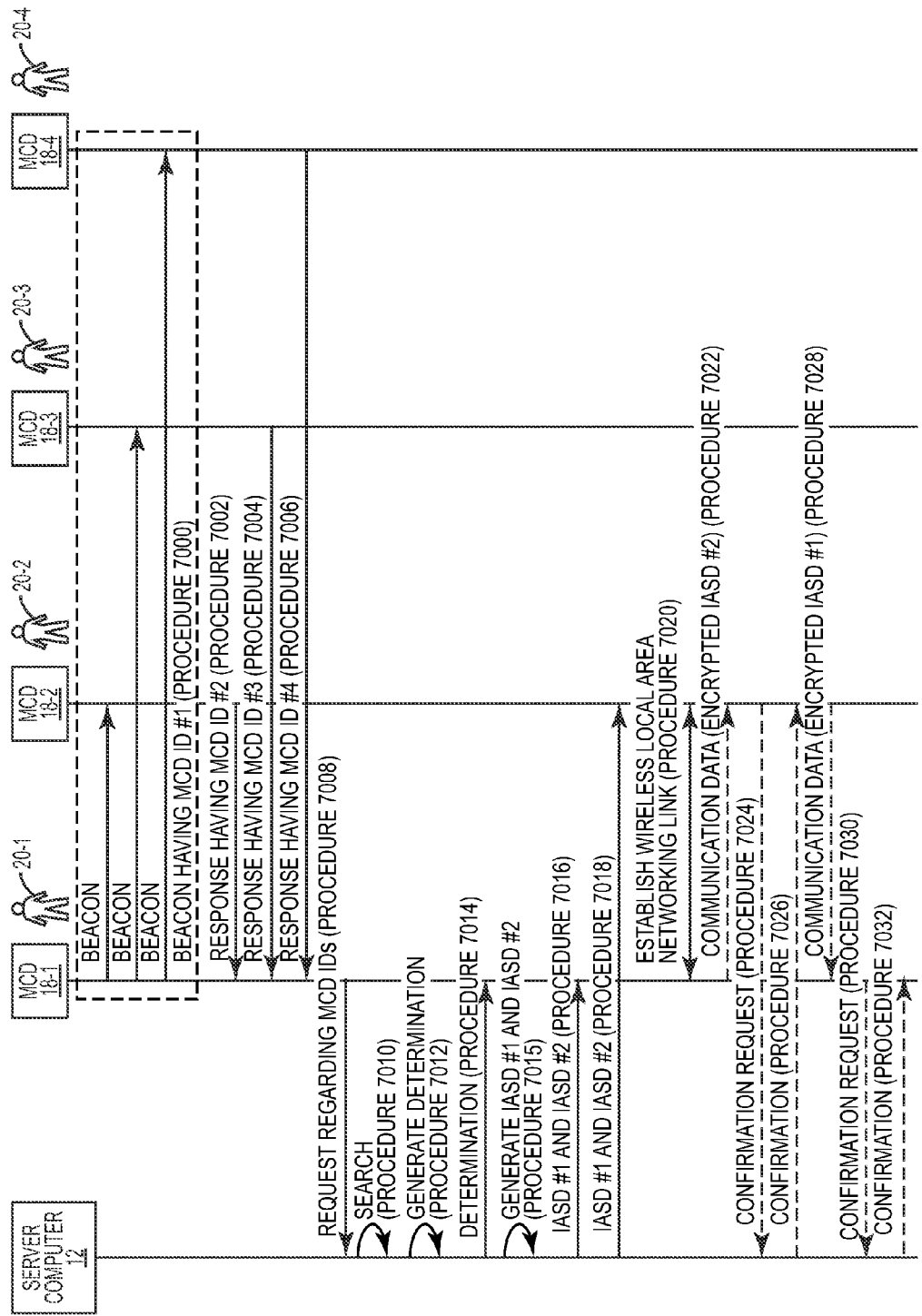
FIG. 9 is a communication flow graph illustrating implementations of exemplary procedures shown in FIG. 5 where the server computer generates the determination that users have the defined affinity on the social network utilizing affinity records stored on the database and where the server computer generates IASD for each communication session and distributes the IASD to the MCDs.

FIG. 9 illustrates an embodiment of the exemplary procedures in FIG. 5 and other related exemplary procedures. It is assumed that the procedures in FIG. 9 occur after the procedures in FIG. 8 have been implemented. In this embodiment, the MCD 18-1 broadcasts a beacon having the MCD ID #1 identifying the MCD 18-1 using the wireless local area networking service (procedure 7000). The beacon requests that the MCD 18 in proximity with the MCD 18-1 identify themselves. In this embodiment, the beacon has the MCD ID #1 to identify the MCD 18-1 wireless local area networking information for forming the wireless local area networking link with the MCD 18-1. For example, the beacon may include a defined number of wireless local area networking hops. In this case, the defined number is one (1) hop. Upon receiving the beacon, the MCD 18-2 generates a response having the MCD ID #2, as well as other wireless local area networking information. The MCD 18-2 sends and the MCD 18-1 receives the response having the MCD ID #2 from the MCD 18-2 using the wireless local area networking service (procedure 7002). In this manner, the MCD 18-1 detects that the MCD 18-2 is within the proximity. Similarly, the MCDs 18-3 and 18-4 generate responses having the MCD ID #3 and the MCD ID #4, respectively, which are received by the MCD 18-1 to detect the MCDs 18-3 and 18-4 (procedures 7004, 7006).

Upon receiving the responses, the MCD 18-1 sends a request to the server computer 12 regarding MCD IDs from the responses through the wide area network 16 (procedure 7008). The request may also include parameters to define the affinity for a determination. In this example, the parameters define the affinity as a friend type relation. Thus, the request is requesting whether the users 20-2 through 20-4 are friends of the user 20-1. The request includes the MCD IDs #2, #3, #4 from the responses. When the server computer 12 receives the request, the server computer 12 performs a search (procedure 7010). In this example, the server computer 12 queries the database 14 to see if the MCD IDs #2, #3, #4 are in the friend list of the user 20-1. The server computer 12 then generates a determination including the MCD IDs for the MCDs 18-2 through 18-4 associated with the users 20-2 through 20-4 having the defined affinity with the user 18-1 (procedure 7012). Since the user 20-2 is listed as a friend in the friend list of the user 20-1, the determination includes the MCD ID #2 of the user 20-2. The MCD IDs #3 and #4 are not included because the users 20-3 and 20-4 are not on the friend list. The server computer 12 sends the determination to the MCD 18-1 through the wide area network 16 (procedure 7014).

The server computer 12 may then generate the IASD #1 and the IASD #2 for securing communications with the MCD 18-1 and the MCD 18-2 over the wireless local area communications link, respectively (procedure 7015). Note that in this embodiment, the server computer 12 provides the MCD IDs and the IASD separately from one another. In this manner, the server computer 12 can generate the IASD for each potential wireless local area communications session involving the MCD 18-1 and MCD 18-2. This reduces the probability that an eavesdropper can utilize the previously obtained IASD to masquerade as the MCD 18-1 and/or MCD 18-2. Alternatively, the generated IASD #1 and IASD #2 may be discarded after a time period.

The server computer 12 sends the IASD #1 and the IASD #2 over the wide area network 16 to the MCD 18-1. The MCD 18-1 thereby receives the IASD #1 and the IASD #2 from the server computer 12 (procedure 7016). The server computer 12 also sends the IASD #1 and the IASD #2 independently over the wide area network 16 to the MCD 18-2. The MCD 18-2 thereby receives the IASD #1 and the IASD #2 from the server computer 12 (procedure 7018). Alternatively or additionally, the server computer 12 may instead send an IASD #1/#2 (discussed below) generated by combining IASD #1 and IASD #2 to MCDs 18-1 and 18-2, which may contain, for example, a shared secret session key. In this embodiment, the MCD 18-1 is configured to automatically establish the wireless local area networking link with friends. Thus, based on the determination, the MCD 18-1 establishes a wireless local area network link between the MCD 18-1 and the MCD 18-2 (procedure 7020). The user client 28-2 may present a selection screen to the user 20-2, through the GUI application 32-2, asking the user 20-2 whether to establish the wireless local area networking link with the MCD 18-1 of the user 20-1. The selection screen may present information identifying the user 20-1 as well the MCD 18-1. Virtual selection buttons may also be presented to the user 20-2 to select whether to establish the wireless local area networking link. If the user 20-2 selects to establish the wireless local area networking link, the MCD 18-1 established the wireless local area networking link.

Once the wireless local area networking link has been established, the MCD 18-1 may transmit communication data encrypted using the IASD #2 to the MCD 18-2 over the wireless local area networking link (procedure 7022). For example, the MCD 18-1 may generate the communication packets having payload data encrypted using the IASD #2. The communication packet may have a header having the MCD ID #1 as the source of the communication packet and the MCD ID #2 as the destination.

When the MCD 18-2 receives the communication packet from the MCD 18-1, the MCD 18-2 may desire to confirm that the communication packet is in fact from the MCD 18-1. The MCD 18-2 may thus transmit a confirmation request to the server computer 12 having the MCD ID #1 as well as other information identifying the user 20-1 (procedure 7024). In response, the server computer 12 looks up the user profile for the user 20-1 to confirm that the MCD ID #1 has in fact been assigned to the MCD 18-1 of the user 20-1. The server computer 12 then generates a confirmation indicating that the MCD ID #1 has been confirmed by the server computer 12. The MCD 18-2 then receives the confirmation from the server computer 12 through the wide area network 16 (procedure 7026). In this manner, the MCD 18-2 is protected from replay attacks of an intervening eavesdropper.

The MCD 18-1 may then receive communication data encrypted using the IASD #1 to the MCD 18-2 over the wireless local area networking link (procedure 7028). For example, the MCD 18-2 may generate the communication packets having payload data encrypted using the IASD #1. The communication packet may have a header having the MCD ID #2 as the source of the communication packet and the MCD ID #1 as the destination. Once the MCD 18-1 receives the communication packet from the MCD 18-2, the MCD 18-1 may desire to confirm that the communication packet is in fact from the MCD 18-2. The MCD 18-2 may thus transmit a confirmation request to the server computer 12 having the MCD ID #2 as well as other information identifying the user 20-2 (procedure 7030). In response, the server computer 12 looks up the user profile for the user 20-2 to confirm that the MCD ID #2 has in fact been assigned to the MCD 18-2 of the user 20-2. The server computer 12 then generates a confirmation indicating that the MCD ID #2 has been confirmed by the server computer 12. The MCD 18-2 then receive the confirmation from the server computer 12 through the wide area network 16 (procedure 7032). In this manner, the MCD 18-1 is also protected from replay attacks of an intervening eavesdropper. In some embodiments, MCDs 18-1 and 18-2 may encrypt their communications with a shared encryption key derived from a combination of IASD #1 and IASD #2 and (potentially) other elements, such as random numbers, that are generated locally independent of the server computer 12.

Accordingly, through procedures 7000, 7002, 7004, 7006, 7008, 7014, 7020, 7022, 7024, and 7030 in FIG. 9, the MCD 18-1 implements one embodiment of the exemplary procedures discussed above in FIG. 5. Procedure 7000 is one implementation of procedure 3000. Procedures 7002, 7004, and 7006 are implementations of the procedure 3002. Procedure 7008 is one embodiment of the procedure 3004. Procedure 7014 is one embodiment of the procedure 3006. Procedure 7020 is one implementation of the procedure 3008. Finally, procedures 7022 and 7028 are implementations of the procedure 3010.

Figure 10:
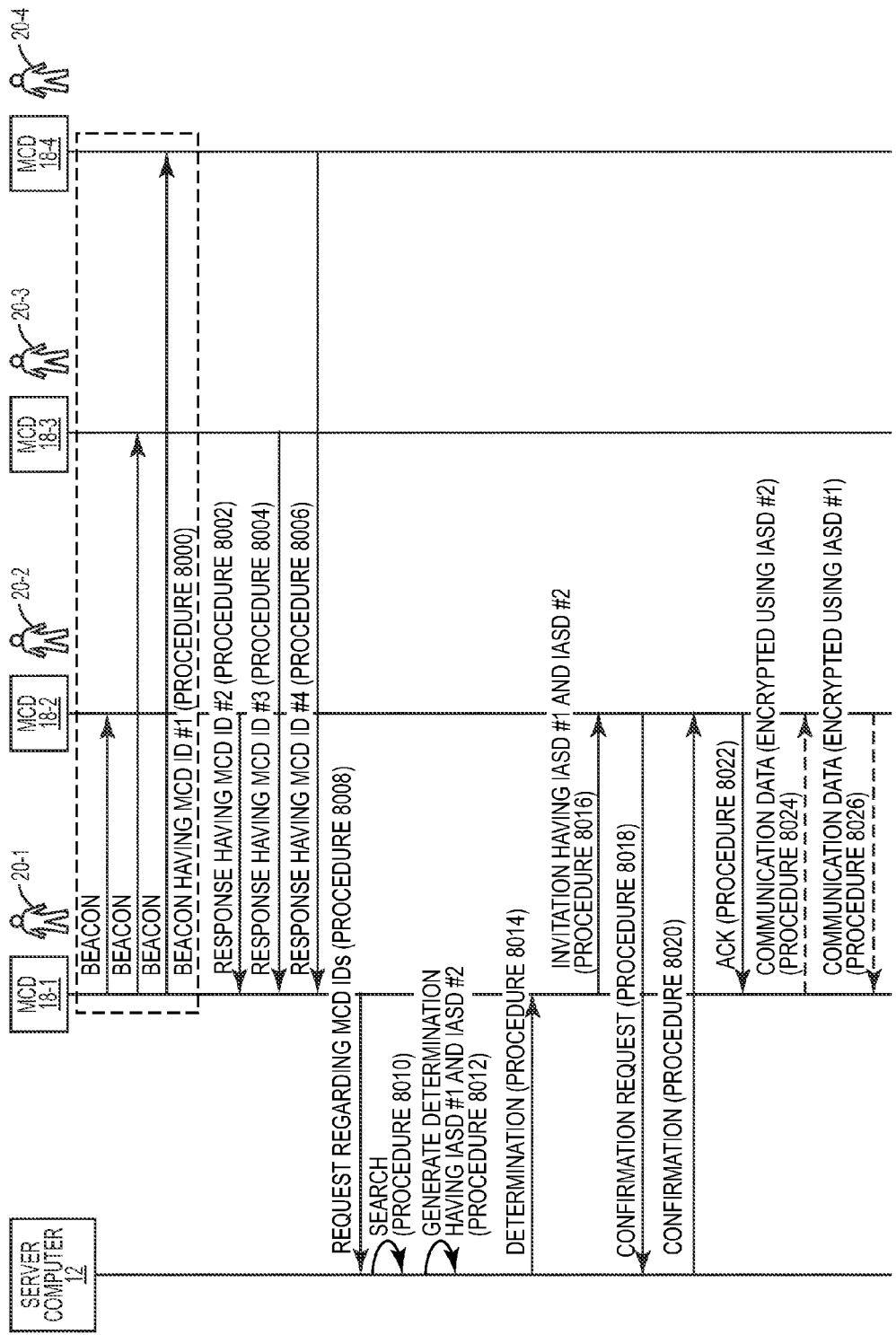
FIG. 10 is a communication flow graph illustrating implementations of exemplary procedures shown in FIG. 5 where the server computer generates the determination that users have the defined affinity on the social network utilizing affinity records stored on the database and where the server computer confirms that the MCD IDs have been assigned by the server computer.

FIG. 10 illustrates another embodiment of the exemplary procedures in FIG. 5 and other related exemplary procedures. As in FIG. 9, FIG. 10 also assumes that the procedures in FIG. 8 have already been implemented. In this embodiment, the server computer 12 generates new MCD IDs and IASD for a communication session. To begin, the MCD 18-1 broadcasts a beacon having the MCD ID #1 using the wireless local area networking service (procedure 8000).

Upon receiving the beacon, the MCD 18-2 generates a response having the MCD ID #2, as well as other wireless local area networking information. The MCD 18-2 sends and the MCD 18-1 receives the response having the MCD ID #2 from the MCD 18-2 through the wireless local area networking service (procedure 8002). In this manner, the MCD 18-1 detects that the MCD 18-2 is within the proximity. Similarly, the MCDs 18-3 and 18-4 generate responses having the MCD ID #3 and the MCD ID #4, respectively, which are received by the MCD 18-1 to detect the MCDs 18-3 and 18-4 (procedures 8004, 8006).

Upon receiving the responses, the MCD 18-1 send a request to the server computer 12 regarding the MCD IDs from the responses through the wide area network 16 (procedure 8008). The request may also include parameters to define the affinity for a determination. In this example, the parameters again define the affinity as a friend type relation. Thus, the request is requesting whether the users 20-2 through 20-4 are friends of the user 20-1. The request includes the MCD IDs #2, #3, and #4 from the responses. When the server computer 12 receives the request, the server computer 12 performs a search (procedure 8010). In this example, the server computer 12 queries the database 14 to see if the MCD IDs #2, #3, and #4 are in the friend list of user 20-1. The server computer 12 then generates the determination including the MCD IDs for the MCDs 18-2 through 18-4 associated with the users 20-2 through 20-4 having the defined affinity with the user 18-1 and having the IASD for securing communications over the wireless local area networking link with the MCD 18-1 and MCD 18-2 (procedure 8012). Since the user 20-2 associated with the MCD 18-2 is listed as a friend in the friends list of the user 20-1, the determination includes the MCD ID #2 and has the IASD #1 and IASD #2 for securing communications with the MCD 18-1 and MCD 18-2 respectively. The IASD #1 and IASD #2 may be generated for every wireless local area networking service as described above for FIG. 9.

The MCD 18-1 receives the determination from the server computer 12 (procedure 8014). Based on the determination, the MCD 18-1 sends an invitation to the MCD 18-2 having the IASD #1 and IASD #2 or a combination of IASD #1 and IASD #2 (procedure 8016). Once the MCD 18-2 receives the invitation from the MCD 18-1, the MCD 18-2 may desire to confirm that the invitation is in fact from the MCD 18-1. The MCD 18-2 may thus transmit a confirmation request to the server computer 12 having the MCD ID #1, the IASD #1, and IASD #2 as well as other information identifying the user 20-1 and 20-2 (procedure 8016). In response, the server computer 12 looks up the user profiles for the user 20-1 and user 20-2 to confirm that the MCD ID #1, IASD #1, and IASD #2 have in fact been assigned by the server computer 12. The server computer 12 then generates a confirmation indicating that the MCD ID #1, IASD #1, and IASD #2 have been confirmed. The MCD 18-2 then receives the confirmation from the server computer 12 through the wide area network 16 (procedure 8018). As a result, the MCD 18-2 is protected from an intervening eavesdropper. In response to receiving the confirmation, the MCD 18-2 may generate an acknowledgment accepting the invitation. The MCD 18-1 receives the acknowledgement from the MCD 18-2 using the wireless local area networking service (procedure 8022). The acknowledgement includes networking information from the MCD 18-2 to establish the wireless local area networking link. In this manner, the wireless local area networking link between the MCD 18-1 and the MCD 18-2 is established. The MCD 18-1 may then transmit communication data encrypted using the IASD #2 to the MCD 18-2 over the wireless local area networking link (procedure 8024). Similarly, the MCD 18-1 may receive communication data encrypted using the IASD #1 from the MCD 18-2 over the wireless local area networking link (procedure 8026).

Accordingly, through procedures 8000, 8002, 8004, 8006, 8008, 8014, 8016, 8022, 8024, and 8026 in FIG. 10, the MCD 18-1 implements one embodiment of the exemplary procedures discussed above in FIG. 5. Procedure 8000 is one implementation of procedure 3000. Procedures 8002, 8004, and 8006 are implementations of the procedure 3002. Procedure 8008 is one implementation of the procedure 3004. Procedure 8014 is one implementation of the procedure 3006. Procedures 8016 and 8022 are implementations of the procedure 3008. Finally, procedures 8024 and 8026 are implementations of the procedure 3010.

Figure 11A:
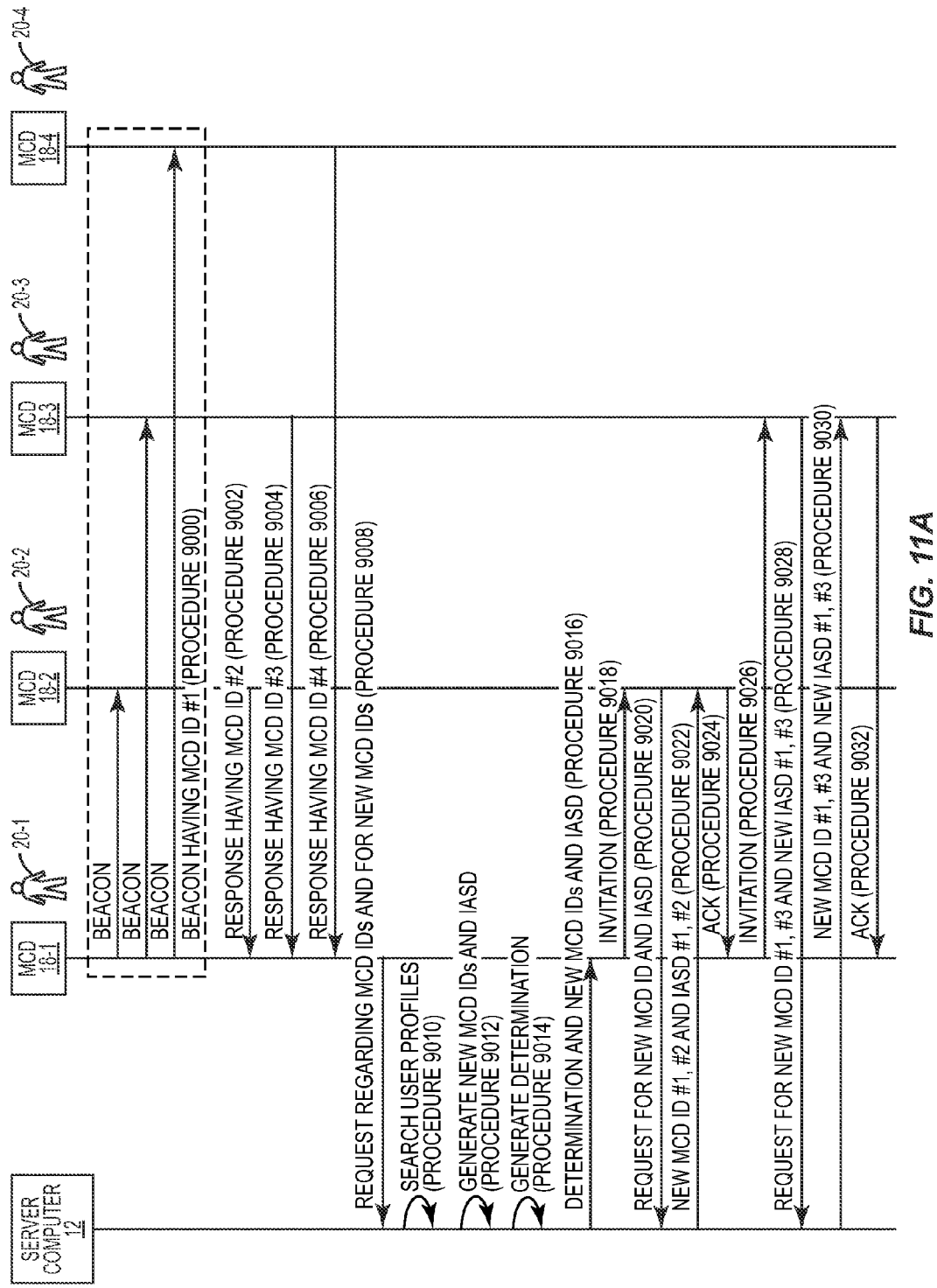
FIGS. 11A and 11B are communication flow graphs illustrating implementations of exemplary procedures shown in FIG. 5 where the server computer generates the determination that users have the defined affinity on the social network utilizing affinity records stored on the database and where the server computer assigns new MCD IDs and IASD for a communication session.
Figure 11B:
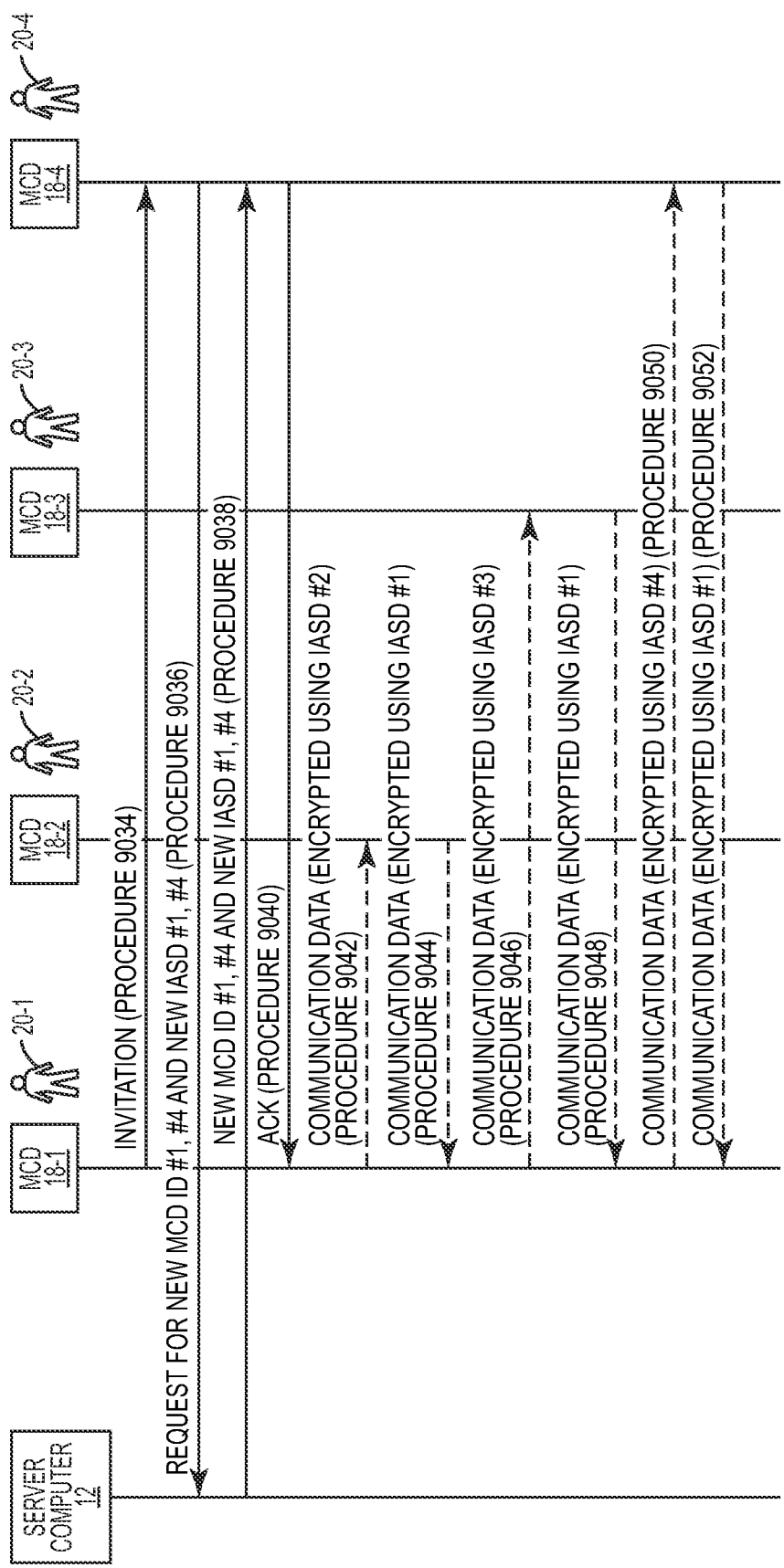

FIGS. 11A and 11B illustrates an embodiment of the exemplary procedures in FIG. 5 and other related exemplary procedures. As with FIGS. 9 and 10, FIGS. 11A and 11B also assume that the procedures in FIG. 8 have also been implemented. In this embodiment, the MCD 18-1 broadcasts a beacon having the MCD ID #1 (procedure 9000). Upon receiving the beacon, the MCD 18-2 generates a response having the MCD ID #2, as well as other wireless local area networking information. The MCD 18-2 sends and the MCD 18-1 receives the response having the MCD ID #2 from the MCD 18-2 (procedure 9002). In this manner, the MCD 18-1 detects that the MCD 18-2 is within the proximity. Similarly, the MCDs 18-3 and 18-4 generate responses having the MCD ID #3 and MCD ID #4, respectively, which are received by the MCD 18-1 to detect the MCDs 18-3 and 18-4 (procedures 9004, 9006).

Upon receiving the responses, the MCD 18-1 sends a request through the wide area network 16 to the server computer 12 regarding MCD IDs from the responses (procedure 9008). The request may also include parameters to define the affinity for a determination. In this example, the parameters define the affinity as a friendship relationship within 3 degrees of separation. Thus, the request is requesting whether the users 20-2 through 20-4 are friends or friends-of-a-friend less than 3 degrees of separation from the user 20-1. The request includes the MCD IDs #2, #3, #4 from the responses. When the server computer 12 receives the request, the server computer 12 performs a search of the user profiles 46 (procedure 9010). In this example, the server computer 12 queries the database 14 to see if the MCD IDs #2, #3, and #4 are in the friend list of user 20-1. Here, the server computer 12 finds the MCD ID #2 within the friend list. Next, the server computer 12 checks the permissions data 52 of the friends to see which friends allow friends to use information on their friends lists. For the friends having the appropriate permissions, the server computer 12 queries the database 14 to see if the MCD IDs #3 and #4 are in the friend list of the friends of user 20-1. Here, the server computer 12 finds the MCD ID #3 within the friend list of the friends of user 20-1. Next, the server computer 12 checks the permissions data 52 of the friends of the friends of user 20-1 to see which friends of the friends allow friends of the friends (or friends-of-friends within 2 degrees of separation) to use information on their friends' lists. For the friends of the friends having the appropriate permissions, the server computer 12 queries the database 14 to see if MCD ID #4 is in the friend list of the friends of the friends of user 20-1. Here, the server computer 12 finds the MCD ID #4 within the friend list of the friends of user 20-1. The server computer 12 may then generate new MCD IDs and IASD for the communication session (procedure 9012). Next, the server computer 12 also generates a determination including the old MCD IDs and in addition, the new MCD IDs and the IASD (procedure 9014). In this example, the determination includes the old MCD ID #2 through MCD ID #4. The server computer 12 also generates new MCD ID #1 to identify MCD 18-1, new MCD ID #2 to identify MCD 18-2, new MCD ID #3 to identify MCD 18-3, and MCD ID #4 to secure communications with MCD 18-4. Furthermore, the server computer 12 also generates IASD #1 to secure communications with MCD 18-1, IASD #2 to secure communications with MCD 18-2, IASD #3 to secure communications with MCD 18-3, and IASD #4 to secure communications with MCD 18-4. New MCD IDs and IASD may be generated for every wireless local area communication session with the MCDs 18-1 through 18-4. The determination, the new MCD IDs, and the IASD may be received by the MCD 18-1 from the server computer 12 through the wide area network 16 (procedure 9016).

Based on the determination, the MCD 18-1 sends an invitation to the MCD 18-2 (procedure 9018). Upon receiving the invitation, the MCD 18-2 may send a request for the new MCD IDs and IASD for the wireless local area networking link between the MCD 18-1 and MCD 18-2 to the server computer 12 (procedure 9020). The MCD 18-2 receives the MCD ID #1, MCD ID #2, IASD #1, and IASD #2 from the server computer 12 in response to the request (procedure 9022). Upon receiving the new MCD IDs and the IASD, the MCD 18-2 sends an acknowledgement accepting the invitation to the MCD 18-1. Accordingly, the MCD 18-1 receives acknowledgement from the MCD 18-2 (procedure 9024). In this manner, the wireless local area networking link is established between the MCD 18-1 and the MCD 18-2.

Next, based on the determination, the MCD 18-1 sends an invitation to the MCD 18-3 (procedure 9026). Upon receiving the invitation, the MCD 18-3 may also generate a request for the new MCD IDs and IASD for the wireless local area networking link between the MCD 18-1 and MCD 18-3 (procedure 9028). Then, the MCD 18-3 receives the MCD ID #1, MCD ID #3, IASD #1, and IASD #3 from the server computer 12 in response to the request (procedure 9030). Upon receiving the new MCD IDs and IASD, the MCD 18-3 sends an acknowledgement accepting the invitation to the MCD 18-1. Accordingly, the MCD 18-1 receives the acknowledgement from the MCD 18-3 (procedure 9032). In this manner, the wireless local area networking link is established between the MCD 18-1 and MCD 18-3.

Next, based on the determination, the MCD 18-1 sends an invitation to the MCD 18-4 (procedure 9034). Upon receiving the invitation, the MCD 18-4 may also generate a request for the new MCD IDs and IASD for the wireless local area networking link between the MCD 18-1 and the MCD 18-3 (procedure 9036). Then, the MCD 18-4 receives new MCD ID #1, new MCD ID #4, IASD #1, and IASD #4 from the server computer 12 in response to the request (procedure 9038). Upon receiving the new MCD IDs and IASD, the MCD 18-4 sends an acknowledgement accepting the invitation to the MCD 18-1. Accordingly, the MCD 18-1 receives the acknowledgement from the MCD 18-4 (procedure 9040). In this manner, the wireless local area networking link is established between the MCD 18-1 and the MCD 18-4. Once the wireless local area networking links have been established, the MCD 18-1 may distribute the new MCD ID #3 of MCD 18-3 and the new MCD ID #4 of the MCD 18-4 to the MCD 18-2 so that the MCD 18-2 can send the communication packets addressed to the MCD 18-3 and the MCD 18-4. Similarly, the MCD 18-3 may receive the MCD ID #2 and MCD ID #4. Furthermore, the MCD 18-4 may receive the MCD ID #2 and the MCD ID #3.

The MCD 18-1 may then transmit communication data encrypted using the IASD #2 to the MCD 18-2 over the wireless local area networking link (procedure 9042). The communication data may be addressed using the new MCD ID #2. Similarly, the MCD 18-1 may receive communication data encrypted using the IASD #1 from the MCD 18-2 over the wireless local area networking link (procedure 9044). The communication data may be addressed using the new MCD ID #1. In addition, the MCD 18-1 may then transmit communication data encrypted using IASD #3 to the MCD 18-3 over the wireless local area networking link between the MCD 18-1 and the MCD 18-3 (procedure 9046). The communication data may be addressed using the new MCD ID #3. Similarly, the MCD 18-1 may receive communication data encrypted using the IASD #1 from the MCD 18-3 over the local wireless networking link (procedure 9048). The communication data may be addressed using the new MCD ID #1. Furthermore, the MCD 18-1 may then transmit communication data encrypted using the IASD #4 from the MCD 18-4 over the wireless networking link between the MCD 18-1 and the MCD 18-4 (procedure 9050). The communication data may be addressed using the new MCD ID #4. Similarly, the MCD 18-1 may receive communication data encrypted using the IASD #1 from the MCD 18-4 over the wireless local area networking link (procedure 9052). The communication data may be addressed using the new MCD ID #1. Note that the use of MCD IDs to address communications between the MCDs 18 may be at the application layer, and may not necessarily apply directly for addressing at lower layers such as the transport and MAC layers. The MCD IDs may be mapped to lower layer network addresses using various protocols such as DNS, Bonjour and the like.

The MCD 18-1 thus acts as the master of an ad hoc network, such as a piconet, formed between the MCD 18-1 through MCD 18-4. The MCDs 18-2 through 18-4 have the new MCD ID #1 and the IASD #1 and thus can communicate over their respective wireless local area networking links with the MCD 18-1. If a communication packet is directed between one of the MCDs 18-2 through MCDs 18-4, the MCD 18-1 can decrypt the encrypted data using the IASD #1 and encrypt the data using the appropriate IASD for securing communications to the appropriate destination MCD 18-2 through 18-4. Similarly, the MCD 18-1 can place the appropriate new MCD ID #2 through #4 (or the MAC addresses mapped to those MCD IDs) in the header of the communication packet so that the communication packet reaches the appropriate destination MCD 18-2 through 18-4. In another embodiment, MCDs 18-2 through 18-4 may detect each other via MCD 18-1, obtain their respective IASDs using any of the aforementioned methods, and may encrypt and address their communications using the appropriate IASDs and MCD IDs such that the MCD 18-1 can relay the encrypted data to the appropriate MCD without being able to decrypt it.

Accordingly, through procedures 9000, 9002, 9004, 9006, 9008, 9016, 9018, 9024, 9026, 9032, 9034, 9040, 9042, 9044, 9046, 9048, 9050, and 9052 in FIGS. 11A and 11B, the MCD 18-1 implements one embodiment of the exemplary procedures discussed above in FIG. 5. Procedure 9000 is one implementation of procedure 3000. Procedures 9002, 9004, and 9006 are implementations of the procedure 3002. Procedure 9008 is one embodiment of the procedure 3004. Procedure 9016 is one embodiment of the procedure 3006. Procedures 9018, 9024, 9026, 9032, 9034, and 9040 are implementations of the procedure 3008. Finally, procedures 9042, 9044, 9046, 9048, 9050, and 9052 are implementations of the procedure 3010.

Figure 12:
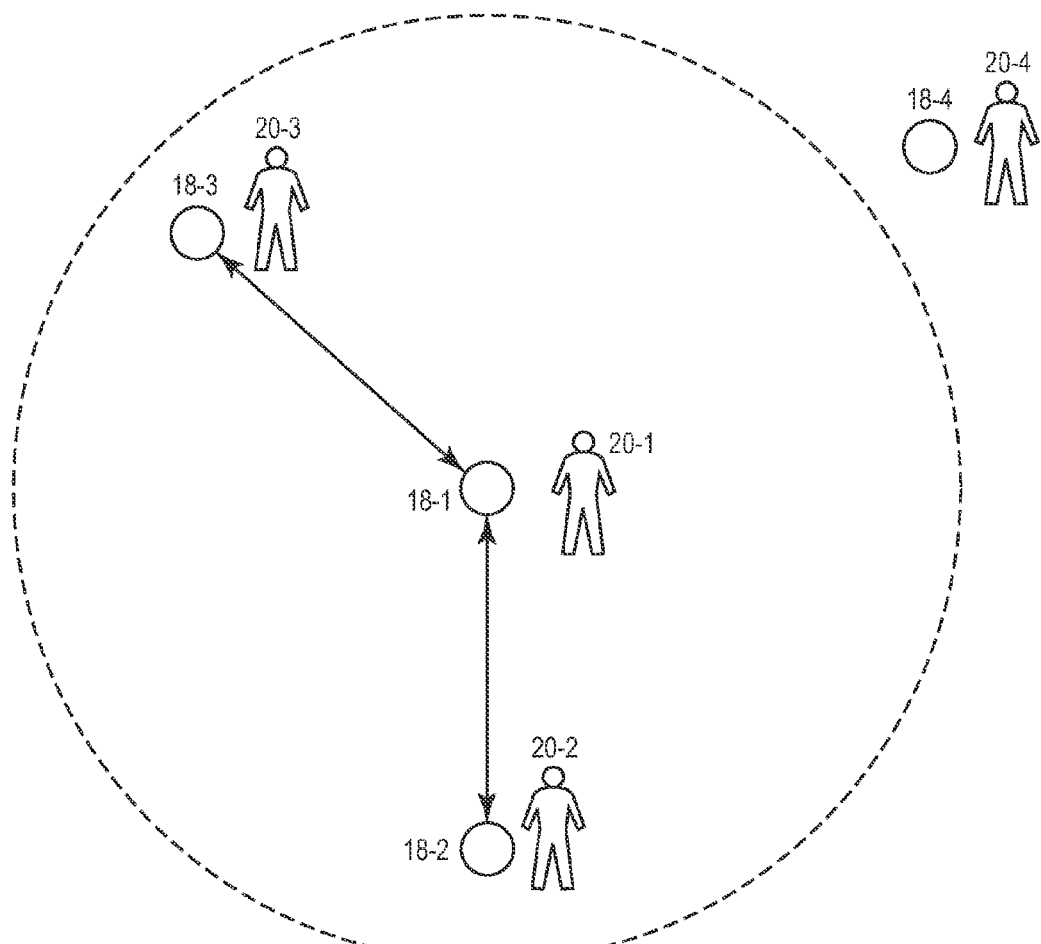
FIG. 12 illustrates one embodiment of the configuration of users and MCDs shown in FIG. 2, where one of the MCDs is outside of the transmission range of the other MCDs.

FIG. 12 illustrates one configuration of the MCD 18-1 and the MCDs 18-2 through 18-4. The configuration is assumed to have occurred after the occurrence of the exemplary procedures in FIG. 4. Also, the MCD 18-2 and 18-3 are within the transmission range 58 of the MCD 18-1, as shown in FIG. 12. However, the MCD 18-4 is outside of the transmission range of all of the MCD 18-1 through 18-3 and the MCD 18-1 through 18-3 is outside the transmission range of MCD 18-4.

Figure 13:
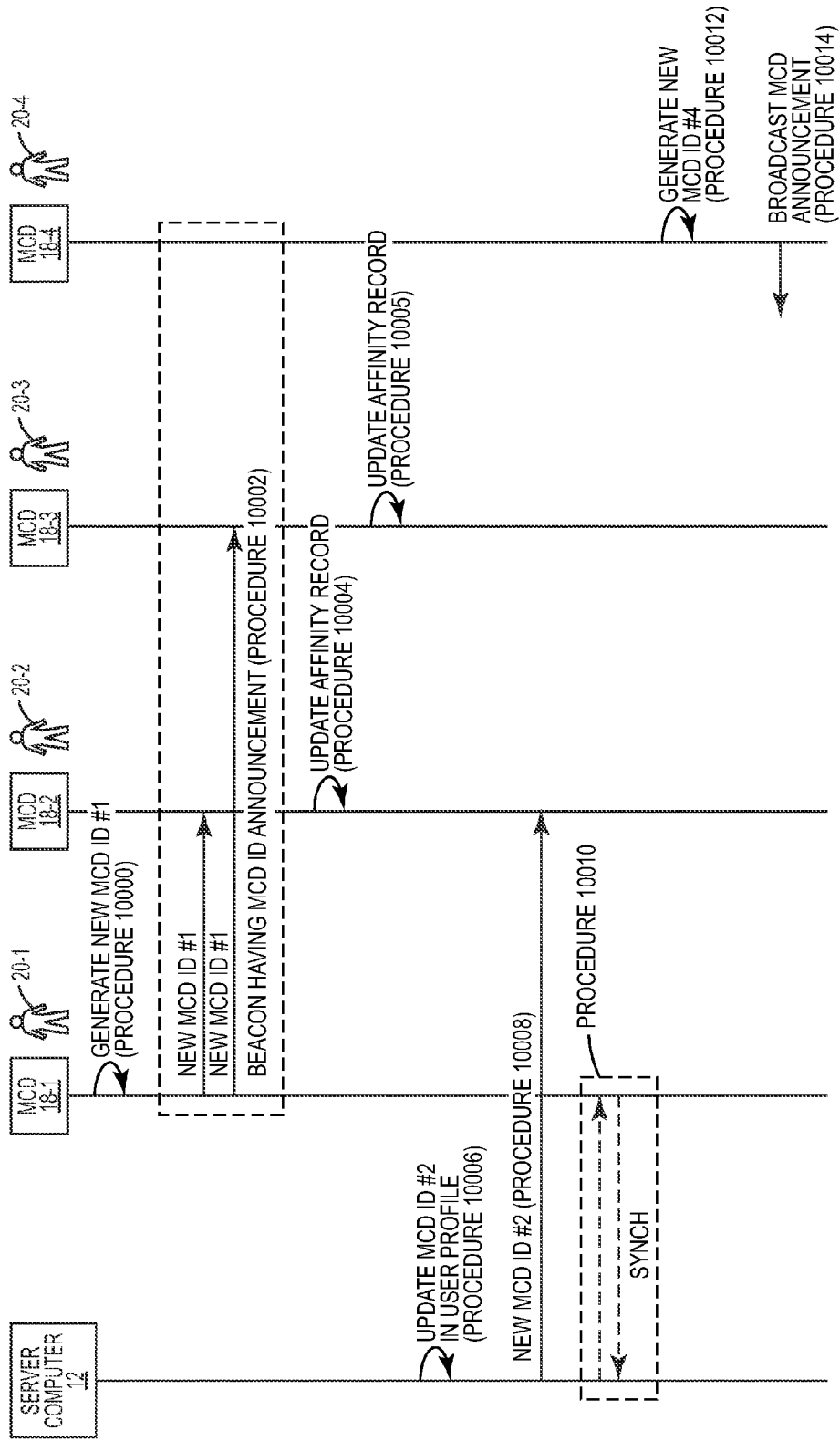
FIG. 13 is a communication flow graph illustrating implementations of exemplary procedures related to the exemplary procedures shown in FIG. 5 where the MCDs self generate MCD IDs.
Figure 14A:
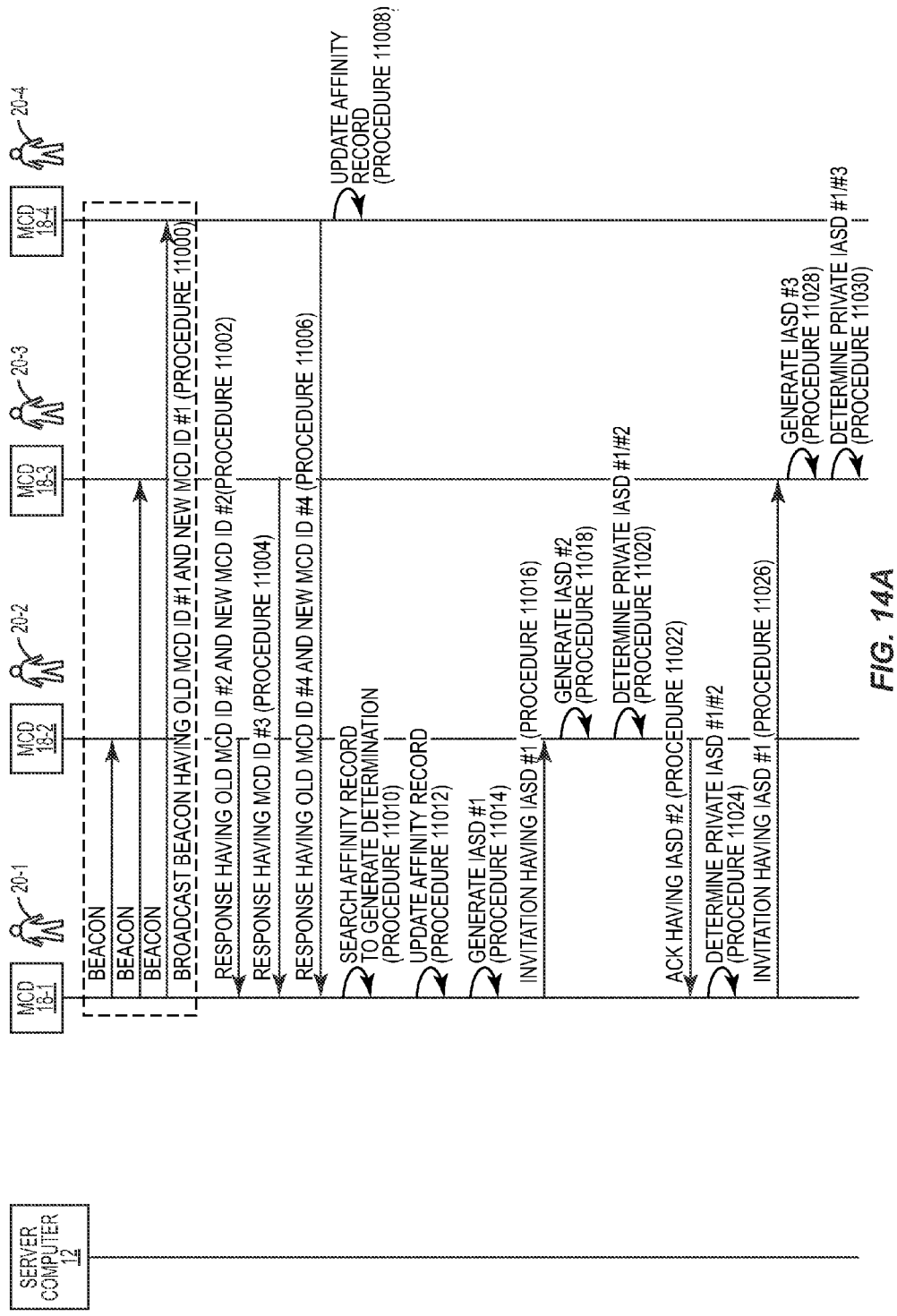
FIGS. 14A and 14B are communication flow graphs illustrating implementations of exemplary procedures shown in FIG. 4 where the MCD generates the determination that users have the defined affinity on the social network utilizing affinity records stored locally on the MCD and where the MCDs self generate IASD.
Figure 14B:
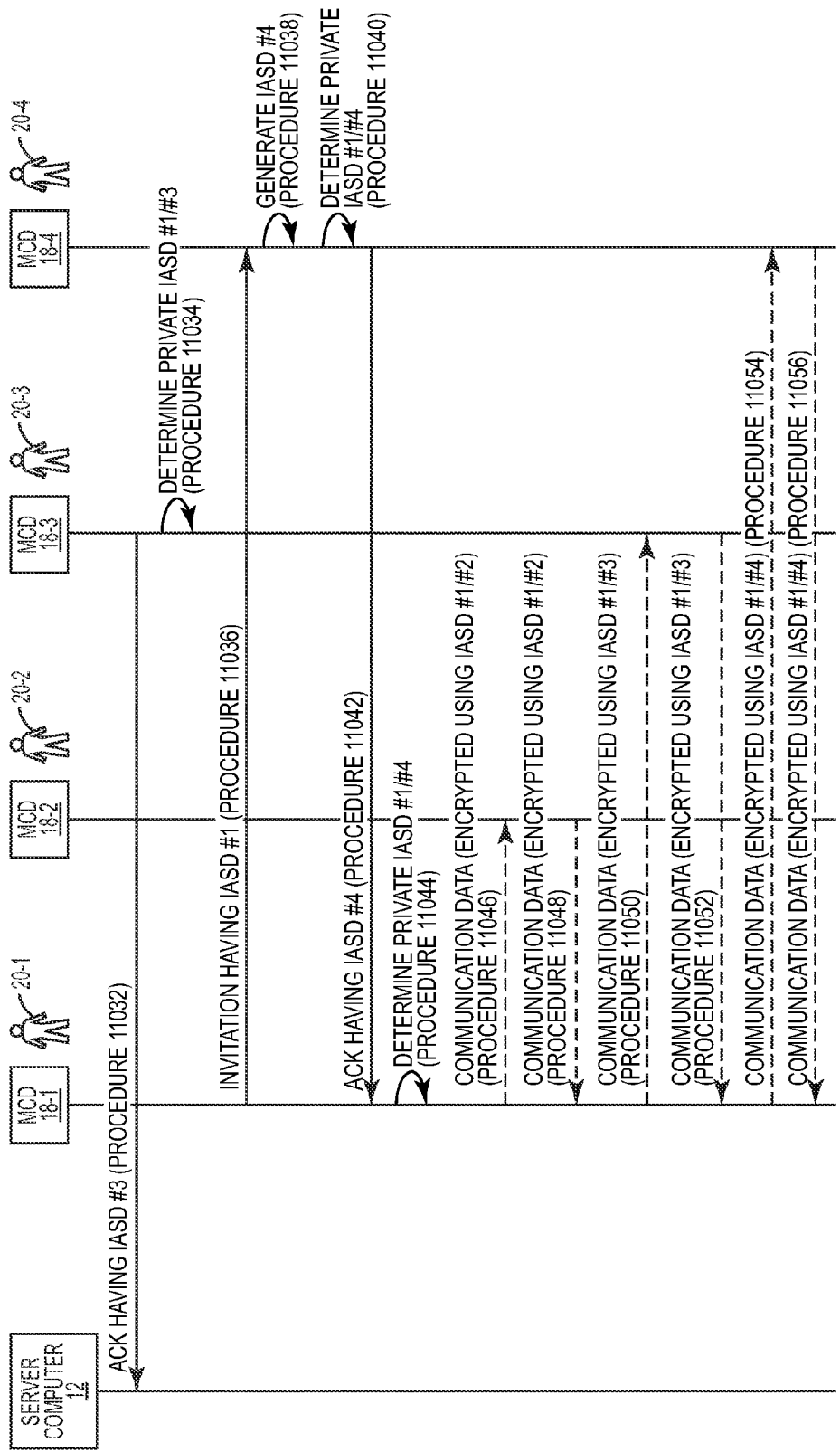

Assuming that the MCDs 18-1 through 18-4 are arranged as shown in FIG. 12, FIG. 13 illustrates various embodiments for updating the MCD IDs of the MCDs 18-1, 18-2, and 18-4. FIGS. 14A and 14B also illustrate one embodiment of the procedures 2000 and 2002 in FIG. 4 and other related procedures. In this embodiment, the MCD 18-1 and the MCD 18-4 self-generate new MCD IDs #1 and #4, respectively. The server computer 12 provides a new MCD ID #2 to the MCD 18-2 after a scheduled update.

Referring to FIG. 13, the user client 28-1 of the MCD 18-1 generates a new MCD ID #1 to identify the MCD 18-1 internally (procedure 10000). The MCD 18-1 then broadcasts an MCD ID announcement having the new MCD ID #1 utilizing the wireless local area networking service (procedure 10002). The MCD ID announcement may also include the old MCD ID #1. As a result, the MCD ID announcement is received by the MCD 18-2 and the MCD 18-4, which are in the transmission range 58 of the MCD 18-1 as shown in FIG. 12. Thus, the MCD 18-1 may pass along the new MCD ID #1 to the other users 20 so the local copies of the affinity records can be updated without the server computer 12. The MCDs 18-2 and 18-3 check their affinity records to see if the MCD IDs in any of their affinity records need to be updated as a result of the MCD ID announcement. In an embodiment, the MCD 18-1 may digitally sign the announcement message with its current IASD #1, such that the MCDs 18-2 and 18-3 can cryptographically verify the announcement if the current IASD #1 is available to them. In this example, the user 20-1 is a friend of user 20-2. Thus, the MCD 18-2 updates a local copy of the affinity record with the new MCD ID #1 (procedure 10004). Similarly, the MCD 18-3 updates a local copy of the affinity record with the new MCD ID #1 (procedure 10005). Nevertheless, the MCD 18-2 and MCD 18-3 continue to store the old MCD ID #1 in their affinity records as well. Alternatively or additionally, the MCD 18-1 may pass along new MCD IDs of other MCDs 18 in the MCD ID announcement that it has received for its affinity records. In this manner, the MCD IDs can be distributed without the server computer 12.

Next, the IASD manager application 38 on the server computer 12 determines that a time period for the MCD ID #2 that identifies the MCD 18-2 has run out. As a result, the server computer 12 updates the user profile 48 of the user 20-2 with a new MCD ID #2 (procedure 10006). The affinity records in the user profiles 48 of other users 20 may also be updated with the new MCD ID #2. The user profile 48 of the user 20-2 and the affinity records of the other users 20 may continue to store the old MCD ID #2 as well. The server computer 12 then sends the new MCD ID #2 to the MCD 18-2. In this manner, the MCD 18-2 receives the new MCD ID #2 after the user profile for the user 20-2 has been updated by the server computer 12 (procedure 10008).

Next, the MCDs 18-1 is synched with the server computer 12 (procedure 10010). During the synch, the user client 18-1 may request that the IASD manager application 38 on the server computer 12 update the user profile of the user 20-1 with the new MCD ID #1. In addition, the affinity records 50 in the user profiles 48 of the other users 20 may be updated with the new MCD ID #1. The user profile 48 of the user 20-1 and the affinity records of the other users 20 may continue to store the old MCD ID #1 as well. In addition, the MCD 18-1 may receive updated MCD IDs for the local copies of the affinity records stored on the MCD 18-1. In this example, the MCD 18-1 receives the new MCD ID #2 of the MCD 18-2 for its affinity records. The affinity record may continue to store the old MCD ID #2 as well.

After the synch between the MCD 18-1 and the server computer 12 has ended, the MCD 18-4 generates a new MCD ID #4 internally (procedure 10012). The MCD 18-4 broadcasts an MCD ID announcement having the new MCD ID #4 (procedure 10014). However, since the MCDs 18-1 through 18-3 are not in the transmission range of the MCD 18-4, none of the MCDs 18-1 through 18-3 have received the new MCD ID #4. Furthermore, the MCD 18-4 has not been synched with the server computer 12 so that the user profile 48-4 of the user 20-4 and the affinity records 50 in the user profiles 48 of the other users 20 are not updated with the new MCD ID #4.

FIGS. 14A and 14B illustrate an embodiment of the procedures 2004 through 2012 in FIG. 4 and other related exemplary procedures. The exemplary procedures described in FIGS. 14A and 14B are assumed to occur after the exemplary procedures in FIG. 13. Furthermore, the MCDs 18-1 through 18-4 are assumed to be back in the configuration shown in FIG. 2. In this embodiment, FIGS. 14A and 14B illustrate embodiments of the procedure when not all the MCDs 18 have received the updated MCD IDs. Furthermore, in this embodiment, the MCDs 18 self-generate IASD.

Referring to FIGS. 14A and 14B, the MCD 18-1 first broadcasts a beacon having the old MCD ID #1 and the new MCD ID #1 using the wireless local area networking service (procedure 11000). By broadcasting the beacon with the old MCD ID #1 and the new MCD ID #1, the MCDs 18 receiving the beacon can identify the MCD 18-1 despite not having received the new MCD ID #1. Upon receiving the beacon, the MCD 18-2 generates a response having the old MCD ID #2 and the new MCD ID #2, as well as other wireless local area networking information. The MCD 18-2 sends and the MCD 18-1 receives the response having the old MCD ID #2 and the new MCD ID #2 from the MCD 18-2 using the wireless local area networking service (procedure 11002). In this manner, the MCD 18-2 can be identified by the MCDs 18 that have not received the new MCD ID #2. However, as shown in FIG. 13, the MCD 18-1 has received the new MCD ID #2 and can detect that the MCD 18-2 is within the proximity using the new MCD ID #2. The MCD 18-2 may check its affinity records to see if the old MCD ID #1 or the new MCD ID #1 is in the affinity records. In this example, the MCD 18-2 finds the new MCD ID #1 within a local copy of a group list from the social network. Based on the setting provided on the MCD 18-2, the MCD 18-2 is set up to automatically accept any invitations for establishing the wireless local area networking links with the MCDs 18 associated with members of the group list. Consequently, the MCD 18-2 is set up to automatically accept an invitation to establish the wireless local area networking link from the MCD 18-1. In an alternate embodiment, the beacon from MCD 18-1 may include a timestamp indicating the time at which it last synched with the server computer 12. Additionally, the MCD 18-2 may maintain a timestamp indicating the time at which the server computer 12 generated and assigned it the new MCD ID #2. By comparing the timestamps, the MCD 18-2 may determine that MCD 18-1 has synched with the server computer (as in procedure 10010) after it generated and assigned the new MCD ID #2 (as in procedures 10006 and 10008). Thus the MCD 18-2 may determine that MCD 18-1 already has the new MCD ID #2. Hence in responding to the beacon (procedure 11002) it may respond only with the new MCD ID #2.

Next, the MCD 18-3 generates a response to the beacon. The response has the MCD ID #3. The MCD 18-3 transmits and the MCD 18-1 receives the response having the MCD ID #3 using the wireless local area networking service (procedure 11004). The MCD 18-3 may check its affinity records to see if the old MCD ID #1 or the new MCD ID #1 is in the affinity records. In this example, the MCD 18-3 finds the new MCD ID #1 within a local copy of a group list from the social network. Based on the setting provided on the MCD 18-3, the MCD 18-3 is also set up to automatically accept any invitations to establish the wireless local area networking links with members of the group list. Consequently, the MCD 18-3 is also set up to automatically accept an invitation to establish the wireless local area networking link from the MCD 18-1.

In addition, the MCD 18-4 generates a response to the beacon. The response has the old MCD ID #4 and the new MCD ID #4. The MCD 18-4 transmits the response so that the MCD 18-1 receives the response having the old MCD ID #4 and the new MCD ID #4 (procedure 11006). The MCD 18-4 may check its affinity records to see if the old MCD ID #1 or the new MCD ID #1 is in the affinity records. In this example, the MCD 18-4 finds the old MCD ID #1 within a local copy of a group list from the social network. A timestamp may be provided with the old MCD ID #1 and the new MCD ID #1 in the beacon. Using the timestamps for the old MCD ID #1 and the new MCD ID #1, the MCD 18-4 determines that the new MCD ID #1 is more current than the old MCD ID #1. As a result, the MCD 18-4 updates its affinity records with the new MCD ID #1 (procedure 11008). Based on the setting provided on the MCD 18-4, the MCD 18-4 is also set up to automatically accept any invitations to establish the wireless local area networking links with the MCDs 18 associated with members of the group list. Consequently, the MCD 18-4 is set up to automatically accept an invitation to establish the wireless local area networking link from the MCD 18-1.

The MCD 18-1 then searches the affinity records stored on the MCD 18-1 to generate a determination of the users 20-2 through 20-4 having a defined affinity to the user 20-1 (procedure 11010). In this example, the MCD 18-1 searches a local copy of the affinity records for the old MCD ID #2, the new MCD ID #2, the MCD ID #3, the old MCD ID #4, and the new MCD ID #4. As shown in FIG. 13, the MCD 18-1 has updated its affinity records with the new MCD ID #2 for the MCD 18-2 of the user 20-2. Since the user 18-2 is listed as a member of the group in the local group list stored on the MCD 18-1, the determination includes the new MCD ID #2 of the user 20-2, as well as other information identifying the user 20-2.

In addition, the MCD 18-1 also finds the MCD ID #3 for the MCD 18-3 within the affinity records because the user 20-3 is also listed as a member of the group list stored on the MCD 18-1. As a result, the determination also includes the MCD ID #3. Finally, the MCD 18-1 also finds the old MCD ID #4 for the MCD 18-4 within the affinity records. As shown by FIG. 13, the MCD 18-1 did not receive the new MCD ID #4 for the MCD 18-4. Utilizing the timestamps for the old MCD ID #4 and the new MCD ID #4, the MCD 18-1 determines that the new MCD ID #4 is more recent than the old MCD ID #4. Thus, the determination includes the new MCD ID #4. Furthermore, the MCD 18-1 updates its affinity records with the new MCD ID #4 (procedure 11012). The MCD 18-1 may include default settings indicating that the wireless local area networking link should be established with the MCDs 18 associated with members of the group list.

The MCD 18-1 includes settings for automatically establishing the wireless local area networking links with the MCDs 18 associated with members of the group list. First, the MCD 18-1 generates the IASD #1 (procedure 11014). Based on the determination, the MCD 18-1 sends an invitation having the IASD #1 to the MCD 18-1 (procedure 11016). In response to the invitation, the MCD 18-2 may generate the IASD #2 (procedure 11018). The IASD #1 and the IASD #2 are not for encrypting communications to the MCD 18-1 and the MCD 18-2. Rather, the IASD #1 and the IASD #2 are each public IASD. Using the IASD #1 and the IASD #2, the MCD 18-2 determines a private IASD #1/#2 (procedure 11020). To do this, the user client 28-2 of the MCD 18-2 implements a mathematical algorithm operable to input the IASD #1 and the IASD #2 and output the private IASD #1/#2 that is the shared secret. Although the IASD #1 and the IASD #2 are public, the IASD #1, the IASD #2, and the mathematical algorithm may be provided such that it would be very difficult for an intervening eavesdropper to determine the private IASD #1/#2 from the IASD #1 and the IASD #2. For example, the IASD #1, the IASD #2, and the mathematical algorithm may be provided in accordance with Diffie-Hellman key exchange methods and the like. The MCD 18-1 then receives an acknowledgement accepting the invitation from the MCD 18-2 (procedure 11022). The acknowledgement includes the IASD #2. Using the IASD #1 and the IASD #2, the MCD 18-1 determines the private IASD #1/#2 (procedure 11024). The user client 28-1 of the MCD 18-1 implements a mathematical algorithm operable to input the IASD #1 and the IASD #2 and output the private IASD #1/#2 that is the shared secret. In this manner, the wireless local area networking link is established between the MCD 18-1 and the MCD 18-2. The private IASD #1/#2 is configured to secure communications with both the MCD 18-1 and the MCD 18-2. Thus, both the MCD 18-1 and the MCD 18-2 may encrypt and decrypt the communication packets communicated over the local wireless networking link using the private IASD #1/#2.

Next, based on the determination, the MCD 18-1 sends an invitation having IASD #1 to the MCD 18-3 (procedure 11026). In response to the invitation, the MCD 18-3 may generate IASD #3 (procedure 11028). The IASD #3 is also the public IASD. Using the IASD #1 and the IASD #3, the MCD 18-3 determines a private IASD #1/#3 (procedure 11030). To do this, the user client 28-3 of the MCD 18-3 implements a mathematical algorithm operable to input the IASD #1 and the IASD #3 and output the private IASD #1/#3 that is the shared secret between the MCD 18-1 and MCD 18-3. The MCD 18-1 then receives an acknowledgement accepting the invitation from the MCD 18-3 (procedure 11032). The acknowledgement includes the IASD #3. Using the IASD #1 and the IASD #3, the MCD 18-1 determines the private IASD #1/#3 (procedure 11034). The user client 28-1 of the MCD 18-1 implements the mathematical algorithm operable to input the IASD #1 and the IASD #3 and output the private IASD #1/#3 that is the shared secret. In this manner, the wireless local area networking link is established between the MCD 18-1 and the MCD 18-2. The private IASD #1/#3 is configured to secure communications with both the MCD 18-1 and the MCD 18-3. Thus, both the MCD 18-1 and the MCD 18-3 may encrypt and decrypt the communication packets communicated over the wireless local area networking link using the private IASD #1/#3.

Finally, based on the determination, the MCD 18-1 sends an invitation having IASD #1 to the MCD 18-4 (procedure 11036). In response to the invitation, MCD 18-4 may generate IASD #4 (procedure 11038). IASD #4 is also public IASD. Using the IASD #1 and the IASD #4, the MCD 18-4 determines a private IASD #1/#4 (procedure 11040). To do this, the user client 28-4 of the MCD 18-4 implements a mathematical algorithm operable to input the IASD #1 and the IASD #4 and output the private IASD #1/#4 that is the shared secret between the MCD 18-1 and MCD 18-4. The MCD 18-1 then receives an acknowledgement accepting the invitation from the MCD 18-4 (procedure 11042). The acknowledgement includes the IASD #4. Using the IASD #1 and the IASD #4, the MCD 18-1 determines the private IASD #1/#4 (procedure 11044). The user client 28-1 of the MCD 18-1 implements the mathematical algorithm operable to input the IASD #1 and the IASD #4 and output the private IASD #1/#4 that is the shared secret. In this manner, the local wireless networking link is established between the MCD 18-1 and the MCD 18-2. The private IASD #1/#4 is configured to secure communications with both the MCD 18-1 and the MCD 18-4. Thus, both the MCD 18-1 and the MCD 18-4 may encrypt and decrypt communication packets communicated over the local wireless networking link using the private IASD #1/#4.

Once the wireless local area networking link has been established between the MCD 18-1 and the MCD 18-2, the MCD 18-1 may then transmit communication data encrypted using the IASD #1/#2 to the MCD 18-2 over the wireless local area networking link (procedure 11046). For example, the MCD 18-1 may generate communication packets having payload data encrypted using the private IASD #1/#2. The communication packet may have a header having the new MCD ID #1 as the source of the communication packet and the new MCD ID #2 as the destination. The MCD 18-1 may also receive communication data encrypted using the IASD #1/#2 to the MCD 18-2 over the wireless local area networking link (procedure 11048). The communication packet may have a header having the new MCD ID #2 as the source address of the communication packet and the new MCD ID #1 as the intermediary address or destination address.

The MCD 18-1 may then transmit communication data encrypted using IASD #1/#3 to the MCD 18-3 over the wireless local area networking link between the MCD 18-1 and the MCD 18-3 (procedure 11050). For example, the MCD 18-1 may generate the communication packets having payload data encrypted using private IASD #1/#3. The communication packet may have a header having the new MCD ID #1 as the source of the communication packet and the MCD ID #3 as the destination. The MCD 18-1 may receive communication data encrypted using the IASD #1/#3 from the MCD 18-3 over the local wireless networking link (procedure 11052). The communication packet may have a header having the MCD ID #3 as the source address of the communication packet and the new MCD ID #1 as the intermediary address or destination address.

In addition, the MCD 18-1 may then transmit communication data encrypted using the IASD #1/#4 from the MCD 18-4 over the wireless networking link between the MCD 18-1 and the MCD 18-4 (procedure 11054). For example, the MCD 18-1 may generate the communication packets having payload data encrypted using the private IASD #1/#4. The communication packet may have a header having the new MCD ID #1 as the source of the communication packet and the new MCD ID #4 as the destination. The MCD 18-1 may receive communication data encrypted using the IASD #1/#4 from the MCD 18-4 over the wireless local area networking link (procedure 11056). The communication packet may have a header having the new MCD ID #4 as the source address of the communication packet and the new MCD ID #1 as the intermediary address or destination address.

The MCD 18-1 thus acts as the master node of an ad hoc network, such as a piconet, formed between the MCD 18-1 through MCD 18-4 associated with the members of the group on the social network. The MCDs 18-2 through 18-4 have the new MCD ID #1 and the private IASD #1/#2, the private IASD #1/#3, and the private IASD #1/#4, respectively. Thus, the MCDs 18-2 through 18-4 can communicate over their respective wireless local area networking link with the MCD 18-1. If a communication packet is directed between one of the MCDs 18-2 through MCDs 18-4, the MCD 18-1 can decrypt the encrypted data using the private IASD #1/#2, the private IASD #1/#3, and the private IASD #1/#4 and encrypt the data using the appropriate private IASD #1/#2, private IASD #1/#3, and private IASD #1/#4 for securing communications to the appropriate destination MCD 18-2 through 18-4. Since the MCD 18-3 has not received the new MCD ID #4, the MCD 18-3 may initially address the communication packets to the MCD 18-4 using the old MCD ID #4 as the destination address. Upon receiving the communication packet having the old MCD ID #4, the MCD 18-1 may inform the MCD 18-3 of the new MCD ID #4 so that the MCD 18-3 can update its local affinity record. Thus, the MCD 18-1 through the MCD 18-4 can transmit the communication packets to one another using the new MCD ID #1, the new MCD ID #2, the MCD ID #3, and the new MCD ID #4 as the destination address.

Accordingly, procedure 10010 in FIG. 13 illustrates one embodiment of the procedures 2000 and 2002 since the MCD 18-1 receives the MCD IDs from the server computer 12 during the synch and also stores the MCD IDs in the affinity records on the MCD 18-1. Procedures 11000, 11002, 11004, 11006, 11010, 11016, 11022, 11026, 11032, 11036, 11042, 11046, 11048, 11050, 11052, 11054, and 11056 are implementations of the exemplary procedures discussed above in FIG. 4. Procedure 11000 is one implementation of procedure 2004. Procedures 11002, 11004, and 11006 are implementations of the procedure 2006. Procedure 11010 is one embodiment of the procedure 2008. Procedures 11016, 11022, 11026, 11032, and 11036 are implementations of the procedure 2010. Finally, procedures 11042, 11046, 11048, 11050, 11052, 11054, and 11056 are implementations of the procedure 2012.

Figure 15:
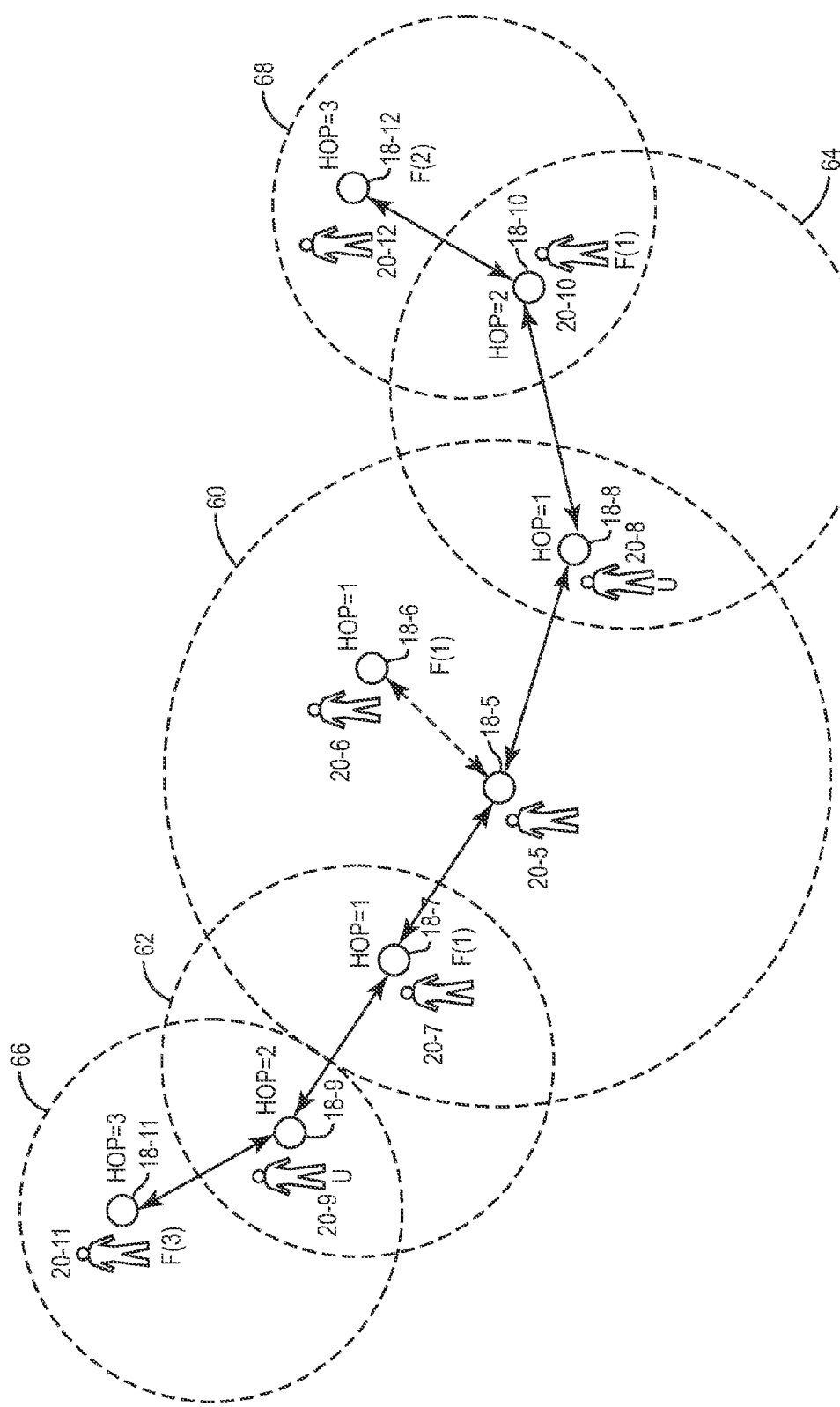
FIG. 15 illustrates another embodiment of a configuration of users and MCDs associated with the users.

FIG. 15 illustrates users 20-5 through 20-12 which are associated with the MCDs 18-5 and the MCDs 18-12, respectively. In this embodiment, MCDs 18-6 through 18-12 in proximity with the MCD 18-5. Users 20-5 through 20-12 each have user profiles 48-5 through 48-12 (not specifically shown), respectively, which represent them on the social network. The MCDs 18-6 through 18-12 are in proximity with the MCD 18-5 by being within a wireless local area networking range and/or a defined number of wireless local area networking hops from the MCD 18-5. In this example, the defined number of hops is equal to three (3) hops as shown in FIG. 15. The MCD 18-6 through 18-8 are just one hop (1) from the MCD 18-5. Thus, the MCD 18-6 through 18-8 are within a transmission range 60 of a wireless local area networking service provided by the MCD 18-5. The MCDs 18-9 and 18-10 are also in proximity with the MCD 18-5 by being two (2) hops from the MCD 18-5. The MCD 18-9 and MCD 18-10 are not within the transmission range 60 of the wireless local area networking service provided by the MCD 18-5. Instead, the MCD 18-9 is within the transmission range 62 of the MCD 18-7. Furthermore, the MCD 18-10 is within the transmission range 64 of the MCD 18-8. The MCDs 18-11 and 18-12 are also in proximity with the MCD 18-5 by being three (3) hops from the MCD 18-5. The MCD 18-11 and MCD 18-12 are also not within the transmission range 60 of the wireless local area networking service provided by the MCD 18-5. Instead, the MCD 18-11 is within the transmission range 66 of the MCD 18-9. Furthermore, the MCD 18-12 is within the transmission range 68 of the MCD 18-10.

The users 20-5 through 20-12 are each members of a social network. Users 20-6, 20-7, 20-10, 20-11, and 20-12 have varying degrees of affinity with the user 20-5 on the social network. In this example, the users 20-6, 20-7, and 20-10 have the symbol "F(1)" thereby indicating that the friendship relationship has one degree of separation between the user 20-5 and each of the users 20-6, 20-7, and 20-10. Thus, the users 20-6, 20-7, and 20-10 are friends of user 20-5 on the social network. The user 20-12 has the symbol "F(2)" thereby indicating that the friendship relationship between the user 20-5 and the user 20-12 has two degrees of separation. Thus, user 20-12 is a friend-of-a-friend of the user 20-5 on the social network. The user 20-11 has the symbol "F(3)" thereby indicating that the friendship relationship between the user 20-5 and the user 20-11 has three degrees of separation. Thus, user 20-11 is also a friend-of-a-friend of the user 20-5 with an even higher degree of separation on the social network. Users 20-8 and 20-9 are users on the social network. However, the users 20-8 and 20-9 have the symbol "U" indicating that they are unknown to the user 20-5 on the social network. Thus, the users 20-8 and 20-9 either do not have an affinity with the user 20-5 on the social network or the relationship between the users 20-8, 20-9 and user 20-5 is very distant on the social network.

Figure 16:
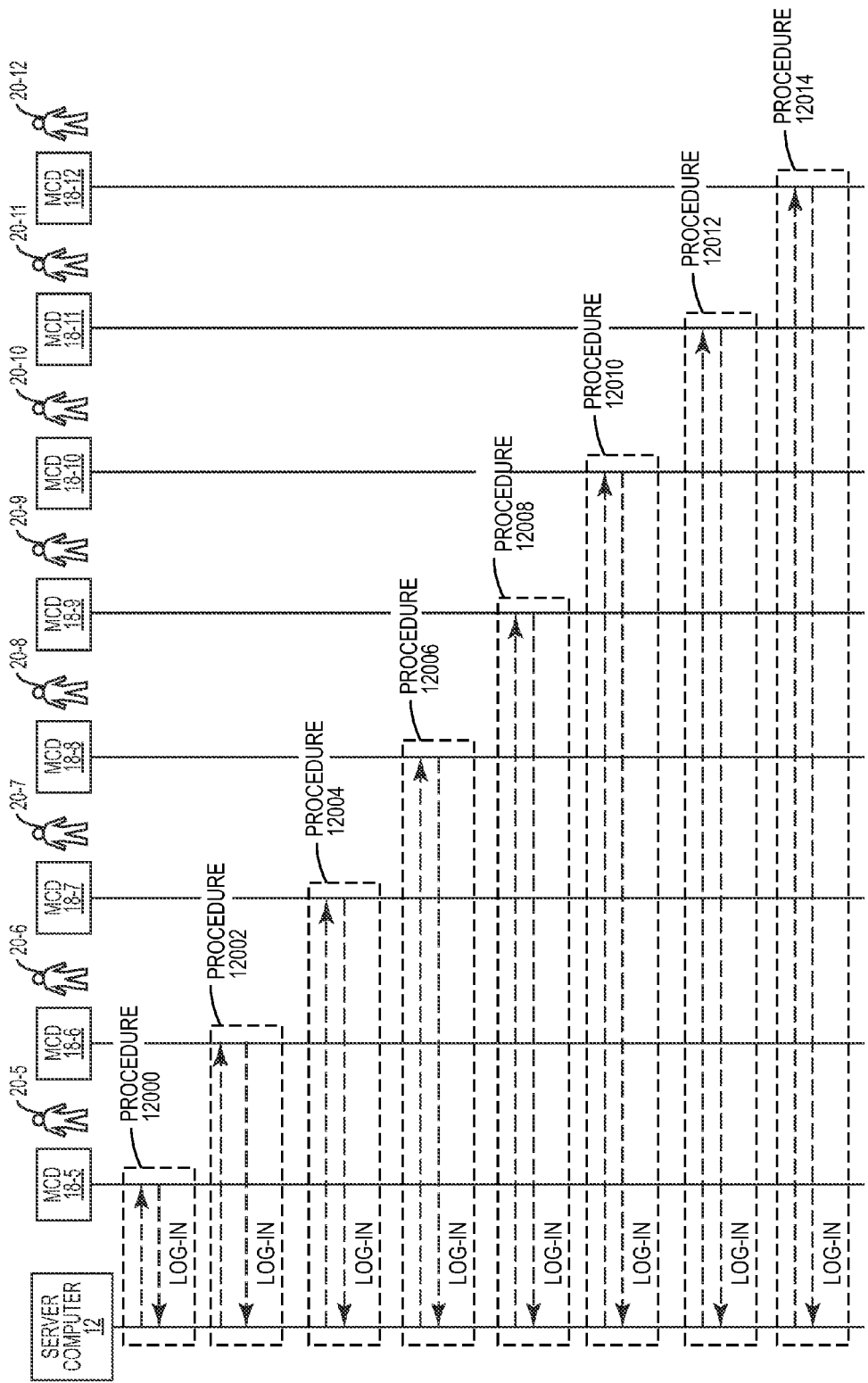
FIG. 16 is a communication flow diagram where the server computer assigns mobile communication device identifications (MCD IDs) and information access security data (IASD) to the MCDs and the MCDs receive their MCD IDs and IASD from the server computer.

Referring now to FIGS. 15 and 16, FIG. 16 illustrates an embodiment of the exemplary procedure 2000 and 2002 in FIG. 4 and other related exemplary procedures. In this embodiment, a log-in process is performed between the MCD 18-5 and the server computer 12 (procedure 12000). In the log-in process, the user 20-5 logs into the server computer 12 through the MCD 18-5 utilizing the web browser 30-5 or through a specialized application on the MCD 18-5 designed for the participating on the social network. The user 20-5 may enter in a username and password to log into the server computer 12. Alternatively, the username and/or password may be saved from a previous log-in. The server computer 12 may authenticate the user 18-5 using the username and password thereby providing the MCD 18-5 with access to the user profile of 18-5. Furthermore, the server computer 12 and the MCD 18-5 may exchange updated MCD IDs and/or IASD if desired. For example, through the IASD manager application 38, the server computer 12 may provide the MCD ID #5 to the MCD 18-5 to identify the MCD 18-5. Also, the MCD 18-5 may receive updated MCD IDs for local copies of affinity records. An analogous log-in process is also performed between each of the MCDs 18-6 through 18-12 and the server computer 12 so that the users 20-6 through 20-12 are logged into the server computer 12 (procedures 12002, 12004, 12006, 12008, 12010, 12012, 12014). As with the MCD 18-5, the server computer 12 through the IASD manager application 38, may provide MCD IDs to the MCDs 18-6 through 18-12. Consequently, in this case, the server computer 12 provides the MCD ID #6, the MCD ID #7, the MCD ID #8, the MCD ID #9, the MCD ID #10, the MCD ID #11, the MCD ID #12 to identify the MCD 18-6, the MCD 18-7, the MCD 18-8, the MCD 18-9, the MCD 18-10, the MCD 18-11, the MCD 18-12, respectively.

Figure 17A:
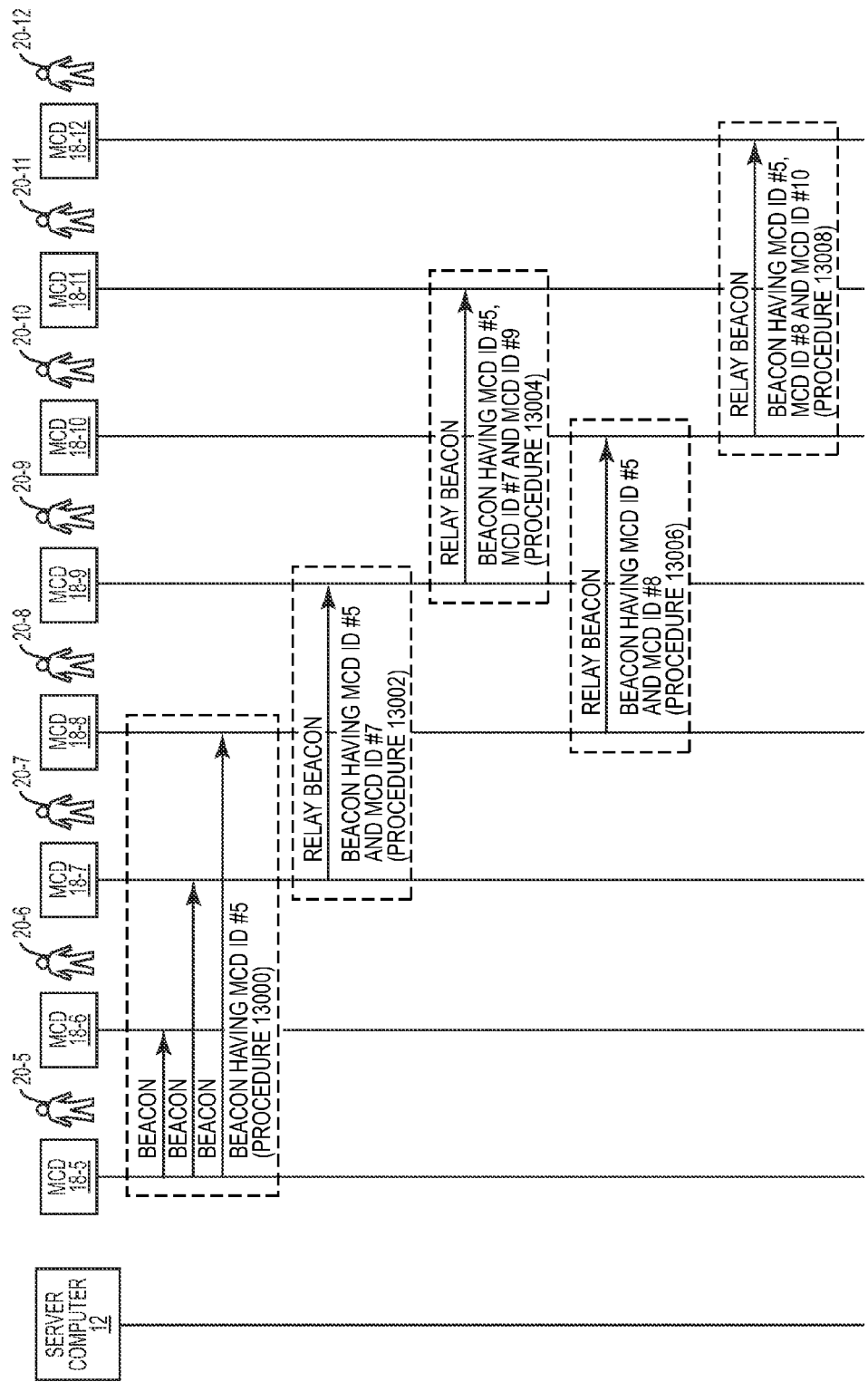
FIGS. 17A and 17B are communication flow graphs illustrating an embodiment of exemplary procedures in FIG. 4 or FIG. 5 so that an MCD detects other MCDs that may form a scatternet.
Figure 17B:
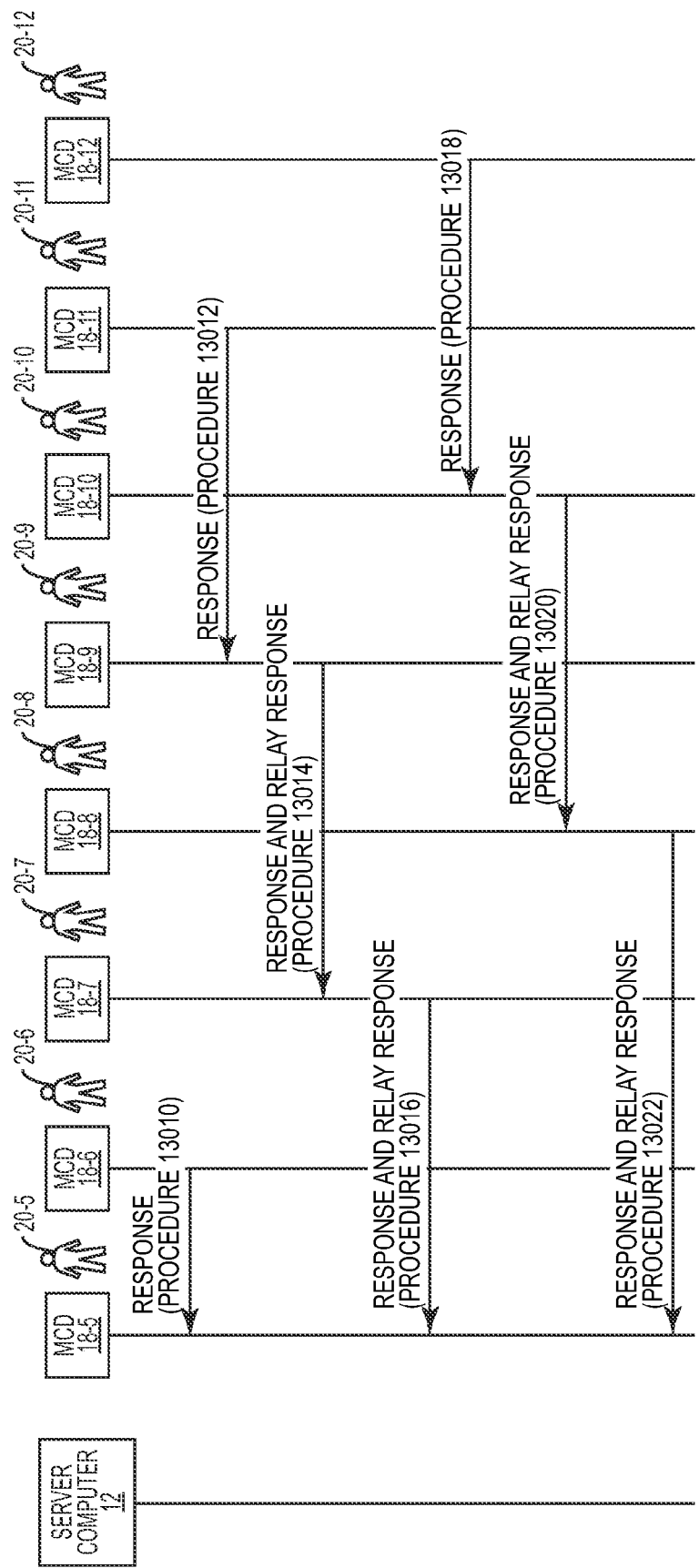

Referring now to FIGS. 15, 17A and 17B, FIGS. 17A and 17B illustrate one embodiment of the exemplary procedures 2004 and 2006 shown in FIG. 4 and other related exemplary procedures. Alternatively, FIGS. 17A and 17B illustrate one embodiment of the exemplary procedures 3000 and 3002. To detect the MCDs 18-6 through 18-12 in proximity with the MCD 18-5, the MCD 18-5 broadcasts a beacon having the MCD ID #5 (procedure 13000). The beacon requests that the MCDs 18 in proximity with the MCD 18-5 identify themselves and may include wireless local area networking information for forming the wireless local area networking link with MCD 18-5. For example, the beacon may include the defined number of wireless local area networking hops. In this case, the defined number may be three (3) hops. The MCDs 18-6, MCD 18-7, and MCD 18-8 receive the beacon directly from the MCD 18-5 because the MCDs 18-6, MCD 18-7, and MCD 18-8 are within the transmission range 60. Upon receiving the beacon, the MCD 18-6 generates a response having the MCD ID #6, as well as other wireless local area networking information. The response indicates that MCD 18-6 is unwilling to serve as a relay to the MCD 18-5. In some embodiments, a MCD 18 may determine that it is unwilling to serve as a relay based on the social network affinity (or lack thereof) between itself and the MCD 18 that transmitted the beacon and the other nearby MCDs 18. Other criteria a MCD 18 may use in determining whether it is willing to serve as a relay include user preferences, user context, location, current usage of the MCD 18, other applications active on the MCD 18, physical capabilities of the MCD 18, resources available to the MCD 18 (such as remaining battery), and the like.

The MCD 18-7 is willing to serve as a relay to the MCD 18-5. In this case, the MCD 18-7 relays the beacon from the MCD 18-5 (procedure 13002). However, the MCD 18-7 adds the MCD ID #7 and other wireless local area networking information so that the beacon has the MCD ID #5 and the MCD ID #7. The MCD 18-7 also generates a response to the beacon having MCD ID #7 as well as other wireless local area networking information. The response may include parameters indicating that MCD 18-7 is one (1) hop from the MCD 18-5 and that the MCD 18-7 is willing to serve as a relay. The MCD 18-7 is willing to serve as a relay for messages from the MCD 18-5. In this case, the MCD 18-7 relays the beacon from the MCD 18-5 (procedure 13002). However, the MCD 18-7 adds the MCD ID #7 and other wireless local area networking information so that the beacon has the MCD ID #5 and the MCD ID #7. The MCD 18-7 also generates a response to the beacon having the MCD ID #7 as well as other wireless local area networking information. The response may include parameters indicating that the MCD 18-7 is one (1) hop from the MCD 18-5 and that the MCD 18-7 is willing to serve as a relay. In some embodiments, beacons and relayed beacons may contain a time-to-live (TTL) field that is decremented at each hop rather than a hop field indicating the number of hops. Relaying of beacons may stop when the hop count field reaches a defined threshold (such as three hops) or, alternately, the TTL is decremented to zero.

The MCD 18-9 is outside the transmission range 60 of the MCD 18-5 but within the transmission range 62 of the MCD 18-7. The relayed beacon from the MCD 18-7 is thus received by the MCD 18-9. The MCD 18-9 is willing to serve as a relay to the MCD 18-7, and indirectly, MCD 18-5. In this case, the MCD 18-9 relays the beacon from the MCD 18-7 (procedure 13004). However, the MCD 18-9 adds the MCD ID #9 and other wireless local area networking information so that the beacon relayed from the MCD 18-9 has the MCD ID #5, the MCD ID #7, and the MCD ID #9. The MCD 18-9 also generates a response to the beacon from the MCD 18-7 having the MCD ID #9 as well as other wireless local area networking information. The response may include parameters indicating that the MCD 18-9 is two (2) hops from the MCD 18-5, that the MCD 18-7 serves as a relay to the MCD 18-9, and that the MCD 18-9 is willing to serve as a relay.

The MCD 18-11 is outside the transmission range 62 of the MCD 18-7 but within the transmission range 66 of the MCD 18-9. The relayed beacon from the MCD 18-9 is thus received by the MCD 18-11. Upon receiving the relayed beacon from the MCD 18-9, the MCD 18-11 also generates a response to the beacon having the MCD ID #11 as well as other wireless local area networking information. The response may include parameters indicating that the MCD 18-11 is three (3) hops from the MCD 18-5 and that the MCD 18-9 serves as a relay to the MCD 18-11. Note that MCD 18-11 might actually be within the transmission range of the MCD 18-6, which would place the MCD 18-11 only two (2) hops from the MCD 18-5. However, since the MCD 18-6 is unwilling to relay, the MCD 18-11 is three (3) network hops from the MCD 18-5.

Next, the MCD 18-8 is also willing to serve as a relay to the MCD 18-5. In this case, the MCD 18-8 relays the beacon from the MCD 18-5 (procedure 13006). However, the MCD 18-8 adds the MCD ID #8 and other wireless local area networking information so that the beacon has the MCD ID #5 and the MCD ID #8. The MCD 18-8 also generates a response to the beacon having the MCD ID #8 as well as other wireless local area networking information. The response may include parameters indicating that the MCD 18-8 is one (1) hop from the MCD 18-5 and that the MCD 18-8 is willing to serve as a relay.

The MCD 18-10 is outside the transmission range 60 of the MCD 18-5 but within the transmission range 64 of the MCD 18-8. The relayed beacon from the MCD 18-8 is thus received by the MCD 18-10. The MCD 18-10 is willing to serve as a relay to the MCD 18-8. In this case, the MCD 18-10 relays the beacon from the MCD 18-8 to the MCD 18-12 (procedure 13008). However, the MCD 18-10 adds the MCD ID #10 and other wireless local area networking information so that the beacon relayed from the MCD 18-10 has the MCD ID #5, the MCD ID #8, and the MCD ID #10. The MCD 18-10 also generates a response to the beacon from the MCD 18-7 having the MCD ID #10 as well as other wireless local area networking information. The response may include parameters indicating that the MCD 18-10 is two (2) hops from the MCD 18-5, that the MCD 18-8 serves as the relay to MCD 18-10, and that the MCD 18-10 is willing to relay.

The MCD 18-12 is outside the transmission range 64 of the MCD 18-8 but within the transmission range 68 of the MCD 18-10. The relayed beacon from the MCD 18-10 is thus directly received by the MCD 18-12. Upon receiving the relayed beacon from MCD 18-10, the MCD 18-12 also generates a response to the beacon having the MCD ID #12 as well as other wireless local area networking information. The response may include parameters indicating that the MCD 18-12 is three (3) hops from the MCD 18-5 and that the MCD 18-10 serves as the relay to the MCD 18-12.

Next, the response of the MCD 18-6 is received by the MCD 18-5 directly from the MCD 18-6 (procedure 13010). In addition, the response from the MCD 18-11 is received directly by the MCD 18-9 (procedure 13012). Upon receiving the response from the MCD 18-11, the MCD 18-9 transmits its response and also relays the response from the MCD 18-11. The response from the MCD 18-9 and the relayed response from the MCD 18-11 are received by the MCD 18-7 directly from the MCD 18-9 (procedure 13014) The MCD 18-7 transmits its response and also relays the responses of the MCD 18-9 and the MCD 18-11. The response from the MCD 18-7 and the relayed responses from the MCD 18-9 and 18-11 are received by the MCD 18-5 directly from the MCD 18-7 (procedure 13016).

Additionally, the response from the MCD 18-12 is received directly by the MCD 18-10 (procedure 13018). Upon receiving the response from the MCD 18-12, the MCD 18-10 transmits its response and also relays the response from the MCD 18-12. Next, the response from the MCD 18-10 and the relayed response from the MCD 18-12 are received by the MCD 18-8 directly from the MCD 18-10 (procedure 13020). The MCD 18-8 transmits its response and relays the responses of the MCD 18-10 and the MCD 18-12. The response from the MCD 18-8 and the relayed responses from the MCD 18-10 and 18-12 are received by the MCD 18-5 directly from the MCD 18-8 (procedure 13022). By receiving the responses, the MCD 18-5 detects that the MCDs 18-6 through 18-12 are within the proximity of the MCD 18-5.

Figure 18A:
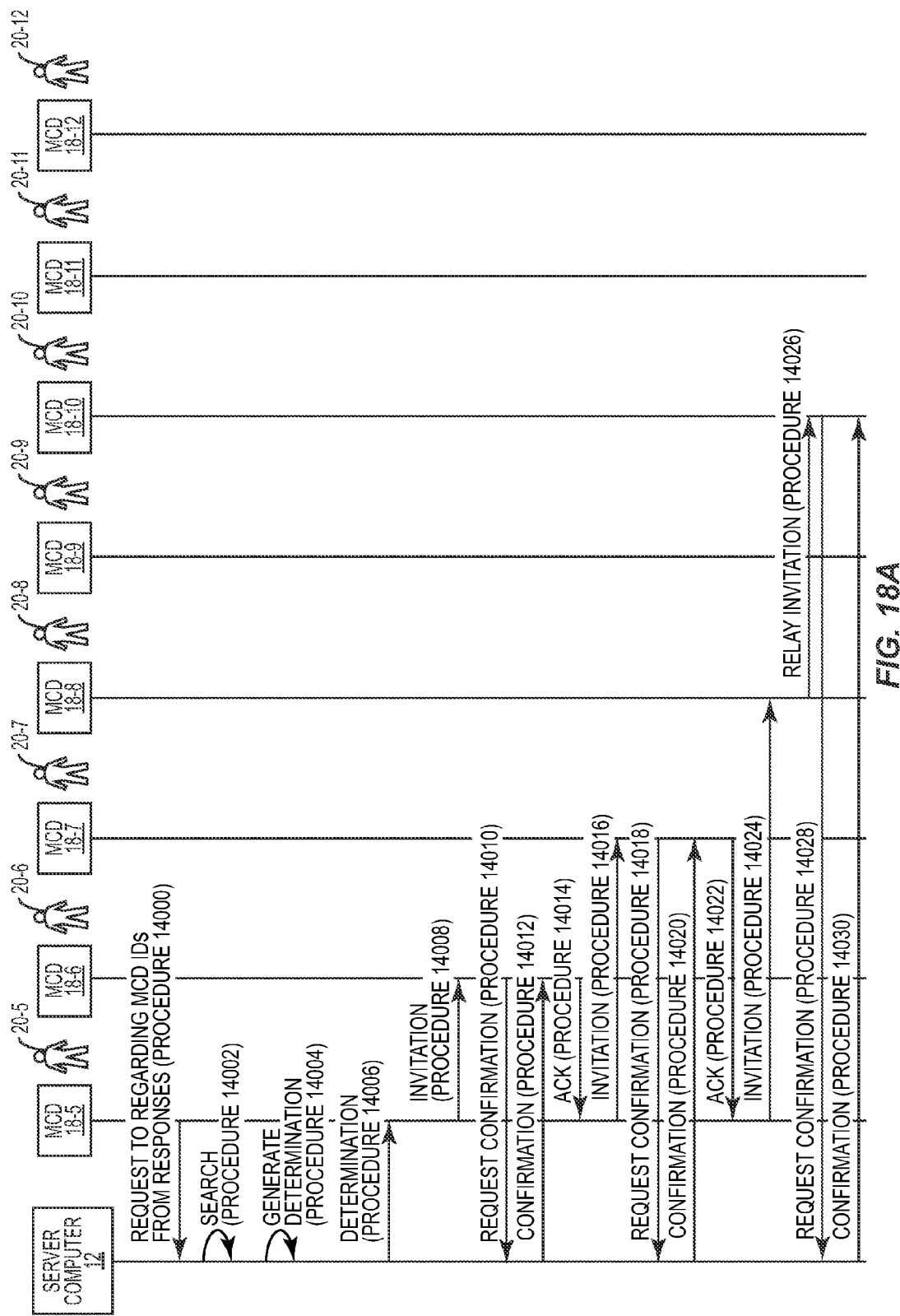
FIGS. 18A and 18B are communication flow graphs illustrating exemplary procedures shown in FIG. 5 where the server computer generates the determination that users have the defined affinity on the social network utilizing affinity records stored on the database and where the server computer confirms that the MCD IDs have been assigned by the server computer to MCDs that are forming a scatternet.
Figure 18B:
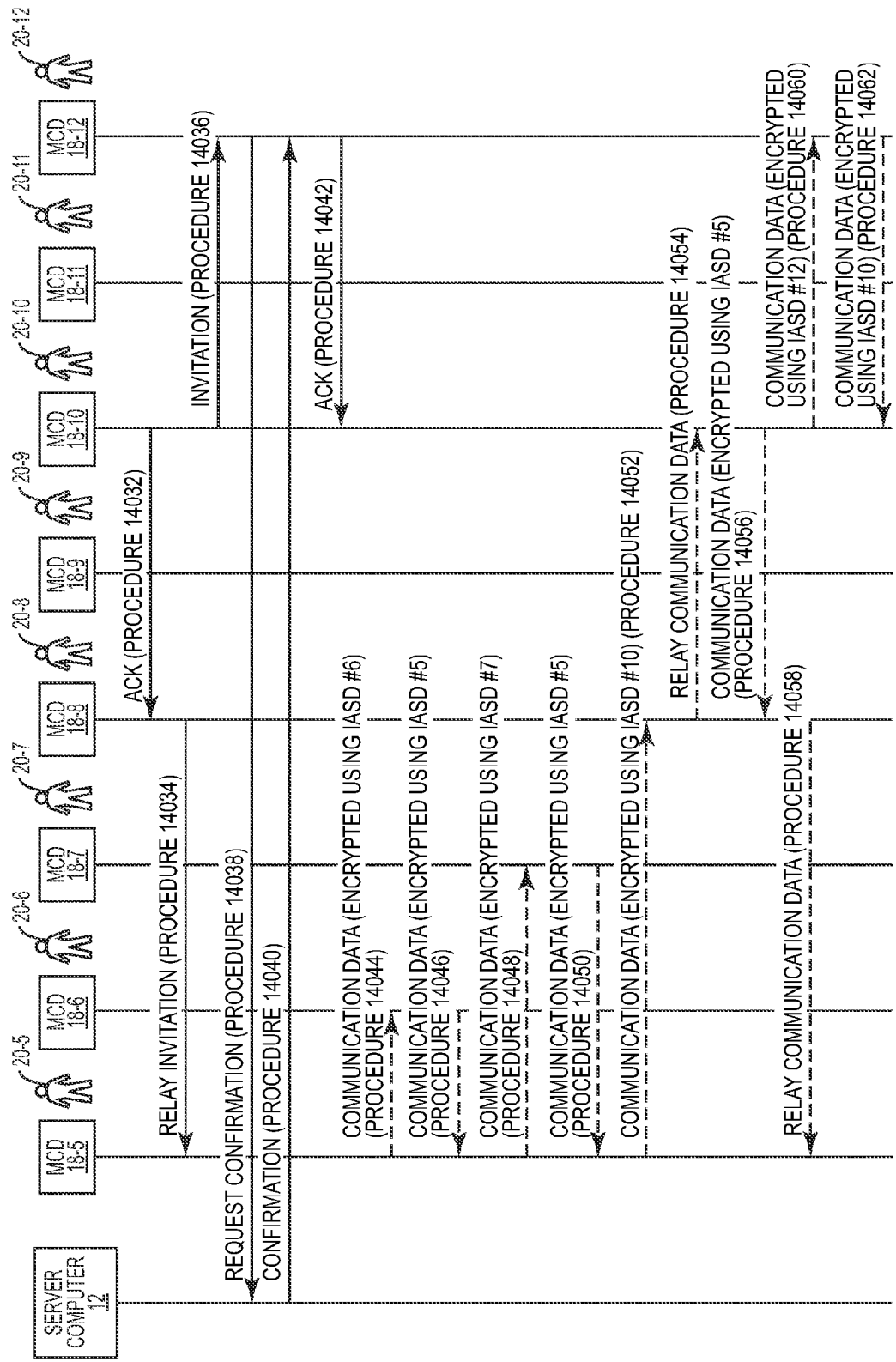

Referring now to FIGS. 18A and 18B, FIGS. 18A and 18B illustrate one embodiment of the exemplary procedures 3004 through 3010 shown in FIG. 5 and other related exemplary procedures. Upon receiving the responses, the MCD 18-5 sends a request through the wide area network 16 to the server computer 12 regarding MCD IDs from the responses (procedure 14000). The request may also include parameters to define the affinity for a determination. In this example, the parameters define the affinity as a friendship relationship within 2 degrees of separation. Thus, the request is requesting whether the users 20-5 through 20-12 associated with the MCD IDs are a friend or a friend-of-a-friend with less than 2 degrees of separation from the user 20-5. The request includes the MCD IDs #6 through #12 from the responses. When the server computer 12 receives the request, the server computer 12 performs a search (procedure 14002). In this example, the server computer 12 queries the database 14 to see if the MCD IDs #6 through #12 are in the friend list of the user 20-5. Here, the server computer 12 finds the MCD ID #6, the MCD ID #7, and the MCD ID #10 within the friend list. Next, the server computer 12 checks the permissions data 52 of the friends to see which friends allow friends to use information on their friends lists. For the friends having the appropriate permissions, the server computer 12 queries the database 14 to see if the MCD ID #8, MCD ID #9, MCD ID #11, and MCD ID #12 are in the friend list of the friends of user 20-5. Here, the server computer 12 finds MCD ID #12 within the friend list of the friends of user 20-5. Upon checking the permissions data 52 of the user 20-12, the server computer 12 finds parameters indicating that the user 20-12 only establishes wireless local area networking links with friends of user 20-12 and does not wish to receive communications from the other users 20. The server computer 12 queries the database to see if any of the MCDs #6 through #12 are for friends of the user 20-12.

The server computer finds the MCD ID #10 of the MCD 18-10 associated with user 20-10 in the friends list of user 20-12.

The server computer 12 may then generate the determination having the IASD for the communication session (procedure 14004). Next, the server computer 12 also generates a determination including the MCD ID #6, MCD ID #7, MCD ID #8, MCD ID #10, MCD ID #11, and MCD ID #12 and the IASD #6, IASD #7, IASD #10, IASD #11, and IASD #12. The determination also includes parameters indicating that the MCD ID #12 is associated in an MCD 18 that only wishes to receive communications from friends. The parameters may also indicate that MCD ID #10 is for a friend of the user 20 associated with the MCD 18 having the MCD ID #12. The MCD 18-5 receives the determination from the server computer 12 using the wide area network 16 (procedure 14006). Using the determination and the wireless local area networking information from the responses, the MCD 18-5 builds a graph of the distributed ad hoc network, such as a scatternet graph, for routing communications between the MCD 18-5, the MCD 18-6, the MCD 18-8, the MCD 18-10, the MCD 18-11, and the MCD 18-12. Note that this is only one embodiment for establishing routing in the distributed ad hoc network, and other methods known in the art, such as Ad hoc On-Demand Distance Vector or Dynamic Source Routing protocols, may be used along with suitable modifications to include social network affinity information.

Based on the determination and the wireless local area networking information, the MCD 18-5 sends an invitation to the MCD 18-6 (procedure 14008). The invitation includes the MCD ID #5, MCD ID #7, MCD ID #8, MCD ID #10, MCD ID #11, IASD #5, and IASD #6. Once the MCD 18-6 receives the invitation from the MCD 18-5, the MCD 18-6 may desire to confirm that the invitation is in fact from the MCD 18-5. The MCD 18-6 may thus transmit a confirmation request to the server computer 12 having the MCD ID #5 and the IASD #5 and the IASD #6 (procedure 14010). In response, the server computer 12 looks up the user profiles for the user 20-5 and the user 20-6 to confirm that the MCD ID #5, IASD #5, and IASD #6 have in fact been assigned by the server computer 12. The server computer 12 then generates a confirmation indicating that the MCD ID #5, IASD #5, and IASD #6 have been confirmed. The MCD 18-6 then receives the confirmation from server computer 12 through the wide area network 16 (procedure 14012). In this manner, the MCD 18-6 is protected from an intervening eavesdropper. In response to receiving the confirmation, the MCD 18-6 may generate an acknowledgment accepting the invitation. The MCD 18-5 receives the acknowledgement directly from the MCD 18-6 using the wireless local area networking service (procedure 14014). In this manner, the wireless local area networking link between the MCD 18-5 and the MCD 18-6 is established. Since the user 20-6 is not a friend of the user 20-12, the MCD 18-6 does not receive the MCD ID #12 of the MCD 18-12.

Based on the determination and the wireless local area networking information, the MCD 18-5 sends an invitation to the MCD 18-7 (procedure 14016). The invitation includes the MCD ID #5, MCD ID #7, MCD ID #8, MCD ID #10, MCD ID #11, IASD #5, and IASD #7. Once MCD 18-7 receives the invitation from the MCD 18-5, the MCD 18-7 may desire to confirm that the invitation is in fact from the MCD 18-5. The MCD 18-7 may thus transmit a confirmation request to the server computer 12 having the MCD ID #5, the IASD #5, and IASD #6 (procedure 14018). In response, the server computer 12 looks up the user profiles for user 20-5 and user 20-7 to confirm that MCD ID #5, IASD #5, and IASD #7 have in fact been assigned by the server computer 12. The server computer 12 then generates a confirmation indicating that MCD ID #5, IASD #5, and IASD #7 have been confirmed. The MCD 18-7 then receives the confirmation from server computer 12 through the wide area network 16 (procedure 14020). In this manner, MCD 18-7 is protected from an intervening eavesdropper. In response to receiving the confirmation, the MCD 18-7 may generate an acknowledgment accepting the invitation. The MCD 18-5 receives the acknowledgement directly from MCD 18-7 using the wireless local area networking service (procedure 14022). In this manner, the wireless local area networking link between the MCD 18-5 and the MCD 18-7 is established. Since user 20-7 is not a friend of user 20-12, the MCD 18-7 does not receive the MCD ID #12 of MCD 18-12. Also, since neither user 20-9 and user 20-11 have a friendship relationship within two (2) degrees of separation, further local area networking links with the MCD 18-9 and the MCD 18-11 are not established.

Based on the determination and the wireless local area networking information, the MCD 18-5 sends an invitation to the MCD 18-8 (procedure 14024). The invitation includes the MCD ID #5, the MCD ID #7, the MCD ID #8, the MCD ID #10, the MCD ID #12, the IASD #5, the IASD #10, and the IASD #12. The invitation also includes parameters that a wireless local area networking link may be established between the MCD 18-10 and MCD 18-12 since user 10 is a friend of user 12. A wireless local area networking link is not to be established between the MCD 18-5 and the MCD 18-12 since the MCD 18-12 only want to establish communications with friends. Also, the parameters may indicate that the MCD 18-8 simply serves as a relay because the user 20-8 because the user 18-8 does not have a friendship relationship within two (2) degrees of separation from the user 18-5. Thus, a wireless local area networking link is not established with the MCD 18-8. Rather, the MCD 18-8 simply updates its MCD ID #8 through the invitation. The MCD 18-8 then relays the invitation to the MCD 18-10. In this manner, the MCD 18-10 receives the invitation (procedure 14026). Once the MCD 18-10 receives the invitation from the MCD 18-8, the MCD 18-10 may desire to confirm that the invitation is in fact from the MCD 18-5. The MCD 18-10 may thus transmit a confirmation request to the server computer 12 having the MCD ID #5, the IASD #5 and the IASD #10 (procedure 14028). In response, the server computer 12 looks up the user profiles for the user 20-5 and the user 20-10 to confirm that the MCD ID #5, the IASD #5, and the IASD #10 have in fact been assigned by the server computer 12. The server computer 12 then generates a confirmation indicating that the MCD ID #5, the IASD #5, and the IASD #10 have been confirmed. The MCD 18-10 then receives the confirmation from the server computer 12 through the wide area network 16 (procedure 14030). In this manner, the MCD 18-10 is protected from an intervening eavesdropper. In response to receiving the confirmation, the MCD 18-10 may generate an acknowledgment accepting the invitation. The MCD 18-8 receives the acknowledgement directly from the MCD 18-10 (procedure 14032). The MCD 18-8 then relays the acknowledgement to the MCD 18-5 using the wireless local area networking service (procedure 14034). In this manner, the wireless local area networking link between the MCD 18-5 and the MCD 18-10 is established. In this embodiment, the wireless local area networking link is established between the MCD 18-5 and the MCD 18-10 such that the MCD 18-8 operates as a relay between the MCD 18-5 and the MCD 18-10. MCDs 18-5 and 18-10 may encrypt their communications using IASD #5 and IASD #10 such that MCD 18-8 can relay their packets while being unable to decrypt the data within. Additionally, knowledge of the respective IASDs as confirmed by the server computer 12 prevents intermediate relay nodes such as MCD 18-8 from mounting a man-in-the-middle (MITM) attack. The MCD 18-5 thus receives communication packets from MCD 18-10 over the wireless local wireless communication link directly from the MCD 18-8. Note that the user 20-12 associated with the MCD 18-12 has the defined affinity with the user 18-5 on the social network. In this case, the user 20-12 is a friend-of-a-friend within two (2) degrees of separation from the user 18-5 on the social network. However, the user 20-12 has defined another affinity to establish the wireless local area networking links with the MCD 18-12. In particular, the user 20 desiring to establish the wireless local area networking links with the MCD 18-12 must be a friend of the user 20-12. The user 18-5 does not meet this affinity requirement. Thus, the MCD 18-5 does not establish the wireless local area networking link with the MCD 18-12 as a result of the user 18-5 not having the other defined affinity with the user 20-12.

However, since the user 18-10 is friends with the user 20-10, the MCD 18-5 helps coordinate the establishment of the wireless local area networking link between the MCD 18-10 and the MCD 18-12 using the invitation. As a result of the invitation from the MCD 18-8 having parameters indicating that the MCD 18-10 can establish the wireless local area networking link with the MCD 18-12, the MCD 18-10 generates the invitation requesting that the MCD 18-10 and the MCD 18-12 establish the wireless local area networking link. The invitation includes the MCD ID #10, the MCD ID #12, the IASD #10, and the IASD #12. The MCD 18-10 then transmits the invitation to the MCD 18-12 using the wireless local area networking service. In this manner, the MCD 18-12 receives the invitation from the MCD 18-10 (procedure 14036). Once the MCD 18-12 receives the invitation from the MCD 18-10, the MCD 18-12 may desire to confirm that the invitation is in fact from the MCD 18-10. The MCD 18-10 may thus transmit a confirmation request to the server computer having the MCD ID #10, the IASD #10 and the IASD #12 (procedure 14038). In response, the server computer 12 looks up the user profiles for the user 20-10 and the user 20-12 to confirm that the MCD ID #10, the IASD #10 and the IASD #12 have in fact been assigned by the server computer 12. The server computer 12 then generates a confirmation indicating that the MCD ID #10, the IASD #10, and the IASD #12 have been confirmed. The MCD 18-12 then receives the confirmation from the server computer 12 through the wide area network 16 (procedure 14040). In this manner, the MCD 18-12 is protected from an intervening eavesdropper. In response to receiving the confirmation, the MCD 18-12 may generate an acknowledgment accepting the invitation. The acknowledgement is received by the MCD 18-10 (procedure 14042). In this manner, the wireless local area networking link is established between the MCD 18-10 and the MCD 18-12.

MCD 18-5 may then transmit communication data encrypted using IASD #6 to MCD 18-6 over the wireless local area networking link between the MCD 18-5 and the MCD 18-6 (procedure 14044). The communication data may be addressed using the MCD ID #6 as the destination address. Similarly, MCD 18-6 may then stream data encrypted using IASD #5 to MCD 18-5 over the wireless local area networking link between the MCD 18-5 and the MCD 18-6 (procedure 14046). The communication data may be addressed using the MCD ID #5 either as the intermediary address or the destination address.

In addition, the MCD 18-5 may then transmit communication data encrypted using IASD #7 to MCD 18-7 over the wireless local area networking link between the MCD 18-5 and the MCD 18-7 (procedure 14048). The communication data may be addressed using the MCD ID #7 as the destination address. Similarly, the MCD 18-5 may receive communication data encrypted using the IASD #5 from MCD 18-7 over the wireless local area networking link between the MCD 18-5 and the MCD 18-7 (procedure 14050). The communication data may be addressed using the MCD ID #5 as the intermediary address or the destination address. Furthermore, the MCD 18-5 may then transmit communication data encrypted using IASD #10 to MCD 18-8 over the wireless local area networking link between the MCD 18-5 and the MCD 18-10 (procedure 14052). The communication data may be addressed using the MCD ID #8 as the intermediary address and the MCD ID #10 as the destination address. The MCD 18-8 then relays the communication data to the MCD 18-10 (procedure 14054). Thus, the MCD 18-10 receives the communication data from MCD 18-5 indirectly via the MCD 18-8. Similarly, the MCD 18-10 may then transmit communication data encrypted using IASD #5 to MCD 18-8 over the wireless local area networking link between the MCD 18-5 and the MCD 18-10 (procedure 14056). The communication data may be addressed using addressed using the MCD ID #8 as the intermediary address and the MCD ID #5 as the destination address. The MCD 18-8 then relays the communication data to the MCD 18-5 (procedure 14058). Thus, the MCD 18-5 receives the communication data from MCD 18-10 indirectly via the MCD 18-8. Furthermore, MCD 18-10 may transmit communication data encrypted using IASD #12 to MCD 18-12 over the wireless local area networking link between the MCD 18-10 and the MCD 18-12 (procedure 14060). The communication data may be addressed using the MCD ID #12 as the destination address. Similarly, the MCD 18-10 may receive communication data encrypted using IASD #10 from the MCD 18-12 over the wireless local area networking link between the MCD 18-10 and the MCD 18-12 (procedure 14062).

The MCD 18-5 thus acts as the master of the distributed ad hoc network, such as a scatternet, formed between smaller point-to-point ad hoc networks, such as piconets, comprising the piconet having the MCD 18-5, the MCD 18-6, and the MCD 18-7 and the piconet having MCD 18-10. MCD 18-8 serves as the bridge between the piconets. In the scatternet, if the communication packet is directed between one of the MCD 18-6, the MCD 18-7, and/or the MCD 18-10, the MCD 18-5 can decrypt the encrypted data using IASD #5 and encrypt the data using the appropriate IASD for securing communications to the appropriate destination MCD 18-6, MCD 18-7, and/or MCD 18-10. Also, the MCD 18-10 may be considered as the master of an independent piconet with MCD 18-12 since data traffic does not flow between the scatternet having the MCD 18-5 and the MCD 18-10 and the piconet with the wireless local area networking link between the MCD 18-10 and the MCD 18-12.

Accordingly, procedures 13000, 13010, 13016, and 13022 in FIGS. 17A and 17B and procedures 14000, 14006, 14008, 14014, 14016, 14022, 14024, 14034, 14044, 14046, 14048, 14050, 14052, and 14058 in FIGS. 18A and 18B the MCD 18-5 implements one embodiment of the exemplary procedures in FIG. 5. Procedure 13000 in FIG. 17A is one embodiment of procedure 3000. Procedures 13010, 13016, and 13022 in FIG. 17B are implementations of the procedure 3002. Procedure 14000 in FIG. 18A is one embodiment of the procedure 3004. Procedure 14006 in FIG. 18A is one embodiment of the procedure 3006. Procedures 14008, 14014, 14016, 14022, 14024, 14034 in FIGS. 18A and 18B are implementations of the procedure 3008. Procedures 14044, 14046, 14048, 14050, 14052 and 14058 in FIG. 18B are implementations of the procedure 3010.

Figure 19A:
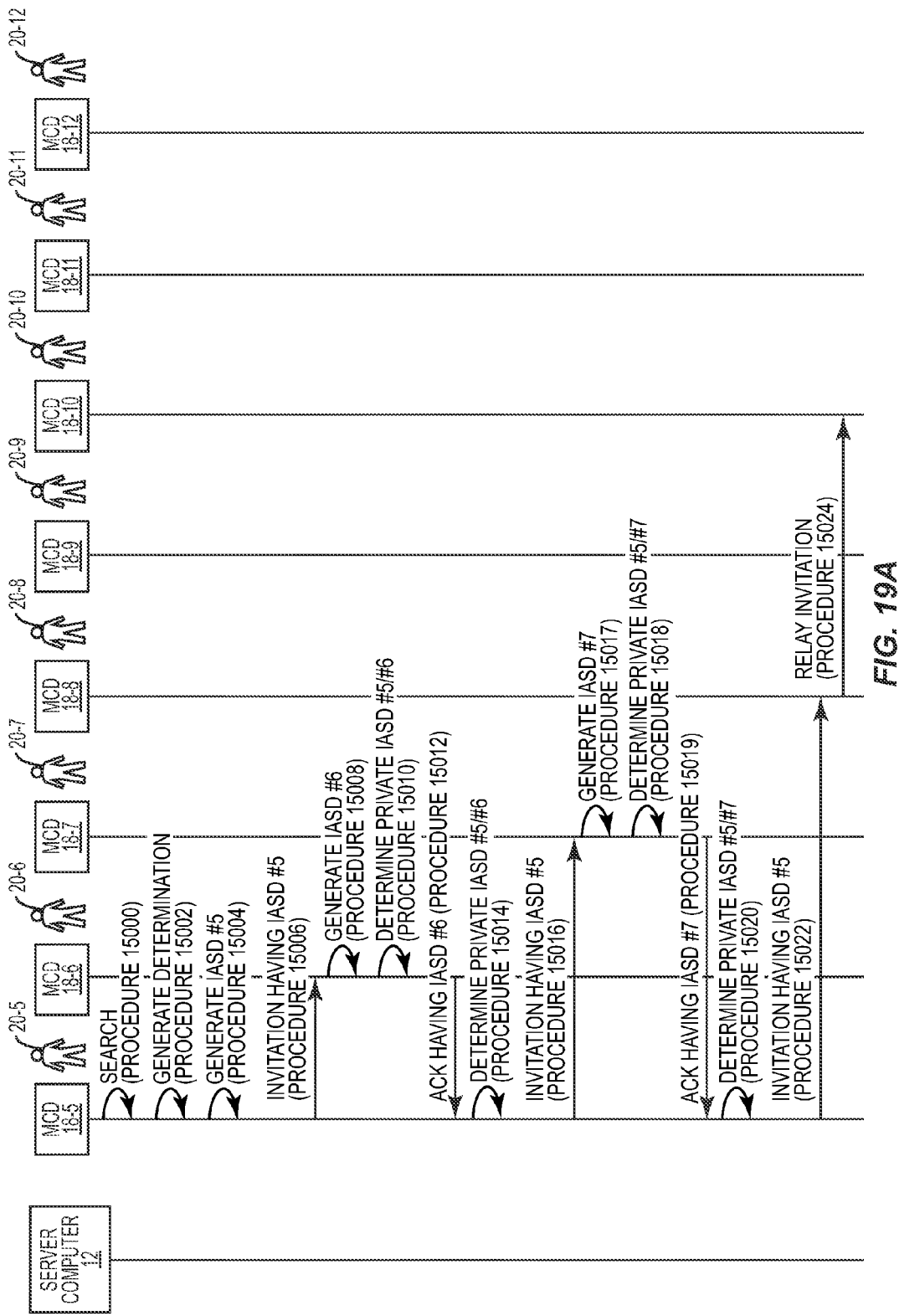
FIGS. 19A and 19B are communication flow graphs illustrating implementations of exemplary procedures shown in FIG. 4 the MCD generates the determination that users have the defined affinity on the social network utilizing affinity records stored locally on the MCD and where the MCDs self generate IASD for a scatternet.
Figure 19B:
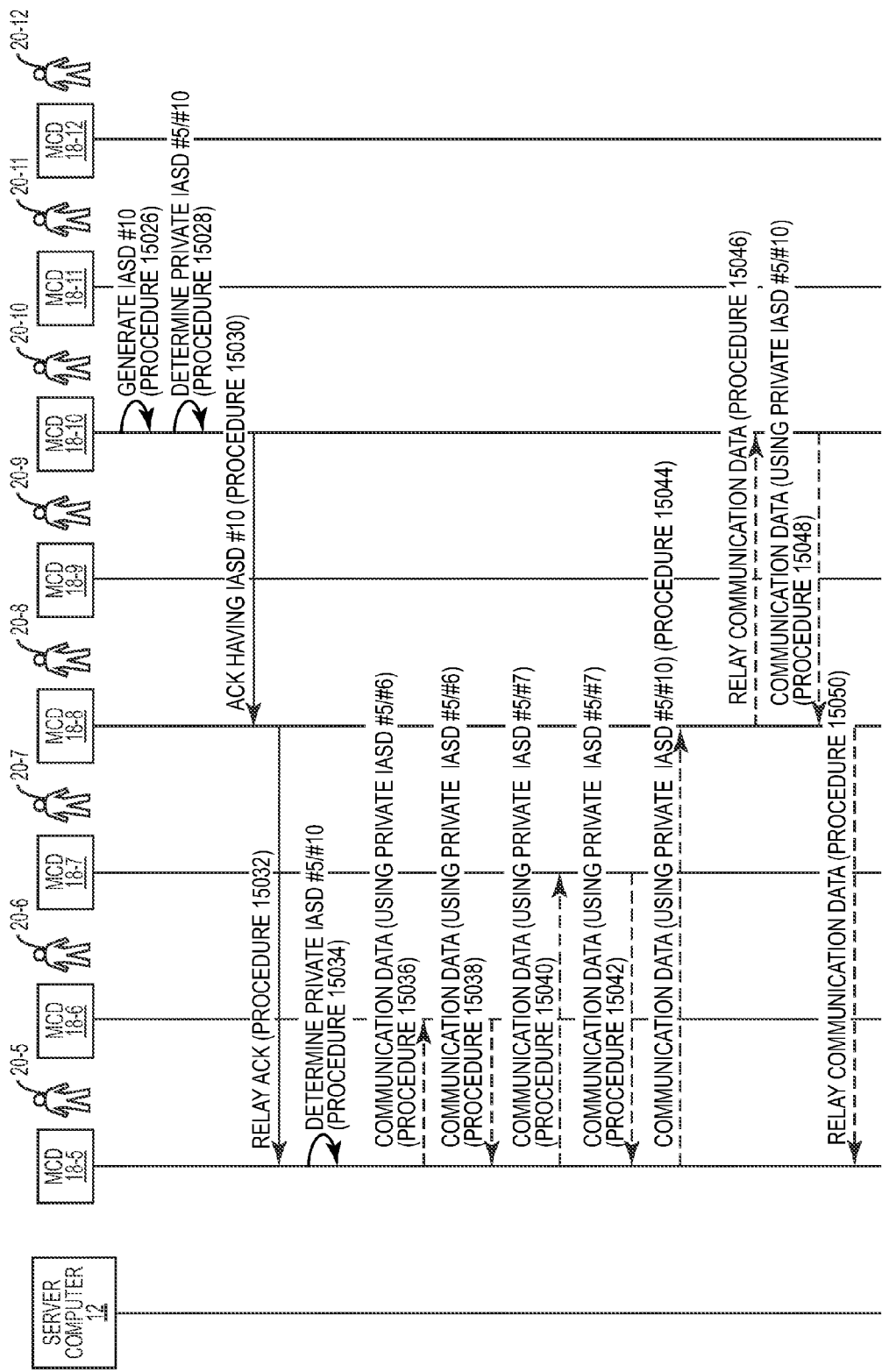

Referring now to FIGS. 15, 19A, and 19B, FIGS. 19A and 19B illustrate one embodiment of the exemplary procedures 2008 through 2012 shown in FIG. 4 and other related exemplary procedures. In this embodiment, the MCD 18-5 searches the affinity records stored on the MCD 18-5 to generate a determination of the users 20-6 through 20-12 having a defined affinity to user 20-5 (procedure 15000). In this example, MCD 18-5 searches a local copy of the affinity records for the MCD IDs #6 through MCD ID #12. It is assumed in this example that MCD 18-5 stores a local copy of a friends list of friends on the social network. Furthermore, through the log-in process of FIG. 15, the friends list stored by the MCD 18-5 has up-to-date MCD IDs for the friends list. Since user 18-6, user 18-7, and user 18-10 are listed as friends in the friends list stored on the MCD 18-5, the MCD 18-5 generates a determination that has MCD ID #6, MCD ID #7, and MCD ID #10, as well as other information identifying the user 20-6, user 20-7, 20-10 (procedure 15002). From the responses discussed in FIGS. 17A and 17B, the MCD 18-5 generates a scatternet graph with routing information. The MCD 18-6 and MCD 18-7 are within the transmission range 60 of MCD 18-5 and thus the scatternet graph indicates that MCD 18-5 can send and receive communication packets directly from MCD 18-6 and MCD 18-7. However, the scatternet graph indicates that the MCD 18-10 is not within the transmission range 60. Rather, the MCD 18-8 is willing to serve as a relay between the MCD 18-5 and the MCD 18-10. From the scatternet graph, the MCD 18-5 calculates that any messages having MCD ID #10 as the destination address should first be addressed to MCD ID #8 as an intermediary address.

In this embodiment, MCD 18-5 has settings that cause the MCD 18-5 to automatically establish wireless local area networking links with the MCDs 18 associated with friends. First, the MCD 18-5 generates IASD #5 (procedure 15004). Based on the determination, the MCD 18-5 sends an invitation having IASD #5, MCD ID #7, and MCD ID #10 to MCD 18-6 (procedure 15006). In response to the invitation, the MCD 18-6 may generate IASD #6 (procedure 15008). The IASD #5 and the IASD #6 are not for encrypting communications to the MCD 18-5 and the MCD 18-6. Rather, the IASD #5 and the IASD #6 are each public IASD. Using the IASD #5 and the IASD #6, the MCD 18-6 determines a private IASD #5/#6 (procedure 15010). As explained above in FIGS. 14A and 14B, the user client 28-6 of the MCD 18-6 may implement a mathematical algorithm to determine IASD #5/#6. The MCD 18-5 then receives an acknowledgement accepting the invitation from the MCD 18-6 (procedure 15012). The acknowledgement includes the IASD #6. Using the IASD #5 and the IASD #6, the MCD 18-5 implements a mathematical algorithm to determine the private IASD #5/#6 (procedure 15014). In this manner, the local wireless networking link is established between the MCD 18-5 and the MCD 18-6. The private IASD #5/#6 is configured to secure communications over the wireless local area networking link to and from both the MCD 18-5 and the MCD 18-6.

Next, MCD 18-5 sends an invitation having IASD #5, MCD ID #6, and MCD ID #10 to MCD 18-7 based on the determination (procedure 15016). In response to the invitation, MCD 18-7 may generate IASD #7 (procedure 15017). IASD #7 is also public IASD. Using the IASD #5 and the IASD #7, the MCD 18-7 implements a mathematical algorithm to determine a private IASD #5/#7 (procedure 15018). The MCD 18-5 then receives an acknowledgement accepting the invitation from the MCD 18-7 (procedure 15019). The acknowledgement includes the IASD #7. Using the IASD #5 and the IASD #7, the MCD 18-5 implements the mathematical algorithm to determine the private IASD #5/#7 (procedure 15020). In this manner, the wireless local area networking link between the MCD 18-5 and the MCD 18-7 is established.

Finally, also based on the determination, the MCD 18-5 sends an invitation having the IASD #5, the MCD ID #6, the MCD ID #7, and the MCD ID #8 to the MCD 18-8 (procedure 15022). The invitation however is for the MCD 18-10 and indicates that the MCD ID #8 is to serve as the relay between the MCD 18-5 and the MCD 18-10. As a result, the MCD 18-8 relays the invitation to the MCD 18-10 (procedure 15024). In response to the invitation, the MCD 18-10 may generate the IASD #10 (procedure 15026). The IASD #10 is also a public IASD. In an embodiment, the MCD 18-10 may also request the server computer 12 for confirmation of the MCD ID #5 and IASD #5 received in the related invitation. This may be especially necessary when the source and/or destination MCDs have low social network affinity with the relaying MCD. This may help prevent security attacks such as man-in-the-middle attacks. Using the IASD #5 and the IASD #10, the MCD 18-10 implements a mathematical algorithm to determine a private IASD #5/#10 (procedure 15028). The MCD 18-10 then transmits an acknowledgement accepting the invitation to the MCD 18-8 (procedure 15030). The acknowledgement however is for the MCD 18-5. The MCD 18-8 then relays the acknowledgement to the MCD 18-5 so that the MCD 18-5 receives the acknowledgement (procedure 15032). As above, in an embodiment, the MCD 18-5 may also request the server computer 12 for confirmation of the MCD ID #10 and IASD #10 received in the related acknowledgement. Using the IASD #5 and the IASD #10, the MCD 18-5 determines the private IASD #5/#10 (procedure 15034). In this manner, the wireless local area networking link between the MCD 18-5 and the MCD 18-10 is established.

Once the wireless local area networking links have been established the MCD 18-5, the MCD 18-6, the MCD 18-7, and the MCD 18-10 may send and receive communication data to one another. For example, the MCD 18-5 may transmit data encrypted using private IASD #5/#6 to the MCD 18-6 over the wireless local area networking link between the MCD 18-5 and the MCD 18-6 (procedure 15036). Similarly, the MCD 18-5 may receive communication data encrypted using private IASD #5/#6 from the MCD 18-6 over the wireless local area networking link between the MCD 18-5 and the MCD 18-6 (procedure 15038). Furthermore, the MCD 18-5 may stream data encrypted using private IASD #5/#7 to MCD 18-7 over the wireless local area networking link between the MCD 18-5 and the MCD 18-7 (procedure 15040). Similarly, the MCD 18-5 may receive communication data encrypted using private IASD #5/#7 from MCD 18-7 over the wireless local area networking links between the MCD 18-5 and the MCD 18-7 (procedure 15042). In addition, the MCD 18-5 may transmit communication data encrypted using private IASD #5/#10 to the MCD 18-8 over the wireless local area networking link between the MCD 18-5 and the MCD 18-10 (procedure 15044). To do this, the wireless local area networking links between the MCD 18-5 and the MCD 18-10 has been set up so that the communication packets have the MCD ID #8 as an intermediary address and the MCD ID #10 as the destination address. Upon receiving the communication data, the MCD 18-8 relays the communication data to the MCD 18-10 (procedure 15046). Similarly, the MCD 18-10 transmit communication data encrypted using private IASD #5/#10 to the MCD 18-8 over the wireless local area networking links between the MCD 18-5 and the MCD 18-10 (procedure 15048). To do this, the wireless local area networking link between the MCD 18-5 and the MCD 18-10 has been set up so that the communication packets have the MCD ID #8 as an intermediary address and the MCD ID #5 as either the destination address or a subsequent intermediary address. Upon receiving the communication data, the MCD 18-8 relays the communication data so that the communication data is received by the MCD 18-5 (procedure 15050).

The MCD 18-5 thus acts as the master of the scatternet formed between the piconet having the MCD 18-5, the MCD 18-6, and the MCD 18-7, and the piconet having the MCD 18-10. The MCD 18-8 serves as a bridge between the piconets. Using the MCD 18-5 as the central routing device, the MCD 18-6, the MCD 18-7, and the MCD 18-10 may send communication packets to one another. The MCD ID #5 may be utilized by the MCD 18-6, the MCD 18-7, and MCD 18-10 as an intermediary address for sending the communication packet to the appropriate device. If the MCD 18-6, the MCD 18-7 are sending communication packets to the MCD 18-10, the MCD 18-5 may include MCD ID #8 identifying the MCD 18-8 as an intermediary address. As the central routing device, the MCD 18-5 can decrypt and encrypt data using the private IASD #5/#6, the private IASD #5/#7, and the private IASD #5/#10 so that each of the MCD 18-6, and the MCD 18-7, and MCD 18-10 receives the data encrypted in accordance with the appropriate IASD. In other embodiments, private IASDs may be established between all communicating pairs of MCDs with the help of the server computer 12 as described in aforementioned methods, such that no relaying MCD is able to decrypt the communications between any pair of source and destination MCDs.

Accordingly, procedure 12000 in FIG. 16, procedures 13000, 13010, 13016, and 13022 in FIGS. 17A and 17B, and procedures 15000, 15002, 15006, 15012, 15016, 15019, 15022, 15032, 15036, 15038, 15040, 15042, 15044, 15050 in FIGS. 19A and 19B illustrate one embodiment of the exemplary procedures in FIG. 4. Procedure 12000 in FIG. 16 is one implementation of procedures 2000 and 2002 since the MCD 18-5 receives the MCD IDs from the server computer 12 during the log-in process and also stores the MCD IDs in the affinity records on the MCD 18-5. Procedure 13000 in FIG. 17A is one implementation of procedure 2004. Procedures 13010, 13016, and 13022 are implementations of procedure 2006 in FIG. 17B. Procedures 15000 and 15002 in FIG. 19A are implementations of procedure 2008. Procedures 15006, 15012, 15016, 15019, 15022, 15032 in FIGS. 19A and 19B are implementations of procedure 2010. Procedures 15036, 15038, 15040, 15042, 15044, and 15050 in FIG. 19B are implementations of procedure 2012.

In some embodiments, the social network affinity information may be used to determine characteristics of the communication link between MCDs 18 and friends may be allowed higher speeds, but friends of friends get a lower speed. Bandwidth may therefore be allocated based on the relationships on the social network. Furthermore, it should be understood that the procedures discussed throughout the Figures in this disclosure are not intended to restrict the scope of the disclosure. Several variations of these procedures may be implemented alternatively and/or additionally. For instance, a MCD 18 may have multiple MCD IDs. As discussed previously, this may be the result of generating and assigning new MCD IDs over time, as discussed above with FIGS. 13, 14A, and 14B. However, in other embodiments, multiple MCD IDs may be generated and assigned to the MCD 18 for other reasons. In one embodiment, different MCD IDs may be generated and assigned by the MCDs 18 and/or server computer 12 based on various criteria. Thus, the MCDs 18 may have general-use MCD IDs, group MCD IDs, buddy list MCD IDs, family list MCD IDs, and/or the like.

In another embodiment, if one or more of the users 20 associated with the MCD IDs of the proximate MCDs 18 happen to belong to a specific group in the user's social network, a specific MCD ID may be generated for communication sessions with that specific group. Additionally, a MCD ID may be a user-friendly device name that is familiar to members of that group. For example, an MCD ID may be generated as "John Doe's iPhone" for a communication session with a user's buddies. On the other hand, the MCD ID may be "JD's iPhone" for a communication session with work colleagues. One type of wireless local area networking service that supports these user-friendly names is Bluetooth. Other wireless local area networking services may support user-friendly device names or may otherwise be configured to support these user-friendly device names. Other exemplary criteria that may be considered for generating, assigning, exchanging, using, and/or selectively reporting the MCD IDs include information such as, a current time, a current location of the MCD 18, the user's context, the user's past social network interactions, security considerations, and/or the like. Not all of these MCD IDs may be included in beacons or in responses to beacons. For example, in some embodiments, MCD IDs having timestamps greater than a threshold amount of time before a current time may not be included in responses to beacons.

Finally, there may be additional or alternative manners of providing security within the wide area network 16 and the wireless local area network 22 other than those discussed above. In one embodiment, "decoy" MCD IDs may be randomly generated and reported in responses to beacons and/or in requests to the server computer 12. The decoy MCD IDs may appear similar to the authentic MCD IDs, but may not be uniquely associated with any given MCD 18. The MCD 18 may differentiate the decoy MCD IDs from authentic MCD IDs by searching its locally stored affinity records, and/or by the server computer 12 to search the affinity records 50 on the database 14. The MCD 18 and/or server computer 12 may discard those MCD IDs that are not uniquely associated with affinity records on the MCD 18 and/or the affinity records 50 on the database 14. On the other hand, a malicious device or eavesdropper may have a much more difficult time tracking which of the MCDs 18 and/or users 20 are associated with which MCD IDs. The degree to which this strategy is employed may depend on the operational environment of the MCD 18. For instance, if the MCD 18 is currently in an untrusted environment, such as at an untrusted location or in proximity of several unknown devices, the MCD 18 may increase the number of decoy MCD IDs that are generated and reported.

Figure 20:
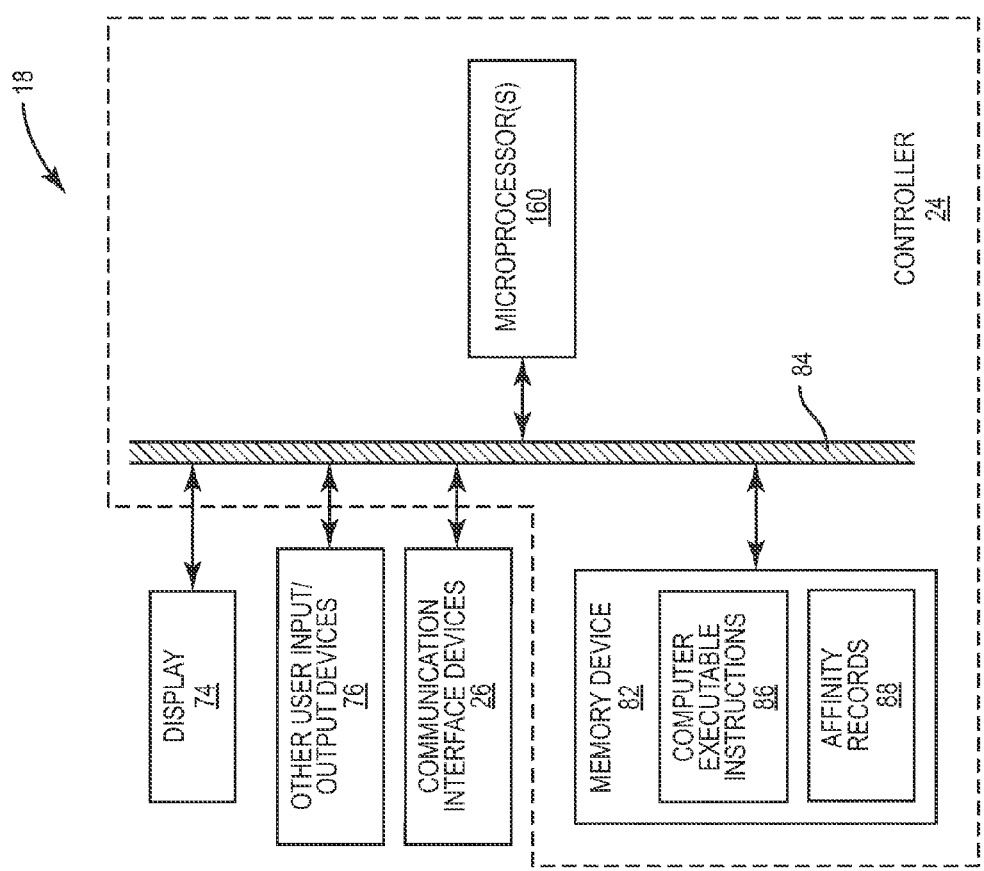
FIG. 20 illustrates one embodiment of an MCD shown in FIG. 1.

Referring now to FIG. 20, FIG. 20 illustrates one embodiment of the MCD 18, which may be any of the MCDs 18-1 through 18-N shown throughout the Figures. The MCD 18 includes a controller 24, the communication interface device 26, a display 74, and other user input and output devices 76.

The communication interface device 26 is operable to communicatively couple the MCD 18 to the wide area network 16 and the wireless local area network 22. As discussed above, the wide area network 16 may include various different types of mobile communications networks, packet-switched networks, and circuit switched networks. The wireless local area network 22 may include various different types of wireless local area networking links. The communication interface device 26 is adapted to facilitate communications with one or more communication services on the wide area network 16 and the wireless local area network 22. In this example, the communication interface device 26 may facilitate communications for any number of communication services provided by mobile communications networks, packet-switched networks, circuit switched networks, wireless local area networks and/or the like.

Next, the controller 34 has general purpose computer hardware, in this case one or more microprocessors 78, a non-transitory computer readable medium 80, such as memory device 82, and a system bus 84. The system bus 84 is operably associated with the microprocessors 78 so that microprocessors 78 can exchange information with the communication interface device 26, the display 74, and other user input and output devices 76. Furthermore, the controller 34 may also include other hardware such as, control logic, other processing devices, additional non-transitory computer readable mediums, and the like. The memory device 82 may store computer executable instructions 86 for execution by the microprocessors 78. The computer executable instructions 86 configure the operation of the microprocessors 78 so that the microprocessors 70 implement the software applications for the MCD 18 discussed above. The memory device 82 may also store local copies of affinity records 88. The display 74 may be any suitable display for MCDs. For example, the display 74 may be a touch screen, a monitor, an LCD display, a plasma display, and/or the like. The other user input and output devices 76 may be a keyboard, a microphone, a head-set, a mouse, and/or an input button, and may depend on the particular configuration of the MCD 18.

Figure 21:
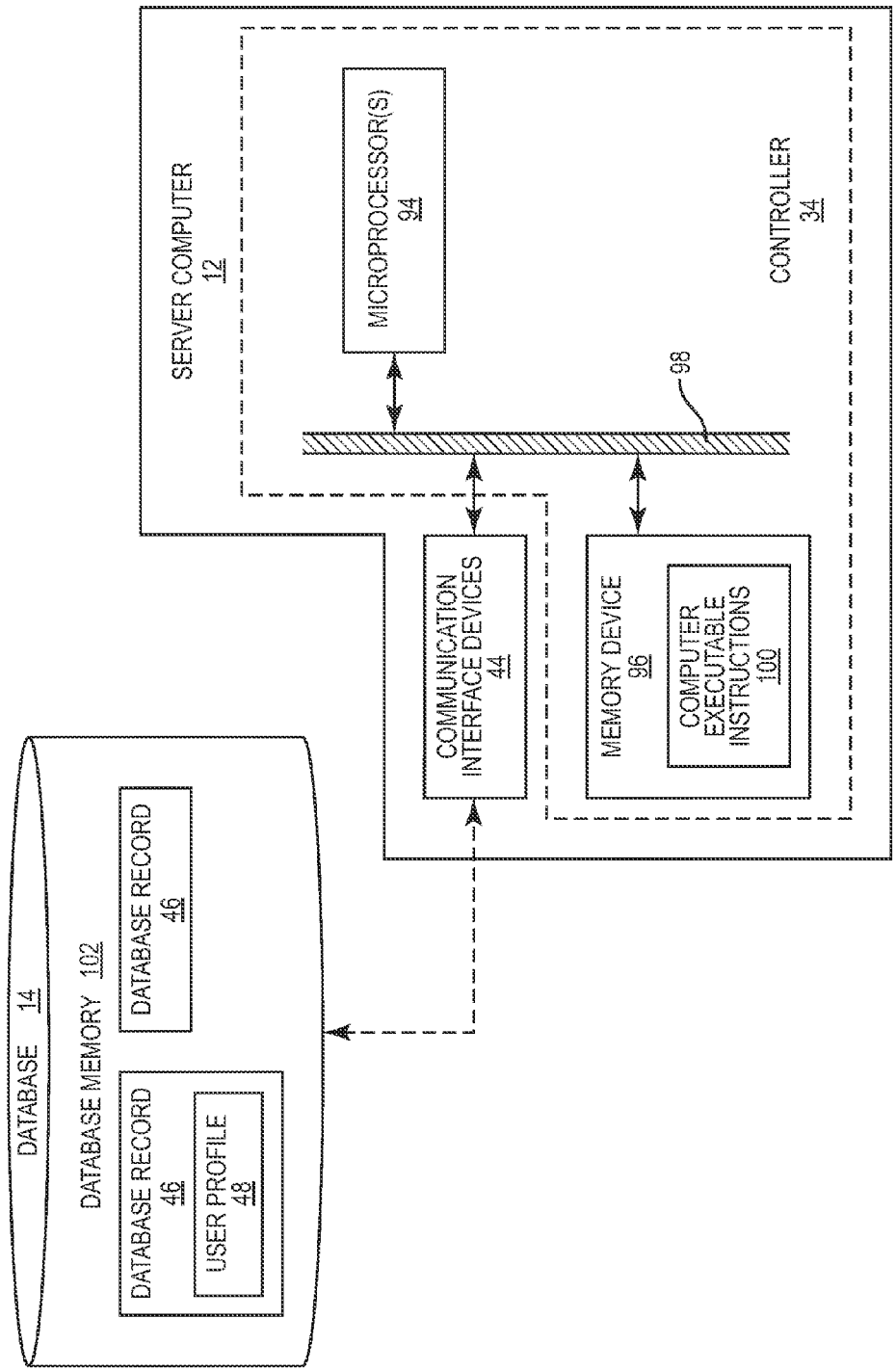
FIG. 21 illustrates one embodiment of a server computer shown in FIG. 1.

FIG. 21 illustrates one embodiment of the server computer 12 shown in FIG. 1. The server computer 12 includes a controller 90 and a communication interface device 44. The database 14 connects to the server computer 12 through communication interface device 44. The communication interface device 44 also is operable to communicatively couple the server computer 12 to the wide area network 16. As discussed above, wide area network 16 may include various different types of networks. The communication interface device 44 is adapted to facilitate communications with one or more communication services on the wide area network 16. In this example, the communication interface device 44 may facilitate communications for any number of communication services provided by mobile communications networks, packet-switched networks, circuit switched networks, and/or the like. Note that the server computer 12 may be equipped with two or more communication interface devices 44, for example one to communicatively couple the server computer 12 to the public network 16 and one to connect it to the database 14, for example, over a private high-speed LAN.

In this embodiment, the controller 90 has general purpose computer hardware, in this case one or more microprocessors 94, and a non-transitory computer readable medium, such as a memory device 96, and a system bus 98. The controller 90 may also include other hardware such as, control logic, other processing devices, additional non-transitory computer readable mediums, and the like. User input and output devices (not shown), such as monitors, keyboards, mouse, touch screens, and the like may also be provided to receive input and output information from a server administrator. The memory device 96 may store computer executable instructions 100 for execution by the microprocessors 94. The computer executable instructions 100 are executable by the microprocessors 94 and configure the operation of the microprocessors 94 so that the microprocessors 94 implement the software applications for the server computer 12 discussed above. A system bus 98 is operably associated with the microprocessors 94 so that microprocessors 94 can exchange information between the controller 90, the memory device 96, and the communication interface device 44 and other hardware components internal to the server computer 12.

The database 14 includes database memory 102 that stores the database records 46. Some of these database records 46 may include the user profiles 48. The database 14 may also store additional information, such as database tables in local memory. Furthermore, the database 14 may include additional programmed hardware components (not shown) that allow for the creation, organization, retrieval, updating, and/or storage of database records 46.

Those skilled in the art will recognize improvements and modifications to the preferred embodiments of the present disclosure. All such improvements and modifications are considered within the scope of the concepts disclosed herein and the claims that follow.

What is claimed is:

1. A first mobile communications device, comprising:
   at least one communication interface device operable to provide an interface for communications with the first mobile communications device; and
   a controller operably associated with the at least one communication interface device and configured to:
      detect a second mobile communications device that is in proximity with the first mobile communications device; and
      communicate over a wireless local area networking link with the second mobile communications device using information access security data provided to secure communications with the second mobile communications device and as a result of a determination that a first user associated with the first mobile communications device has a defined affinity on a social network with a second user associated with the second mobile communications device, the affinity determination based on searching one or more affinity records stored on the first mobile communications device, the affinity records determined based on social network relationships expressed in the social network, wherein the controller is configured to use the information access security data by:
         encrypting data using the information access security data; and
         transmitting the data encrypted using the information access security data to the second mobile communications device over the wireless local area networking link.

2. The first mobile communications device of claim 1, wherein the second mobile communications device is in proximity with the first mobile communications device by being within a defined number of wireless local area networking hops from the first mobile communications device.

3. The first mobile communications device of claim 1, wherein the defined affinity is one or more of either a friendship relationship within a defined number of degrees of separation on the social network, a familial relationship on the social network, or common membership in a group defined on the social network.

4. The first mobile communications device of claim 1, wherein the controller is further configured to establish the wireless local area networking link with the second mobile communications device such that a third mobile communications device operates as a relay between the first mobile communications device and the second mobile communications device.

5. The first mobile communications device of claim 1, wherein the controller is configured to detect the second mobile communications device that is in proximity with the first mobile communications device by:
broadcasting a probing signal from the first mobile communications device; and
receiving a response to the probing signal from the second mobile communications device.

6. The first mobile communications device of claim 5, wherein the probing signal includes a defined number of wireless local area networking hops from the first mobile communications device and wherein the second mobile communications device is in proximity with the first mobile communications device by being within the defined number of wireless local area networking hops.

7. The first mobile communications device of claim 5, wherein the controller is configured to broadcast the probing signal from the first mobile communications device by:
broadcasting the probing signal from the first mobile communications device utilizing a wireless local area networking service provided by the first mobile communications device; and
receiving the response to the probing signal from the second mobile communications device utilizing the wireless local area networking service.

8. The first mobile communications device of claim 7, wherein:
the controller is configured to broadcast the probing signal from the first mobile communications device by broadcasting the probing signal within a transmission range of the wireless local area networking service; and
the controller is configured to receive the response to the probing signal from the second mobile communications device by receiving the response to the probing signal directly from the second mobile communications device.

9. The first mobile communications device of claim 7, wherein the controller is configured to detect the second mobile communications device that is in proximity with the first mobile communications device by:
wherein the controller is configured to broadcast the probing signal from the first mobile communications device by broadcasting the probing signal within a transmission range of the wireless local area networking service; and
wherein the controller is configured to receive the response to the probing signal from the second mobile communications device by receiving the response directly from a third mobile communications device within the transmission range.

10. The first mobile communications device of claim 1, wherein the controller is further configured to:
search one or more affinity records stored on the first mobile communications device to generate the determination; and
establish the wireless local area networking link based on the determination after detecting the second mobile communications device.

11. The first mobile communications device of claim 10, wherein:
wherein the controller is configured to detect the second mobile communications device that is in proximity with the first mobile communications device by:
broadcasting a probing signal from the first mobile communications device; and
receiving a response to the probing signal from the second mobile communications device, wherein the response includes a mobile communications device identification that identifies the second mobile communications device; and
wherein the controller is configured to search one or more affinity records stored on the first mobile communications device to generate the determination by:
finding the mobile communications device identification within the one or more affinity records; and
generating the determination so that the determination has the mobile communications device identification.

12. The first mobile communications device of claim 11, wherein the determination also has the information access security data.

13. The first mobile communications device of claim 11, wherein the controller is further configured to synch the first mobile communications device with a server computer to receive the mobile communications device identification and the information access security data.

14. The first mobile communications device of claim 10, wherein the controller is further configured to:
transmit a mobile communications device identification that identifies the first mobile communications device to the second mobile communications device after searching the one or more affinity records stored on the first mobile communications device;
receive an acknowledgement from the second mobile communications device encrypted using the information access security data; and
decrypting the acknowledgement using the information access security data to verify the second mobile communications device.

15. The first mobile communications device of claim 1, the controller is further configured to:
receive the determination from a server computer after detecting the second mobile communications device; and
establish the wireless local area networking link based on the determination.

16. The first mobile communications device of claim 15, the controller is further configured to receive the information access security data from the server computer after receiving the determination from the server computer.

17. The first mobile communications device of claim 15, wherein the determination includes the information access security data.

18. The first mobile communications device of claim 15, wherein the determination comprises a first new mobile communications device identification that identifies the first mobile communications device, a second new mobile communications device identification that identifies the second mobile communications device, information access security data provided to secure communications with the first mobile communications device, and the information access security data provided to secure communications with the second mobile communications device.

19. The first mobile communications device of claim 1, wherein the controller is further configured to establish the wireless local area networking link based on the determination.

20. The first mobile communications device of claim 19, wherein the controller is configured to establish the wireless local area networking link by:
  sending an invitation to the second mobile communications device in response to the determination; and
  receiving an acknowledgement from the second mobile communications device that indicates acceptance of the invitation.

21. The first mobile communications device of claim 19, wherein the information access security data is also configured to secure communications with the first mobile communications device and is a shared secret between the first mobile communications device and the second mobile communications device.

22. The first mobile communications device of claim 1, wherein the controller is configured to detect a plurality of mobile communications devices that are in proximity with the first mobile communications device, wherein the plurality of mobile communications devices includes the second mobile communications device.

23. The first mobile communications device of claim 22, wherein the controller is configured to detect the plurality of mobile communications devices that are in proximity with the first mobile communications device by:
  broadcasting a probing signal from the first mobile communications device; and
  receiving a response to the probing signal from each of the plurality of mobile communications devices.

24. The first mobile communications device of claim 23, wherein controller is configured to receive the response to the probing signal from a third mobile communications device that is in the plurality of mobile communications devices which includes permission data that defines a second defined affinity for establishing communications with the third mobile communications device and a third user associated with the third mobile communications device has the first defined affinity with the first user on the social network.

25. The first mobile communications device of claim 24, wherein the controller is further configured to:
  establish the wireless local area networking link with the second mobile communications device; and
  not establish a second wireless local area networking link as a result of the first user not having the second defined affinity with the third user.

26. The first mobile communications device of claim 25, wherein the communication interface device provides a wireless local area networking service.

27. A method of operating a first mobile communications device associated with a first user:
  detecting a second mobile communications device that is in proximity with the first mobile communications device; and
  communicating over a wireless local area networking link with the second mobile communications device using information access security data provided to secure communications with the second mobile communications device and as a result of a determination that a second user associated with the second mobile communications device has a defined affinity with the first user on a social network, the affinity determination based on searching one or more affinity records stored on the first mobile communications device, the affinity records determined based on social network relationships expressed in the social network, wherein using the information access security data comprises:
    encrypting data using the information access security data; and
    transmitting the data encrypted using the information access security data to the second mobile communications device over the wireless local area networking link.

28. The method of claim 27, wherein the second mobile communications device is in proximity with the first mobile communications device by being within a defined number of wireless local area networking hops from the first mobile communications device.

29. The method of claim 27, wherein the defined affinity is one or more of either a friendship relationship within a defined number of degrees of separation on the social network, a familial relationship on the social network, or common membership in a group defined on the social network.

30. A non-transitory computer readable medium having instruction for instructing a first mobile communications device associated with a first user to perform a method, wherein the method comprises:
  detecting a second mobile communications device that is in proximity with the first mobile communications device; and
  communicating over a wireless local area networking link with the second mobile communications device using information access security data provided to secure communications with the second mobile communications device and as a result of a determination that a second user associated with the second mobile communications device has a defined affinity with the first user on a social network, the affinity determination based on searching one or more affinity records stored on the first mobile communications device, the affinity records determined based on social network relationships expressed in the social network, wherein using the information access security data comprises:
    encrypting data using the information access security data; and
    transmitting the data encrypted using the information access security data to the second mobile communications device over the wireless local area networking link.

\* \* \* \* \*